United States Patent [19]
Ouchi et al.

[11] Patent Number: 6,107,768
[45] Date of Patent: *Aug. 22, 2000

[54] NUMERICAL CONTROL APPARATUS FOR A MACHINE TOOL

[75] Inventors: Sadami Ouchi, Hyogo; Takashi Kamiya, Aichi; Akio Noda; Yoshinori Tsujido, both of Hyogo, all of Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/093,753

[22] Filed: Jun. 9, 1998

Related U.S. Application Data

[62] Division of application No. 08/807,807, Feb. 26, 1997, Pat. No. 5,831,407, which is a continuation of application No. 08/340,200, Nov. 15, 1994, abandoned.

[30] Foreign Application Priority Data

Apr. 25, 1994 [JP] Japan .................... 6-86852

[51] Int. Cl.$^7$ ........................................ B25J 9/16
[52] U.S. Cl. ..................... 318/568.1; 318/568.25
[58] Field of Search ................. 318/560–579, 318/599–610; 364/474.01, 474.06, 474.15, 474.16–474.19, 474.22, 474.24, 468.01–468.18; 700/169, 174–186

[56] References Cited

U.S. PATENT DOCUMENTS

| | | | |
|---|---|---|---|
| 4,368,509 | 1/1983 | Li ........................ | 364/148.08 |
| 4,472,770 | 9/1984 | Li ........................ | 364/148.02 |
| 4,554,495 | 11/1985 | Davis .................... | 318/572 |
| 4,620,281 | 10/1986 | Thompson et al. ...... | 364/474.18 |
| 4,639,878 | 1/1987 | Day et al. .............. | 364/474.35 X |
| 4,658,362 | 4/1987 | Bhatt .................... | 364/472.01 |
| 4,697,239 | 9/1987 | Sicard et al. .......... | 901/1 X |
| 4,710,864 | 12/1987 | Li ........................ | 364/148.02 |
| 4,725,960 | 2/1988 | Shima ................... | 364/474.2 |
| 4,784,539 | 11/1988 | Lehmkuhl ............... | 409/80 |
| 4,866,429 | 9/1989 | Granere ................. | 340/680 |
| 4,869,813 | 9/1989 | Bailey et al. .......... | 364/474.17 X |
| 4,891,763 | 1/1990 | Kuriyama ............... | 364/474.2 |
| 4,910,660 | 3/1990 | Li ........................ | 364/148.02 |
| 4,949,270 | 8/1990 | Shima ................... | 364/474.2 |
| 4,974,165 | 11/1990 | Locke et al. .......... | 364/474.35 |
| 4,979,128 | 12/1990 | Seki et al. ............ | 364/513 |
| 4,998,050 | 3/1991 | Nishiyama et al. ..... | 318/568.1 |
| 5,021,966 | 6/1991 | Seki et al. ............ | 364/474.2 |
| 5,117,169 | 5/1992 | Kakino et al. ......... | 318/578 |
| 5,122,717 | 6/1992 | Hayashi ................. | 318/569 |
| 5,177,689 | 1/1993 | Kinasi et al. ......... | 364/474.2 |
| 5,206,813 | 4/1993 | Otsubo et al. ......... | 364/474.2 |
| 5,212,645 | 5/1993 | Wildes et al. ......... | 702/44 X |
| 5,243,533 | 9/1993 | Takagi et al. ......... | 364/474.17 |
| 5,251,144 | 10/1993 | Ramamurthi ........... | 706/904 X |
| 5,255,199 | 10/1993 | Barkman et al. ....... | 364/474.17 |
| 5,350,547 | 9/1994 | Yamaguchi et al. .... | 364/40.1 |
| 5,361,308 | 11/1994 | Lee et al. ............. | 382/204 |
| 5,410,634 | 4/1995 | Li ........................ | 395/10 |
| 5,511,147 | 4/1996 | Abdel-Malek .......... | 395/99 |
| 5,631,658 | 5/1997 | Gudat et al. ........... | 342/457 |
| 5,745,390 | 4/1998 | Daneshgari ............ | 702/119 |
| 5,798,928 | 8/1998 | Niwa . | |
| 5,831,407 | 11/1998 | Ouchi et al. .......... | 318/567 |
| 5,880,959 | 3/1999 | Shah et al. ............ | 364/468.03 |
| 5,910,894 | 6/1999 | Pryor ..................... | 364/468.01 |

Primary Examiner—Brian Sircus
Attorney, Agent, or Firm—Leydig, Voit & Mayer

[57] ABSTRACT

A numerically controlled apparatus for a machine tool has a tool and machining condition automatically controlling function, and stores standard data of tools and machining conditions in a standard database. The input device of the apparatus inputs the users data of tools and machining conditions other than the contents of the standard database, and the apparatus stores the data inputted with the input device in one or more user databases. The tool and machining condition automatically determining function of the apparatus determines tool and machining condition data by utilizing both of the standard database and one or more the user databases.

12 Claims, 65 Drawing Sheets

FIG.19

| EXPERIMENT NUMBER | CUTTING SPEED NOTCH | MACHINING FLUID PRESSURE | WORKING RESULTS (SURFACE ROUGHNESS) |
|---|---|---|---|
| 1 | 200 | 2 | |
| 2 | 200 | 4 | |
| 3 | 200 | 6 | |
| 4 | 200 | 8 | |
| 5 | 225 | 2 | |
| 6 | 225 | 4 | |
| 7 | 225 | 6 | |
| 8 | 225 | 8 | |
| 9 | 250 | 2 | |
| 10 | 250 | 4 | |
| 11 | 250 | 6 | |
| 12 | 250 | 8 | |
| 13 | 275 | 2 | |
| 14 | 275 | 4 | |
| 15 | 275 | 6 | |
| 16 | 275 | 8 | |
| 17 | 300 | 2 | |
| 18 | 300 | 4 | |
| 19 | 300 | 6 | |
| 20 | 300 | 8 | |

FIG.20

| EXPERIMENT NUMBER | CUTTING SPEED NOTCH | MACHINING FLUID PRESSURE | WORKING RESULTS (SURFACE ROUGHNESS) |
|---|---|---|---|
| 1 | 200 | 2 | 64 |
| 2 | 200 | 4 | 76 |
| 3 | 200 | 6 | 65 |
| 4 | 200 | 8 | 64 |
| 5 | 225 | 2 | 91 |
| 6 | 225 | 4 | 82 |
| 7 | 225 | 6 | 81 |
| 8 | 225 | 8 | 67 |
| 9 | 250 | 2 | 90 |
| 10 | 250 | 4 | 88 |
| 11 | 250 | 6 | 81 |
| 12 | 250 | 8 | 76 |
| 13 | 275 | 2 | 92 |
| 14 | 275 | 4 | 83 |
| 15 | 275 | 6 | 84 |
| 16 | 275 | 8 | 76 |
| 17 | 300 | 2 | 91 |
| 18 | 300 | 4 | 84 |
| 19 | 300 | 6 | 80 |
| 20 | 300 | 8 | 73 |

NUMERICAL CONTROL APPARATUS FOR A MACHINE TOOL

This application is a Division of Ser. No 08/807,807, filed Feb. 26, 1997 now U.S. Pat. No. 5,831,407; which is a Continuation, of Ser. No 08/340,200, filed Nov. 15, 1994 now abandoned.

BACKGROUND OF THE INVENTION

1. Field of the Invention

This invention relates to a numerically controlling apparatus for a machine tool comprising the function of automatically determining tools and machining conditions and the function of displaying and editing tool paths. (Hereinafter, terms concerning numerical control such as "numerically controlling", "numerically controlled", of course "numerical control" itself, and so forth are collectively denoted by "NC" for short.)

2. Description of the Prior Art

FIG. 1 illustrates a summarized block diagram of a conventional NC apparatus for the machine tool shown in, for example, Japanese Unexamined Patent Applications Published under No. 188249/89 (Hei. 1), No. 138504/92 (Hei. 4), No. 234135/89 (Hei. 1), No. 122524/92 (Hei. 4), and the like. In FIG. 1, reference numeral 201 designates a tool and machining condition data memorizing means, reference numeral 4 designates a working process information inputting means, reference numeral 5 designates a tools and machining conditions automatically determining means, reference numeral 6 designates an NC data generating means, and reference numeral 7 designates an NC device.

Next, the operation will be described thereof. When an operator uses the NC apparatus for a machine tool constructed as mentioned above, he inputs such data as material forms, working forms and so on into the apparatus, and divides each working region into working processes, and further makes up working process information in conformity with the procedures of the making up operations of NC programs. For instance, when he practices lathe working, he divides each working region capable of being worked with one tool (such as the working region of outside diameter turning, the working region of end face turning, the working region of inside diameter turning and the like) into working processes, then he gives working process information such as the kinds of working (or outside diameter cutting, end face cutting, etc.), the kinds of work materials (or cast iron, aluminum, etc.) and so on to each of those working processes. The working process information is made up to each working process. Then, according to the inputted working information, the NC apparatus for the machine tool automatically determines tools and machining conditions suitable for each working process on the basis of the data memorized in the tool and machining condition data memorizing means 201. For example, supposing that the working form is a hole having the diameter of 10 mm, a drill having the diameter of 10 mm is determined as the suitable tool to be used, and a machining condition to this work material is called out among the registered machining conditions as those for the drill being 10 mm in diameter as the suitable machining condition.

FIG. 2 illustrates a summarized block diagram of a conventional NC apparatus for the machine tool (or an electric discharge machine) shown in, for example, Japanese Unexamined Patent Applications Published under No. 130130/87 (Sho. 62), No. 130131/87 (Sho. 62), No. 307051/87 (Sho. 62), No. 38631/93 (Hei. 5), and the like. In FIG. 2, reference numeral 211 designates a machining condition generator in electric discharge working, reference numeral 216 designates an electric discharge machine, reference numeral 217 designates a power source, and reference numeral 218 designates an NC device driving and controlling the electric discharge machine 216 in conformity with the machining conditions set by the machining condition generator 211. Moreover, reference numeral 212 designates an input part receiving demanded specifications by a user, reference numeral 214 designates a machining condition generation part generating machining conditions from the inputted demanded specifications, reference numeral 215 designates a machining condition holding means for holding memories of machining conditions necessary to generate machining conditions, and reference numeral 213 designates an output part outputting generated machining conditions.

Next, the operation will be described thereof. When a user uses the NC apparatus for the machine tool constructed as mentioned above, he inputs the demanded specifications from $a_1$ to $a_n$ such as the working base area $a_1$, working depth $a_2$, the amounts of decreased electrode length $a_3$, etc. and the demanded specifications from $b_1$ to $b_3$ such as machined surface roughness $b_1$, the amounts of electrode consumption $b_2$, working time $b_3$, etc. into the NC apparatus for the machine tool through the input part 212 on the basis of the specifications required for objects to be worked. The machining condition generation part 214, which received the demanded specifications $a_1$ to $a_n$ and $b_1$ to $b_3$, generates at least one machining condition fitted to the demanded specifications, namely a machining condition train $c_1$ to $c_m$ composed of electric conditions such as peak current values, pulse widths, pose time, polarities, using current waveforms, etc. at each working step and the amounts of bringing the electrode near to the final working surface (or electrode bringing amounts) etc., then the machining condition generation part 214 sets them into the output part 213. Besides, the output part 213 displays the set data on the cathode-ray tube display (or CRT: not shown), and outputs them to the floppy disk unit (not shown) or the NC device 218. Thereby, the machining conditions in the electric discharge are automatically set.

FIG. 3 illustrates a block diagram of a conventional NC apparatus for the machine tool having the function of displaying the working paths of its tool on the display screen of a display unit on the basis of its NC program. In FIG. 3, reference numeral 81 designates a display unit, reference numeral 82 designates a data entry unit, reference numeral 7 designates an NC device, reference numeral 221 designates NC programs, reference numeral 222 designates an NC programs transforming means, reference numeral 223 designates a correction calculation executing means, reference numeral 224 designates an interpolating means, and reference numeral 225 designates a tool path data displaying means.

Next, the operation will be described thereof. In the NC apparatus for the machine tool constructed as mentioned above, the made up NC programs are transformed into inside data by each of a certain unit (hereinafter referred to as working block) by the NC programs transforming means 222 at first. The incremental movement amounts of each working block are calculated by the correction calculation executing means 223 using the inside data. Moreover, corrections are made using the data such as tool diameters, tool length and the like. The processing of renewing inside coordinate values is also executed. These data are further utilized for operating the movement amounts of each shaft of the NC machine tool at every minute period of time in the interpolating means 224. On the other hand, the tool path data displaying means 225 transforms these data into the coordinate values on the display screen of the display unit 81 to display the transformed coordinate data on the display unit 81 as the working paths of the tool.

Because conventional NC apparatus for machine tools are constructed as mentioned above, they have problems that they require changing the contents of their databases in advance for reflecting the know-how possessed by skillful workers on the automatic determination, since they have respectively only one tool and machining condition data memorizing means, which is the basis of the automatic determination, or even if they have plural memorizing means, each of the memorizing means is a division of one memorizing means in contents, and that if the contents of the databases have been changed in advance, when the automatic determination based on standard data having no know-how is contrarily wanted, it is needed to restore the original data to the databases again.

Furthermore, although the machining conditions are automatically determined, they are determined in conformity with single algorithm, then there is a problem that if there exist working objects or tools not supposed at the beginning, it is impossible to select the optimum machining conditions, in such a case the optimum conditions are sometimes selected by the experiences and the perceptions of skillful workers, but not everybody can do the operations and it is impossible to select the strictly optimum or quasi-optimum machining conditions in this case also.

Furthermore, the conventional NC apparatus for the machine tool display the working paths of their tools on the display screens of their display units, transforming and executing correction processes from the beginning to the end in the order, and consequently, it is possible to recognize the working paths of their tools in conformity with the entire NC programs, but it is impossible that an operator makes them display only a local working path to a certain working region. Moreover, because the conventional NC apparatus for the machine tool do not memorize the displayed working path data of tools and have not means for identifying the correspondences with their NC programs, the operator who wants to modify the displayed working path data of tools or the visible outlines of working regions has to judge which portions of the NC programs the working paths of tools or the visible outlines of working regions wanted to be modified correspond to the working path data, and has to modify the NC programs after that. Consequently the conventional NC apparatus for a machine tool have a problem that the efficiency of the operations of making up NC programs is bad.

SUMMARY OF THE INVENTION

In view of the foregoing, it is an object of the present invention to provide a NC apparatus for the machine tool capable of automatically determining tools and machining conditions by taking the know-how possessed by skillful workers into its database.

It is another object of the present invention to provide a NC apparatus for the machine tool capable of efficiently doing the work of obtaining the optimum machining conditions.

It is a further object of the present invention to provide a NC apparatus for the machine tool capable of displaying only the tool paths of the working regions appointed by an operator at high speed.

It is a further object of the present invention to provide a NC apparatus for the machine tool capable of modifying its NC programs by enabling an operator to locally modify the tool paths to the appointed working regions displayed on its display unit.

It is a further object of the present invention to provide a NC apparatus for the machine tool capable of modifying its NC programs by enabling an operator to locally modify the visible outlines of the appointed working regions displayed on its display unit.

It is a further object of the present invention to provide a NC apparatus for the machine tool capable of displaying the working regions appointed by an operator and the tool paths of the working regions in a locally magnified state.

It is a further object of the present invention to provide a NC apparatus for the machine tool capable of modifying its NC programs by enabling an operator to locally modify the tool paths displayed on its display unit in a locally magnified state.

It is a further object of the present invention to provide a NC apparatus for the machine tool capable of modifying its NC programs by enabling an operator to locally modify the visible outlines of the appointed working regions displayed on its display unit in a locally magnified state.

It is a further object of the present invention to provide a NC apparatus for the machine tool capable of improving the efficiency of the operations of an operator by enabling him to set the magnification rates of displaying to arbitrary values.

It is a further object of the present invention to provide a NC apparatus for the machine tool capable of improving the efficiency of the operations of an operator by enabling him to set the local extent to be modified to arbitrary values.

It is a further object of the present invention to provide a NC apparatus for the machine tool capable of modifying its NC programs by enabling an operator to appoint working prohibition regions on the display screen of its display unit, and further by enabling-him to check whether the working paths of the tool to the working regions appointed by him interfere with the set working prohibition regions or not, or by enabling him to modify the working paths of the tool not so as to interfere with the working prohibition regions in case of their interfering.

It is a further object of the present invention to provide a NC apparatus for the machine tool capable of displaying the information of the kinds of the tools to be used and the machining conditions to the working regions appointed by an operator on its display unit by enabling him to identify the information.

It is a further object of the present invention to provide a NC apparatus for the machine tool capable of modifying its NC programs by enabling an operator to modify the kinds of the displayed tool to be used and the displayed machining conditions.

According to the first aspect of the present invention, for achieving the above-mentioned objects, there is provided a NC apparatus for the machine tool comprising a standard database storing standard data, an input device inputting user's own data, one or more user's own databases, and a tool and machining condition automatically determining means determining tool and machining condition data by the use of these databases.

As stated above, the NC apparatus for the machine tool according to the first aspect of the present invention determines the tools to be used and the machining condition data using both of the standard database and one or more user's own databases in case of automatically determining the tools and the machining conditions.

According to the second aspect of the present invention, there is provided a NC apparatus for the machine tool comprising a display unit displaying a standard database and a user's own database, a data editing means modifying the displayed data of the databases, and a database managing means re-determining the data of the tool and the machining condition having been determined before the modification in accordance with the modified data.

As stated above, the NC apparatus for the machine tool according to the second aspect of the present invention can display the contents of databases at any time to modify the data, and further can re-determine the tool and the machining condition for reflecting the modified results.

According to the third aspect of the present invention, there is provided a NC apparatus for the machine tool comprising a contradiction checking means checking the contradiction between newly registered data and existing data in case of renewing the data of a user's own database and a standard database.

As stated above, the NC apparatus for the machine tool according to the third aspect of the present invention checks whether the data to be registered in a database newly contradict the data already registered.

According to the fourth aspect of the present invention, there is provided a NC apparatus for the machine tool comprising a selecting means appointing either a standard database or a user's own database as a database to be used.

As stated above, the NC apparatus for the machine tool according to the fourth aspect of the present invention can be appointed so as to use either the standard database or the user's own database with the selecting means.

According to the fifth aspect of the present invention, there is provided a NC apparatus for the machine tool comprising a selecting means appointing a database to be used among plural user's own databases.

As stated above, using the NC apparatus for the machine tool according to the fifth aspect of the present invention, an operator can select the database to use before the automatic determination of tools and machining conditions.

According to the sixth aspect of the present invention, there is provided a NC apparatus for the machine tool having one or more tool and machining condition memorizing means for memorizing tool data or machining condition data other than the data registered in a standard database and a user's own database, which apparatus automatically determine one or more usable tools and corresponding machining conditions by utilizing the tool data and the machining condition data memorized in the tool and machining condition memorizing means.

As stated above, the NC apparatus for the machine tool according to the sixth aspect of the present invention can automatically determine the optimum tools and the optimum machining conditions among one or more tools and machining conditions different in their registered contents to enable an operator to select the tools and the machining conditions to use actually.

According to the seventh aspect of the present invention, there is provided a NC apparatus for the machine tool displaying the usable tools and the machining conditions determined in conformity with the sixth aspect of the invention to enable an operator to select them.

As stated above, the NC apparatus for the machine tool according to the seventh aspect of the present invention enables the operator to select tools and machining conditions as he looks at the displayed contents.

According to the eighth aspect of the present invention, there is provided an NC apparatus for a machine tool comprising an experimental working generation part determining a working experiment item, an experimental working indication part giving an indication necessary for working experiment to a worker, an experimental working result analysis part analyzing the result of the working experiment, and a machining condition generation part generating a machining condition on the basis of the result by the analysis of the experimental working result analysis part.

As stated above, in the NC apparatus for a machine tool according to the eighth aspect of the present invention, the experimental working generation part determines the repetition frequency of the working experiment and the machining condition used at one time of the experiment, the experimental working indication part gives the indication to the worker, and the experimental working result analysis part analyses the experiment result.

According to the ninth aspect of the present invention, there is provided a NC apparatus for the machine tool comprising a tool path generating means generating a tool path, a tool path identifying means classified by a working block adding an identifier so as to identify the generated tool path by fractionizing to each working block, a working region setting means appointing a desired working region to one or more working regions displayed on a display unit, a tool path extracting means corresponding to the appointed working region extracting a tool path corresponding to the existing extent of the appointed working region, and a tool path displaying means displaying the extracted tool path on the display unit.

As stated above, in the NC apparatus for the machine tool according to the ninth aspect of the present invention, the tool path identifying means classified by the working block adds an identifier to the generated tool path datum so as to identify by the working block, the working region setting means appoints a working region in accordance with a manipulation of an operator, the tool path extracting means corresponding to the appointed working region extracts the tool path datum corresponding to the appointed working region, and the tool path displaying means corresponding to the appointed working region displays the extracted tool path.

According to the tenth aspect of the present invention, there is provided a NC apparatus for the machine tool comprising a grid space automatically determining means operating a space of the division of the appointed working region into a grid-like state, a working region grid-like dividing means dividing the appointed working region and the tool path corresponding to the appointed working region into a grid-like state on the basis of the space, a tool path extracting means corresponding to a grid extracting tool paths corresponding to each grid, a tool path displaying means corresponding to a grid displaying the working region divided into a grid-like state and the tool path corresponding to the working region on the display unit, a grid selecting means appointing displayed tool path by the grid, and a tool path editing means corresponding to a grid modifying the appointed tool path and giving editing data to an NC program making means so as to make up a new NC program on the basis of the modified tool path.

As stated above, in the NC apparatus for the machine tool according to the tenth aspect of the present invention, the grid space automatically determining means automatically determines a grid space, the working region grid-like dividing means divides the working region appointed by an operator into a grid-like state, the tool path extracting means corresponding to a grid extracts the tool path data to each grid, the tool path displaying means corresponding to a grid displays the tool paths to each grid, the grid selecting means selects a grid in accordance with a manipulation of the operator, the tool path modifying means corresponding to a grid modifies the tool path in the selected grid, and the NC program making means makes up an NC program to the modified tool path.

According to the eleventh aspect of the present invention, there is provided a NC apparatus for the machine tool comprising a visible outline of a working region modifying means corresponding to a grid modifying the visible outline of the working region corresponding to the appointed grid, and a tool path modifying means corresponding to a modified visible outline of the working region modifying a tool path in accordance with the modified working region and giving editing data to an NC program making means so as to make up a new NC program on the basis of the modified tool path.

As stated above, in the NC apparatus for the machine tool according to the eleventh aspect of the present invention, the visible outline of a working region modifying means corresponding to a grid modifies the visible outline of a working region in the appointed grid, and the tool path modifying means corresponding to a modified visible outline of the working region modifies a tool path so as to correspond to the visible outline of the modified working region.

According to the twelfth aspect of the present invention, there is provided a NC apparatus for the machine tool comprising a selected grid magnifying means magnifying a selected grid, and a tool path displaying means corresponding to a magnified grid displaying a working region included in the magnified grid and a tool path corresponding to the working region on a display unit.

As stated above, in the NC apparatus for the machine tool according to the twelfth aspect of the present invention, the selected grid magnifying means magnifies a selected grid, and the tool path displaying means corresponding to a magnified grid displays the tool path in the magnified grid.

According to the thirteenth aspect of the present invention, there is provided a NC apparatus for the machine tool comprising a grid space of a magnified grid automatically determining means operating the space of further dividing on the basis of the magnification extent in case of magnifying a grid, a working region of the magnified grid re-dividing means re-dividing a working region included in the appointed grid and a tool path corresponding to the working region into a grid-like state, a tool path extracting means corresponding to a grid of the magnified grid extracting the tool path data to the re-divided grid, a tool path displaying means corresponding to a grid of the magnified grid displaying a tool path corresponding to the re-divided grid, a grid of the magnified grid selecting means appointing the displayed tool path by the re-divided grid, and a tool path modifying means corresponding to a grid of the magnified grid modifying the appointed tool path and giving editing data to an NC program making means so as to make up a new NC program on the basis of the modified tool path.

As stated above, in the NC apparatus for the machine tool according to the thirteenth aspect of the present invention, the grid space of a magnified grid automatically determining means automatically determines a space of re-dividing a magnified grid into a grid-like state, the working region of the magnified grid re-dividing means re-divides a visible outline of a working region in the magnified grid, the tool path extracting means corresponding to a grid of the magnified grid extracts the tool path data to the re-divided grid, the tool path displaying means corresponding to a grid of the magnified grid displays tool paths to each of the extracted grids, the grid of a magnified grid selecting means appoints the re-divided grid in accordance with the operator's manipulation, and the tool path modifying means corresponding to a grid of the magnified grid modifies the tool path in the appointed grid.

According to the fourteenth aspect of the present invention, there is provided a NC apparatus for the machine tool comprising a visible outline of a working region modifying means corresponding to a grid of a magnified grid modifying a visible outline of a working region corresponding to an appointed grid, and a tool path modifying means corresponding to a modified visible outline of a working region of a grid of a magnified grid modifying a tool path in accordance with a modified working region and giving editing data to an NC program making means so as to make up a new NC program on the basis of the modified tool path.

As stated above, in the NC apparatus for the machine tool according to the fourteenth aspect of the present invention, the visible outline of a working region modifying means corresponding to a grid of a magnified grid modifies a visible outline of a working region in a re-divided grid to a magnified grid, and the tool path modifying means corresponding to a modified visible outline of a working region of a magnified grid modifies a tool path so as to correspond to the modified visible outline of the working region.

According to the fifteenth aspect of the present invention, there is provided a NC apparatus for the machine tool comprising a grid magnification rate setting means setting a magnification rate to an arbitrary value in case of magnifying a grid.

As stated above, in the NC apparatus for the machine tool according to the fifteenth aspect of the present invention, the grid magnification rate setting means sets a magnification rate of a grid in accordance with a manipulation of an operator.

According to the sixteenth aspect of the present invention, there is provided a NC apparatus for the machine tool comprising a grid space setting means setting a space of dividing to an arbitrary value.

As stated above, in the NC apparatus for the machine tool according to the sixteenth aspect of the present invention, the grid space setting means sets a space of a grid in accordance with a manipulation of an operator.

According to the seventeenth aspect of the present invention, there is provided a NC apparatus for the machine tool comprising a working prohibition grid setting means setting an appointed grid as a working prohibition region, and a tool path generating means corresponding to a workable grid modifying a tool path not so as to interfere with the working prohibition region and giving editing data to an NC program making means so as to make up a new NC program on the basis of the modified tool path.

As stated above, in the NC apparatus for the machine tool according to the seventeenth aspect of the present invention, the working prohibition grid setting means appoints a grid to be made to be a working prohibition region by an operator, and the tool path generating means corresponding to a workable grid modifies a tool path so as to correspond to the inside of the workable grid.

According to the eighteenth aspect of the present invention, there is provided a NC apparatus for the machine tool comprising a working prohibition region setting means setting a working prohibition region in an appointed working region, and a workable region grid-like dividing means operating a space of re-dividing the appointed working region on the basis of a set extent of a working prohibition region and dividing the appointed working region and a tool path corresponding to the working region into a grid-like state on the basis of the operated space.

As stated above, in the NC apparatus for the machine tool according to the eighteenth aspect of the present invention, the working prohibition region setting means sets a working prohibition region in accordance with a manipulation of an operator, and the workable region grid-like dividing means divides a grid so as to correspond to the workable region.

According to the nineteenth aspect of the present invention, there is provided a NC apparatus for the machine tool comprising a tool interference judging means corresponding to a grid judging whether a tool path interferes with a working prohibition region or not, and an interfering grid specifying means specifying a grid including the tool path when there is an interfering tool path.

As stated above, in the NC apparatus for the machine tool according to the nineteenth aspect of the present invention, the tool interference judging means corresponding to a grid checks the interference in a tool path in a grid, and the interfering grid specifying means specifies a grid including an interfering tool path.

According to the twentieth aspect of the present invention, there is provided a NC apparatus for the machine tool comprising a working information identifying means corresponding to a grid identifying the kind of a tool and a machining condition corresponding to a tool on the basis of a working region included in an appointed grid, and a working information displaying means corresponding to a grid displaying the identified kind of a tool and a machining condition on a display unit.

As stated above, in the NC apparatus for the machine tool according to the twentieth aspect of the present invention, the working information identifying means corresponding to a grid identifies the working information to a working region included in a grid, and the working information displaying means corresponding to a grid displays the identified working information.

According to the twenty-first aspect of the present invention, there is provided a NC apparatus for the machine tool comprising a tool path modifying means corresponding to the modified working information appointing arbitrary data of the kind of a tool and a machining condition displayed on a display unit and modifying the appointed data to re-make up a tool path on the basis of the modified data and giving editing data to an NC program making means so as to make up a new NC program on the basis of the re-made tool path.

As stated above, in the NC apparatus for the machine tool according to the twenty-first aspect of the present invention, the tool path modifying means corresponding to the modified working information appoints displayed data of the kind of a tool and a machining condition to modify them.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 19 is an explanatory drawing of the embodiment 13 of the present invention;

FIG. 20 is an explanatory drawing of the embodiment 13 of the present invention;

DETAILED DESCRIPTION OF THE PREFERRED EMBODIMENTS

Preferred embodiments of the present invention will now be described in detail with reference made to the accompanying drawings.

EMBODIMENT 1

Figure 1:
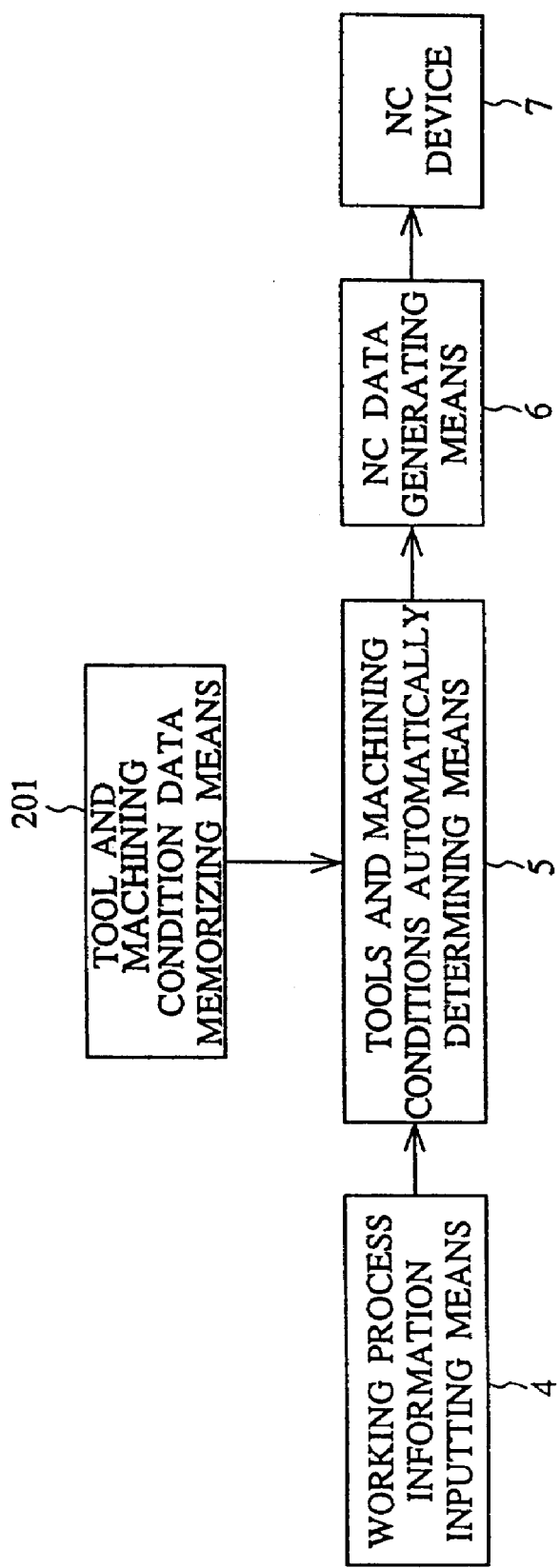
FIG. 1 illustrates a block diagram showing a conventional NC apparatus for the machine tool comprising the automatically determining function of tools and machining conditions.
Figure 2:
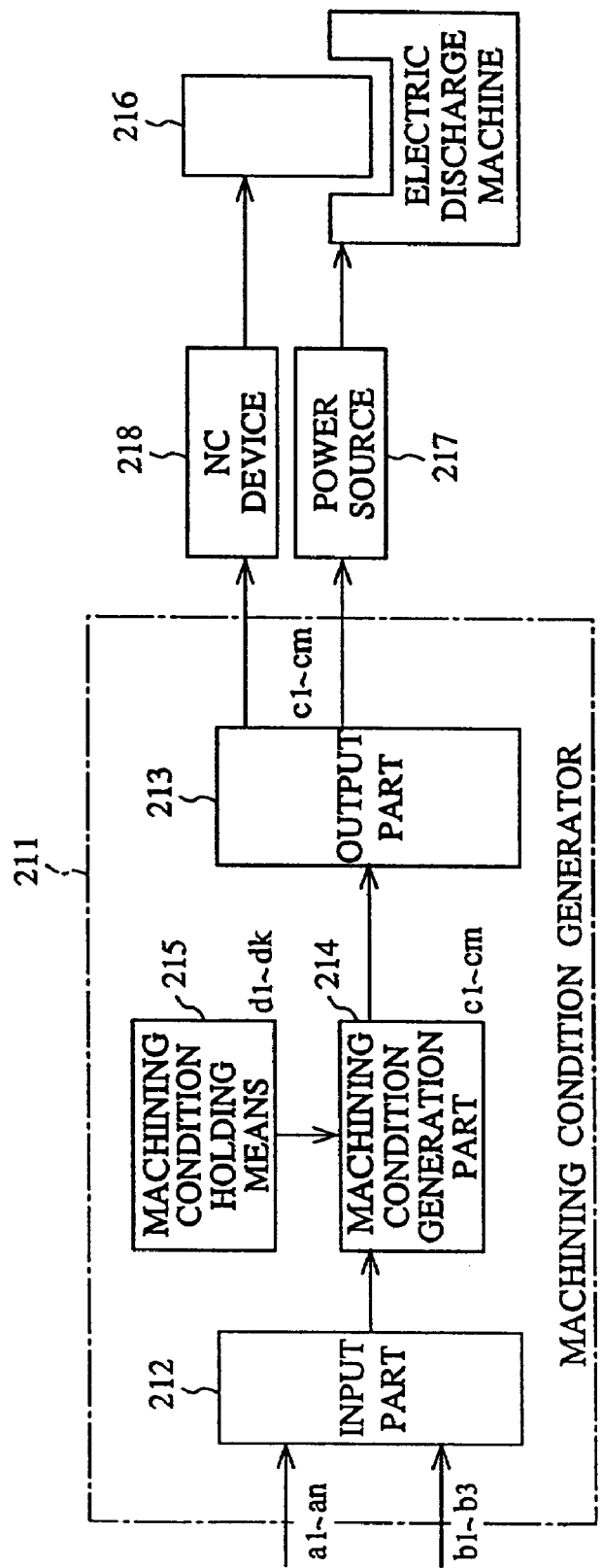
FIG. 2 illustrates a block diagram showing another conventional NC apparatus.
Figure 3:
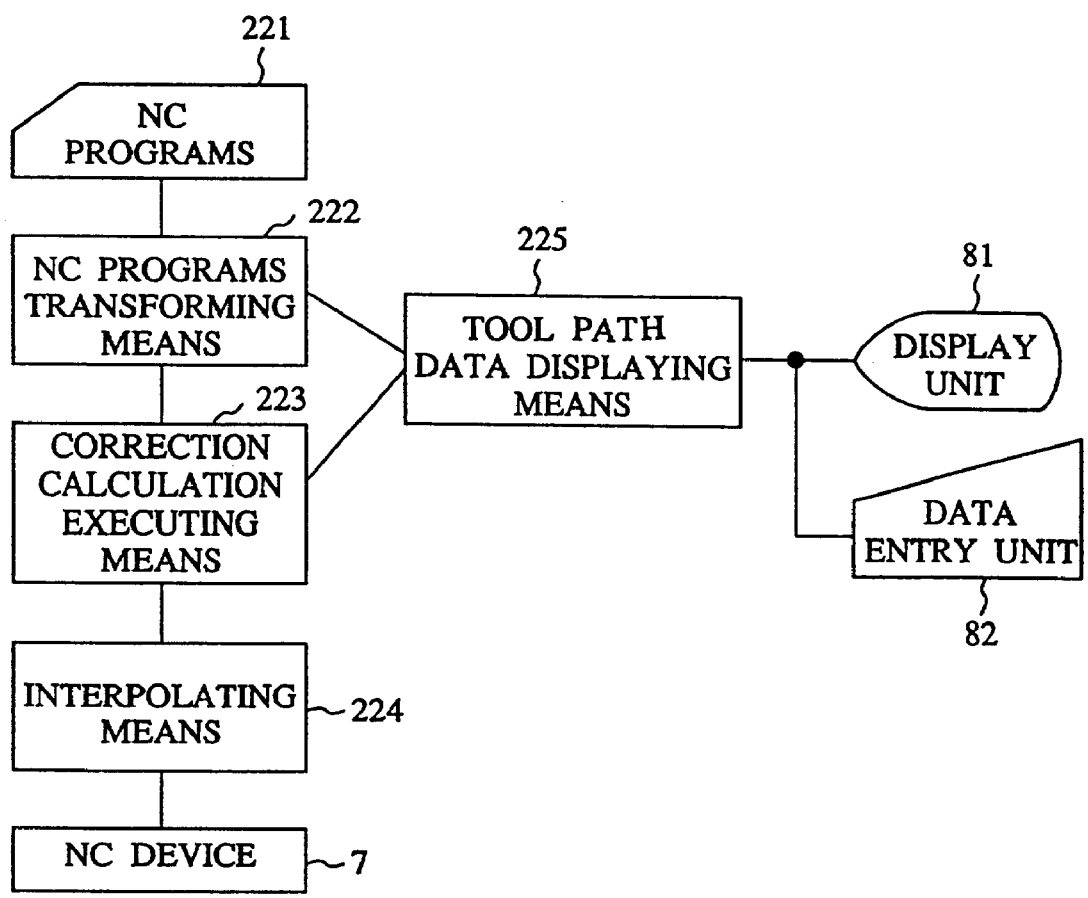
FIG. 3 illustrates a block diagram showing a further different conventional NC apparatus.
Figure 4:
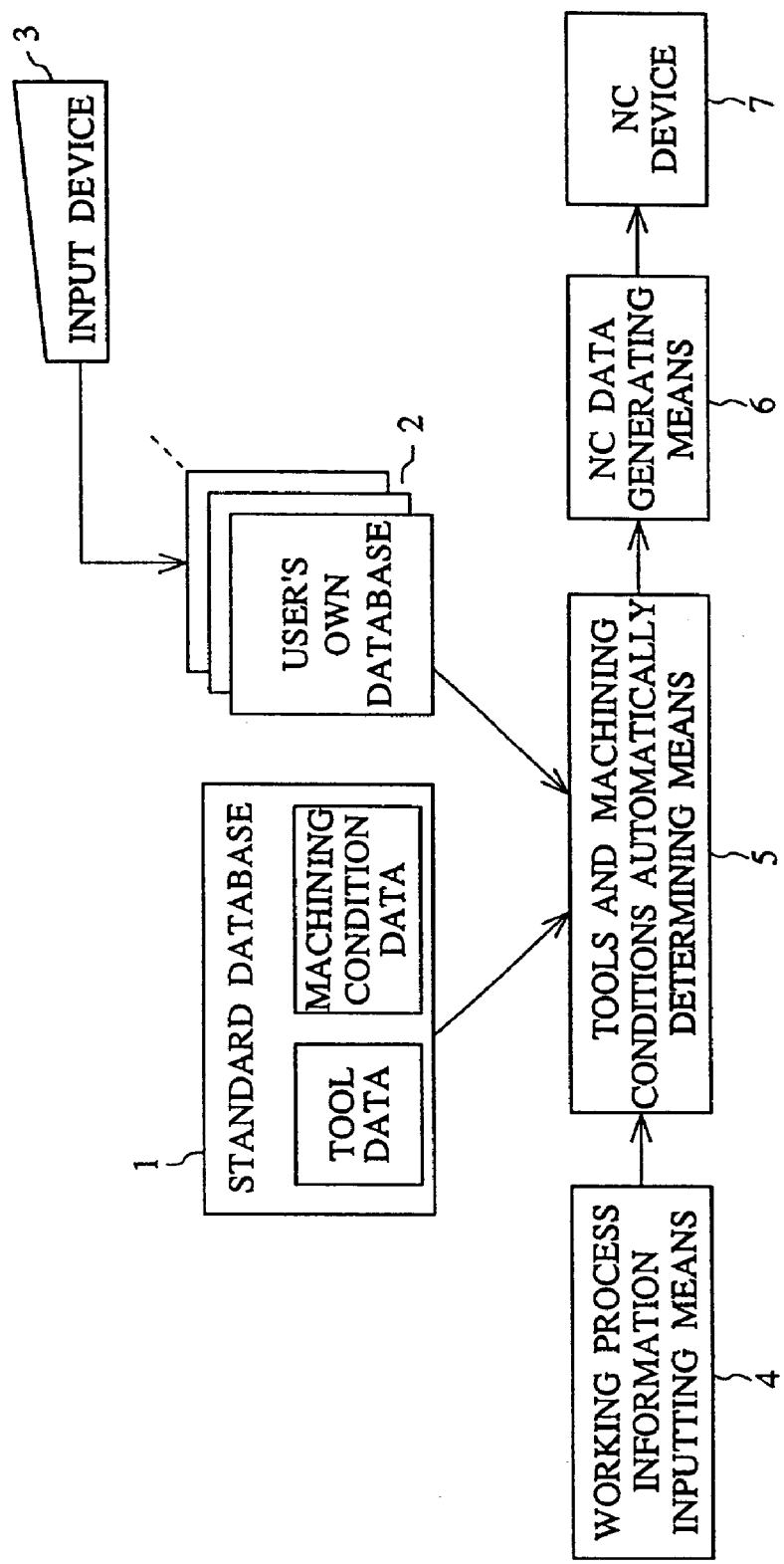
FIG. 4 illustrates a block diagram showing the NC apparatus for the machine tool of the embodiment 1 of the present invention.

FIG. 4 illustrates a block diagram of the NC apparatus for the machine tool of an embodiment of the invention of claim 1. In FIG. 4, reference numeral 1 designates a standard database registering standard tools and machining conditions, reference numeral 2 designates a user's own database registering user's own tools and machining conditions, reference numeral 3 designates an input device for adding and modifying the contents of the user's own database 2, reference numeral 4 designates a working process information inputting means for inputting working process information, reference numeral 5 designates a tool and machining condition automatically determining means automatically determining tools and machining conditions, reference numeral 6 designates an NC data generating means generating NC data on the basis of the automatically determined tools and machining conditions, and reference numeral 7 designates an NC device executing working on the basis of the NC data.

The standard database 1 means a database registering standard machining conditions supplied by so called tool makers as regards the machining conditions of the tools attached to machine tools or possessed by the whole factory. And, the user's own database 2 means a database registering the know-how possessed by experiences by operators or field workers, who are users, namely the machining conditions and so on not being in the standard database 1. The user's own database registers such data as, for example, "In such a working form, the—ought to be selected as the kind of tool, the—ought to be selected as the quality of the material, and the—ought to be selected as the machining condition" and the like. The contents of the user's own database 2 are inputted with the input device 3 to be stored in it. It is possible to install plural user's own databases 2. The contents of the use's own database 2 can be added or modified by an operator or a field worker. On the contrary, the contents of the standard database 1 cannot generally be added or modified by the operator or the field worker, then the data of it are added or modified only when new kinds of tools are added or the machining condition data are changed by a tool maker. When data are called out of these databases 1 and 2, they are called out of the tables of the databases 1 and 2 by the use of the kinds of tools, etc. as a retrieval item.

Figure 5:
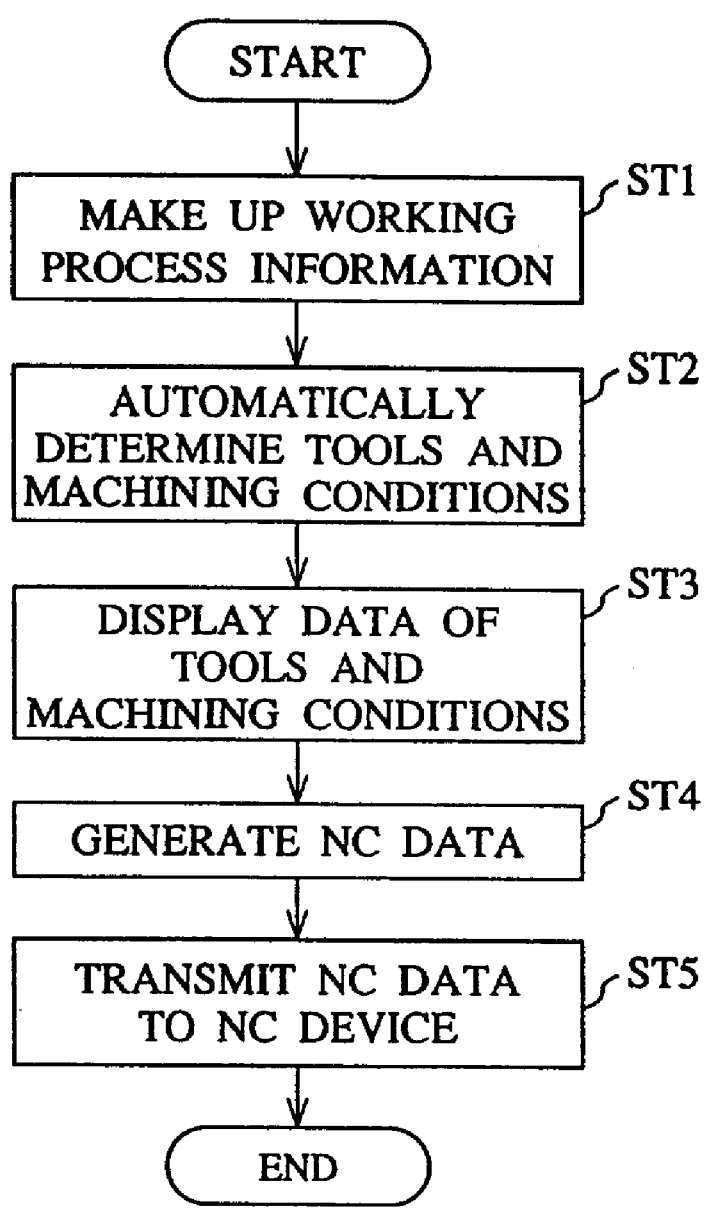
FIG. 5 illustrates a flow chart for describing the operation of the apparatus shown in FIG. 4.

Next, the operation will be described thereof. FIG. 5 illustrates a flow chart showing the procedures of manipulations and operations, and the description will be made on the basis of FIG. 5. An operator makes up each working process information by inputting material forms, working forms, work material qualities and the like and dividing working processes, and so forth in conformity with NC programs making works (STEP ST1). Next, the tool and machining condition automatically determining means 5 receives the machining condition information as inputs from the working process information inputting means 4, and automatically determines the tools and the machining conditions to be used at each working process by utilizing both the standard database 1 and one or more user's own databases 2 (STEP ST2). The automatically determined tools and the machining conditions corresponding to the tools are displayed on a display unit (not shown) (STEP ST3).

At the time of utilizing the databases 1 and 2, the user's own database 2 is retrieved at first, then the standard database 1 is retrieved to determine the tool and machining condition data in conformity with the contents of the standard database 1 in case of being no suitable data in the user's own database 2. In case of being suitable data in the user's own database 2, the data takes precedence, the tools and the machining conditions are determined by the data accordingly. If the tools and the machining conditions of a working process can be determined by only using the suitable data in the user's own database 2, they are determined by using the data alone. And, if the suitable data in the user's own database 2 have not all the necessary data for the determination, the data being lacking are supplemented from the standard database 1 for the determination.

For example, in the case where the combination of the kind of the working form and the work material quality of a certain working process information accords with the combination of the kind of the working form and the work material quality of the data registered in the user's own database 2, the combination is judged to be fit for the data in the user's own database 2. Then, the kind of the tool, cutting speed, the amount of cut, and so on which are registered as the data are determined as the tool and the machining condition of the working process.

The tool and the machining condition determined as mentioned above, are transformed into NC data by the NC data generating means 6 together with the working process information (STEP ST4) to be transmitted to the NC device 7 (STEP ST5). Then, the NC device 7 executes working on the basis of the transmitted data.

EMBODIMENT 2

Figure 6:
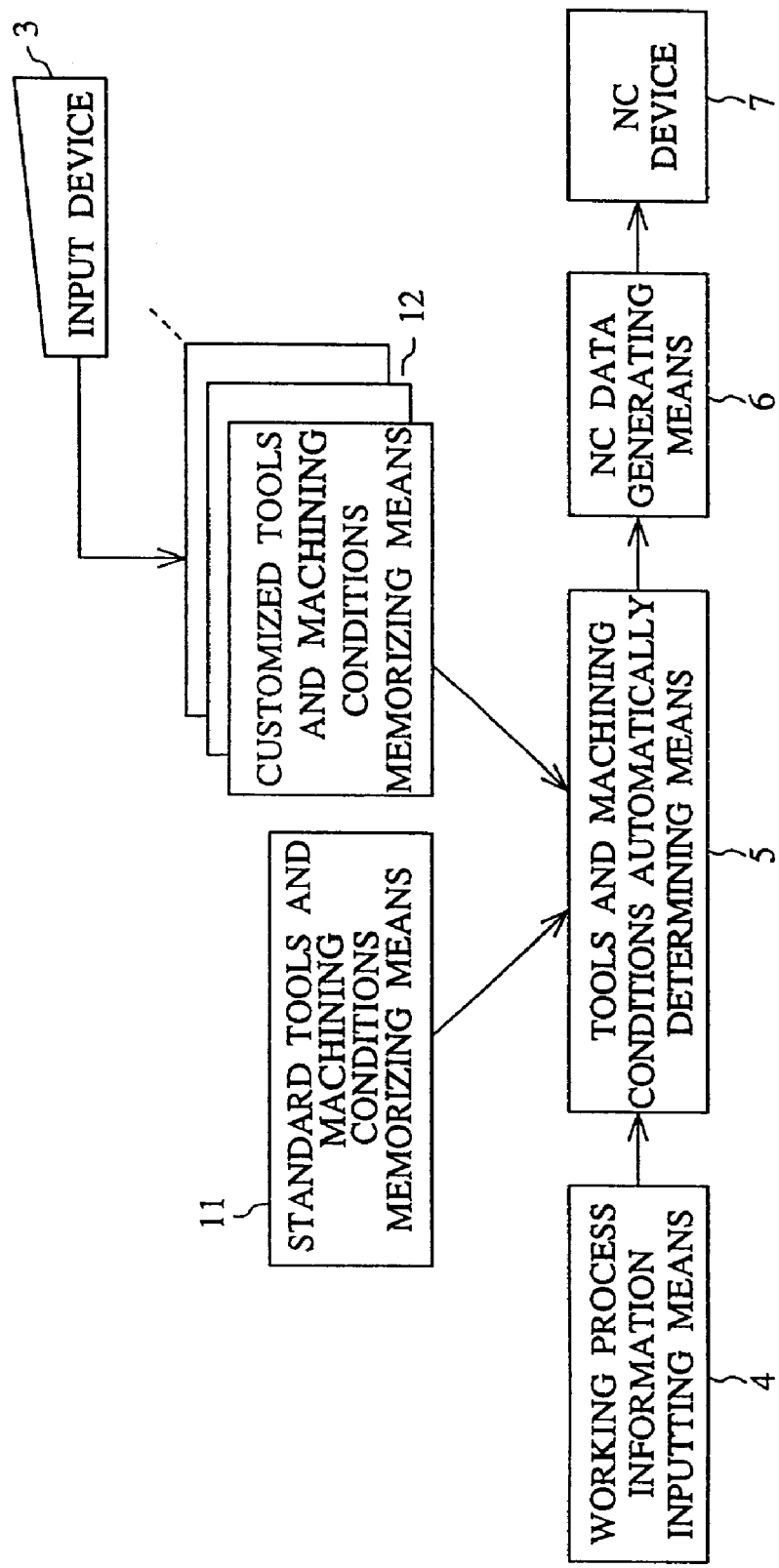
FIG. 6 illustrates a block diagram showing the NC apparatus for the machine tool of the embodiment 2 of the present invention.

FIG. 6 illustrates a block diagram showing an NC apparatus for a machine tool of an embodiment of the invention. In FIG. 6, reference numeral 11 designates a tool and machining condition memorizing means (or standard database), reference numeral 12 designates a customized tool and machining condition memorizing means (or user's own database), reference numeral 3 designates an input device, reference numeral 4 designates a working process information inputting means, reference numeral designates a tool and machining condition automatically determining means, reference numeral 6 designates an NC data generating means, and reference numeral 7 designates an NC device. The customized tools and machining conditions mean the tools and the machining conditions personally inputted, or edited after the automatic determination, by a user or a worker.

For instance, supposing that the NC machine tool equipped with this NC apparatus has a large mechanical horsepower, and that the cutting efficiency can further be improved in case of being used for roughing. But the largeness of the mechanical horsepower are not considered in the machining conditions automatically determined by the use of the data in the standard tool and machining condition memorizing means 11 which has registered the machining conditions being recommended by the tool maker and being prepared from the beginning, and consequently, the optimum machining condition, with which the cutting time can further be shortened, and the like, cannot be determined. For that reason, a skillful worker has conventionally executed the working after changed the machining condition on a control panel with the consideration of the mechanical horsepower and so on when he actually executed the working.

Accordingly, the machining conditions to the tools for roughing of this NC apparatus such as feed rates, the depths of cuts, cutting speeds and so on are previously changed from the standard machining conditions stored in the tool and machining condition memorizing means 11 by a skillful worker with the consideration of the characteristics of the NC machine tool. Then, the changed machining conditions are previously preserved in another memorizing means, i.e. the customized tool and machining condition memorizing means 12. Thereby, if there is the roughing in the working processes at the time when the tools and the machining conditions are automatically determined, more suitable tools to be used and machining conditions can be determined by utilizing the data in the customized tool and machining condition memorizing means 12 preferentially.

EMBODIMENT 3

Figure 7:
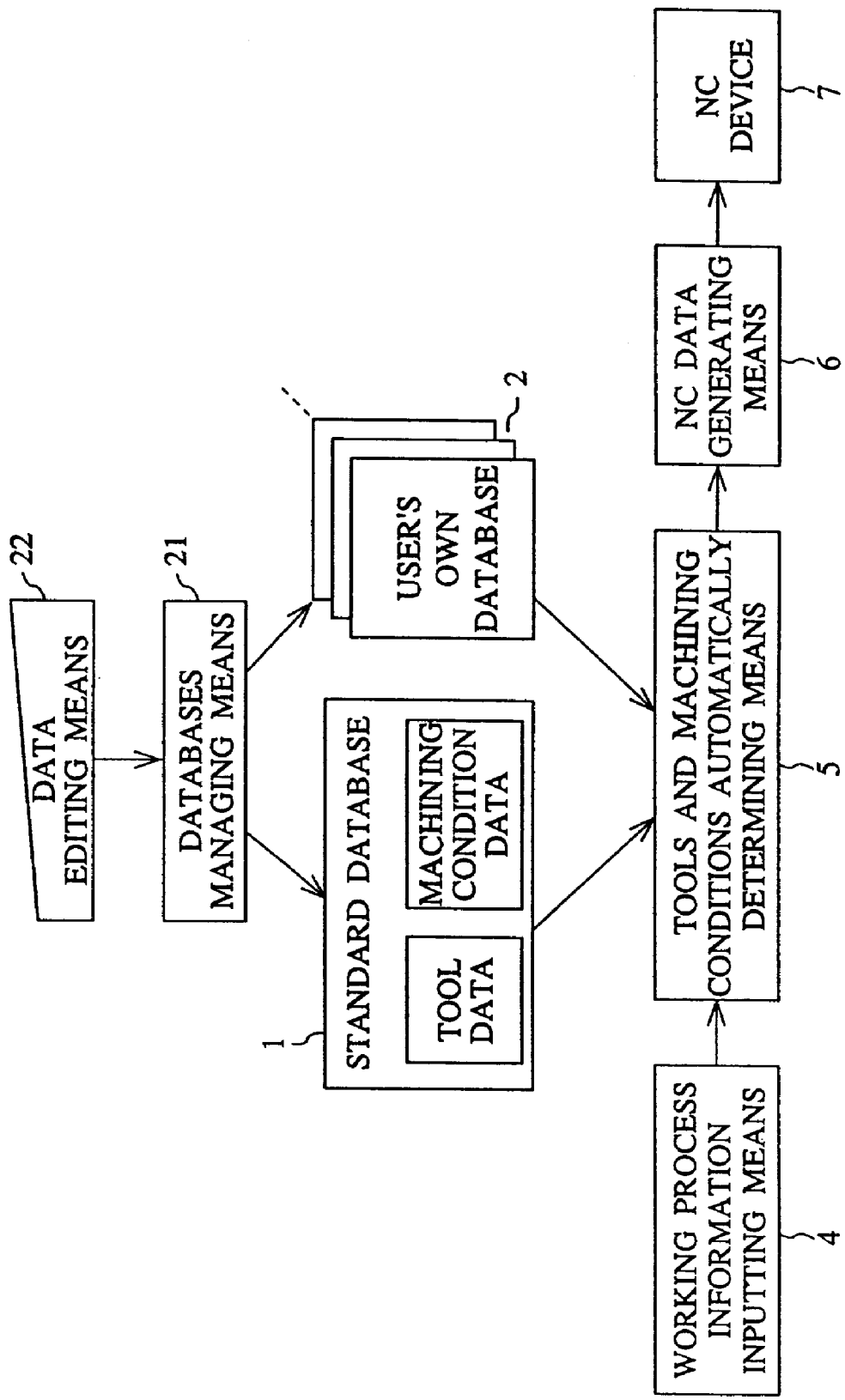
FIG. 7 illustrates a block diagram showing the NC apparatus for the machine tool of the embodiment 3 of the present invention.

FIG. 7 illustrates a block diagram of an NC apparatus for a machine tool of an embodiment of the invention. In FIG. 7, reference numeral 1 designates a standard database, reference numeral 2 designates a user's own database, reference numeral 4 designates a working process information inputting means, reference numeral 5 designates a tool and machining condition automatically determining means, reference numeral 6 designates an NC data generating means, reference numeral 7 designates an NC device, reference numeral 21 designates a database managing means re-determining the data of tools and machining conditions having been determined before the modification in accordance with the modified data, and reference numeral 22 designates a data editing means modifying the data in the databases. In addition to them, there is equipped a display unit (not shown) displaying the contents of the aforementioned standard database 1 and the aforementioned user's own database 2 during making up NC programs.

Figure 8:
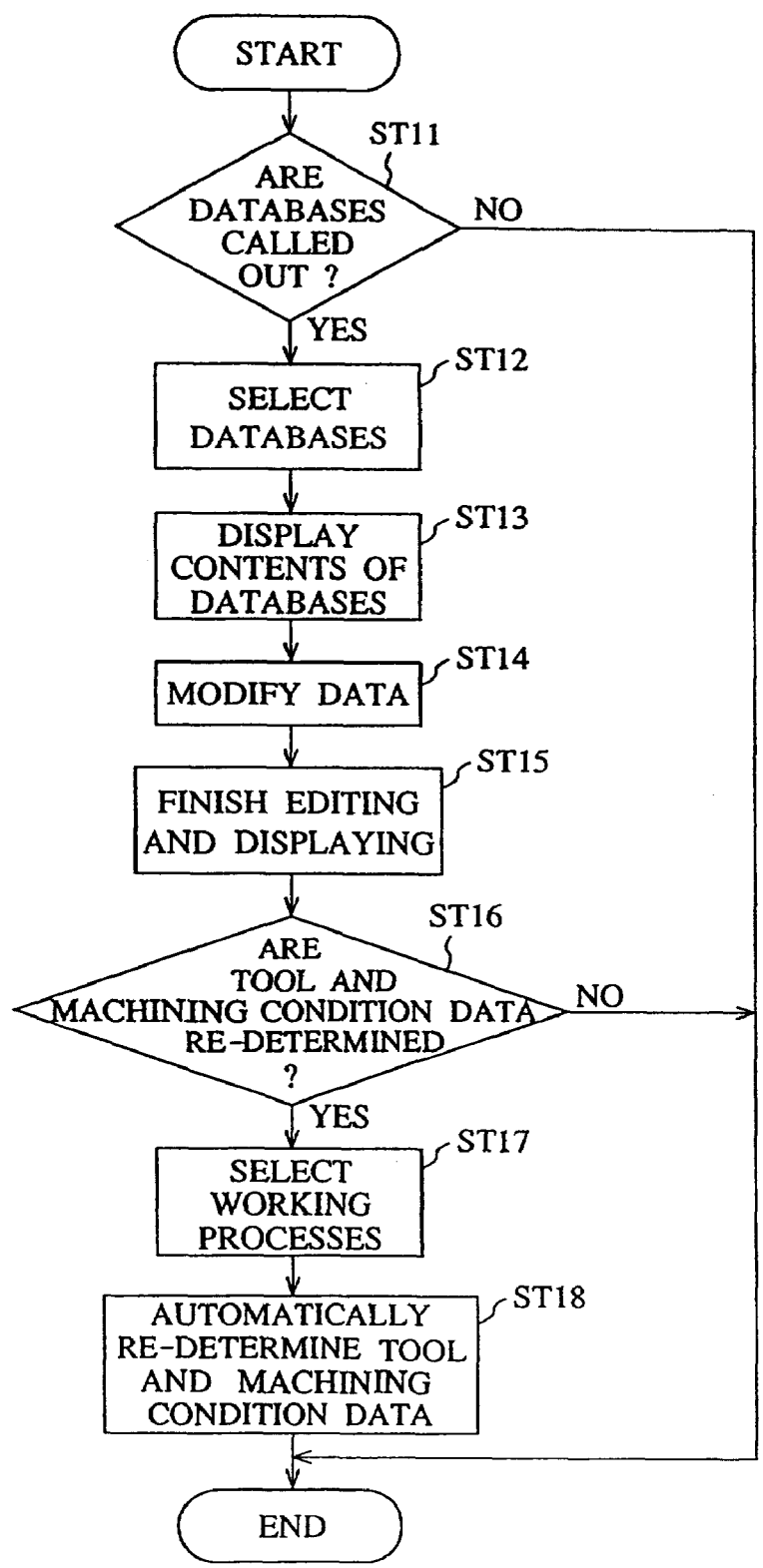
FIG. 8 illustrates a flow chart for describing the operation of the apparatus shown in FIG. 7.

Next, the operation will be described thereof. FIG. 8 illustrates a flow chart showing the procedures of manipulations and operations, and the description will be done on the basis of FIG. 8. In the NC apparatus constructed as mentioned above, the automatic determination of the data of tools and machining conditions is done like in the embodiment 1. Now, the operator can call out the contents of the database 1 and 2 (STEP ST11, STEP ST12), and can make the contents display on the display unit (not shown) (STEP ST13), at any time during the operations of making up NC programs. And, he can modify and change the displayed contents with the data editing means 22 (STEP ST14). As a concrete example of the modification, there is a case, for instance, where one value of the cutting speed is changed, and so on.

In the case where the tool to be used and the machining conditions of a certain working process have already determined when the operator edits the database, and further in the case where he wants to reflect the modified contents of the database, he can automatically re-determine again to reflect the contents of database (STEPs ST16, ST17 and ST18).

EMBODIMENT 4

Figure 9:
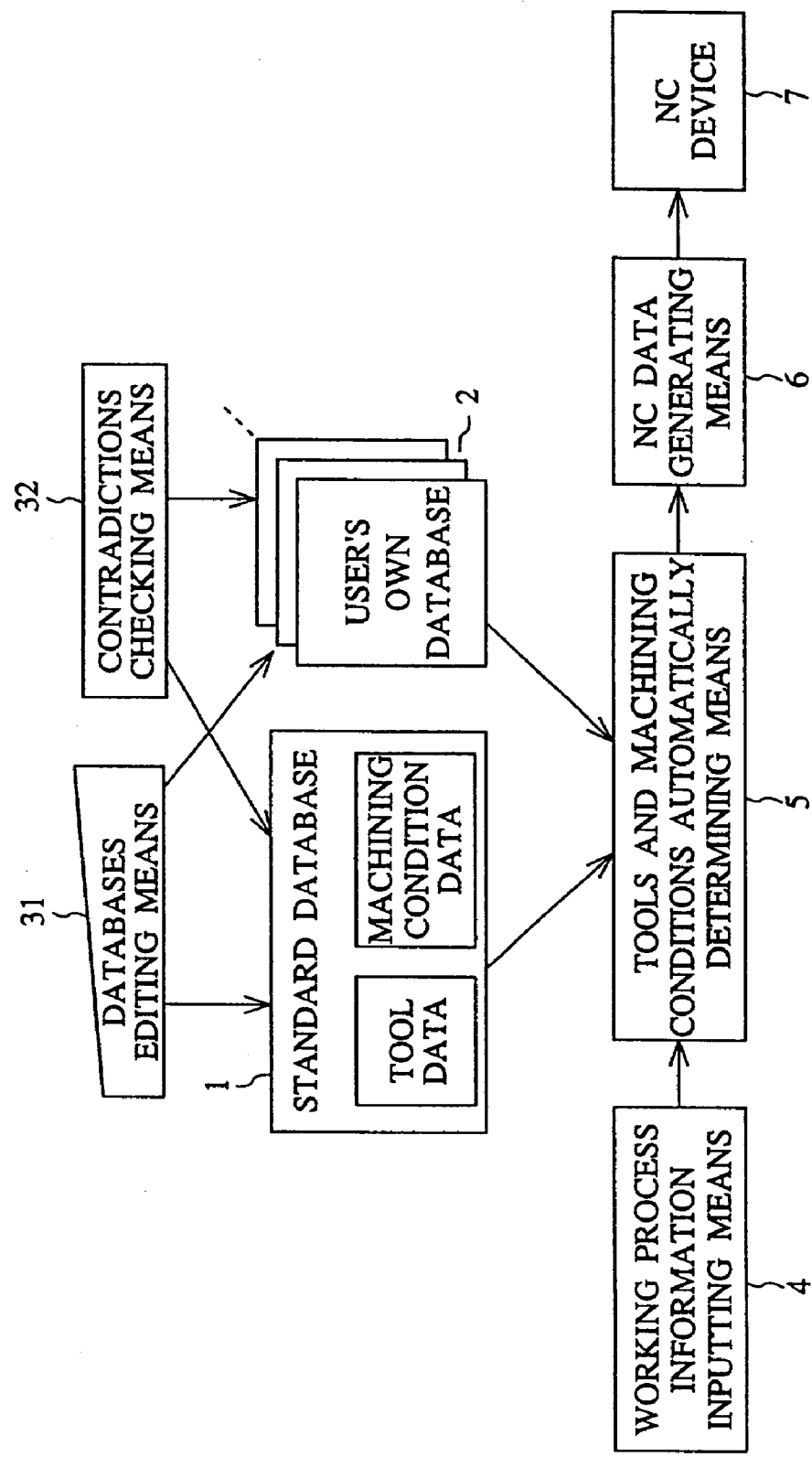
FIG. 9 illustrates a block diagram showing the NC apparatus for the machine tool of the embodiment 4 of the present invention.

FIG. 9 illustrates a block diagram of an NC apparatus for a machine tool of an embodiment of the invention. In FIG. 9, reference numeral 1 designates a standard database, reference numeral 2 designates a user's own database, reference numeral 4 designates a working process information inputting means, reference numeral 5 designates a tool and machining condition automatically determining means, reference numeral 6 designates an NC data generating means, reference numeral 7 designates an NC device, reference numeral 31 designates a database editing means modifying the data of the standard database 1 or the user's own database 2, and reference numeral 32 designates a contradiction checking means checking a contradiction between newly registered data and the existing data in case of renewing the data of the user's own database 2 or the standard database 1, and displaying the contradicting contents on the display unit in case of judging that there are contradicting data.

Figure 10:
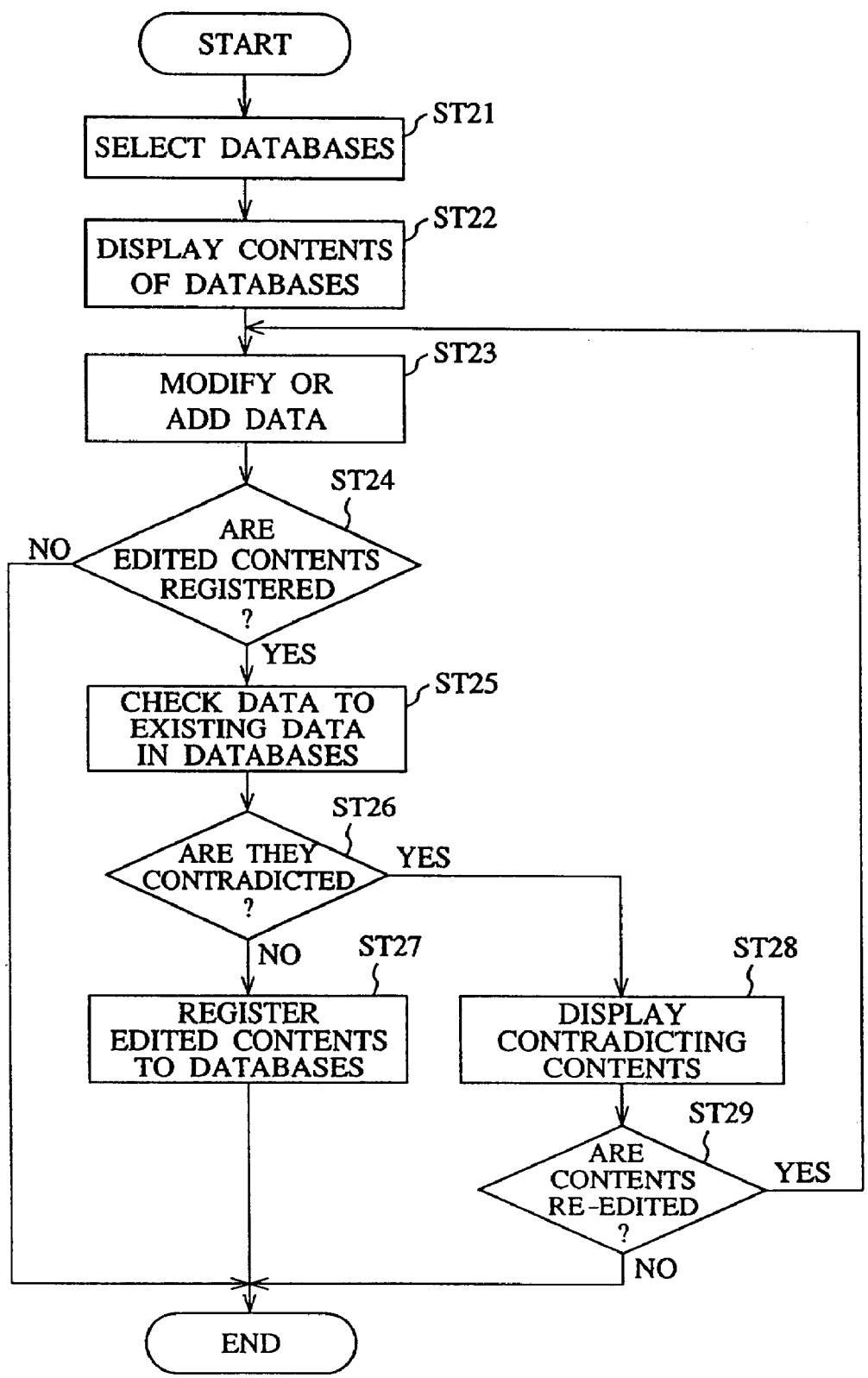
FIG. 10 illustrates a flow chart for describing the operation of the apparatus shown in FIG. 9.

Next the operation will be described thereof. FIG. 10 illustrates a flow chart showing the procedures of manipulations and operations, and the description will be done on the basis of FIG. 10. In the NC apparatus constructed as mentioned above, when an operator wants to register new data (STEP ST24) by modifying and adding and so on the contents of the data of the standard database 1 or the user's own database 2 with the database editing means 31 (STEPs ST21, ST22 and ST23), the contradiction checking means 32 automatically starts to check the consistency of the data, that is to say, whether the newly registered data contradicts the existing data of the standard database 1 and the user's database 2 or not (STEP ST25). In the case where contradicting data are going to be registered, contradicting contents are displayed on the display unit (not shown) (STEP ST28), and the re-editing or the cancellation of the data to be newly registered or the editing of the contradicting existing data is made by means of the database editing means 31.

For example, if another machining condition to an already registered tool were going to be registered, it would cause the contradiction because plural machining conditions were to be registered to one tool. Accordingly, the re-editing is required in such a case. The contradiction checking is done before registering new data in the case where the new data are given as inputs, and the register is executed in the case where the new data do not contradict the existing data. Such cases are judged to be contradictions as, for example, the case where different machining condition values are already registered to the same tool in the user's own database 2, or the case where the new cutting speed datum to be registered is exceeding the upper limit value of the cutting speed or less than the lower limit value of it, which limit values are set in the standard database 1 already. If there is any contradiction, the data to be registered are modified so as not to contradict (or re-editing), or the registration is stopped, or the contradicting existing data are modified. If the datum of the cutting speed of 40 m/min. is already registered when the numeral value of the cutting speed is tried to be modified from 40 m/min. to 50 m/min. for example, the contradiction checking means 32 judges that the modification has a contradiction then. In this case, the user can judge whether he forces the registration of the cutting speed data of 50 m/min. because he is wanting to register the cutting speed datum of 50 m/min., or he gives up the registration and leaves the existing data of 40 m/min.

EMBODIMENT 5

Figure 11:
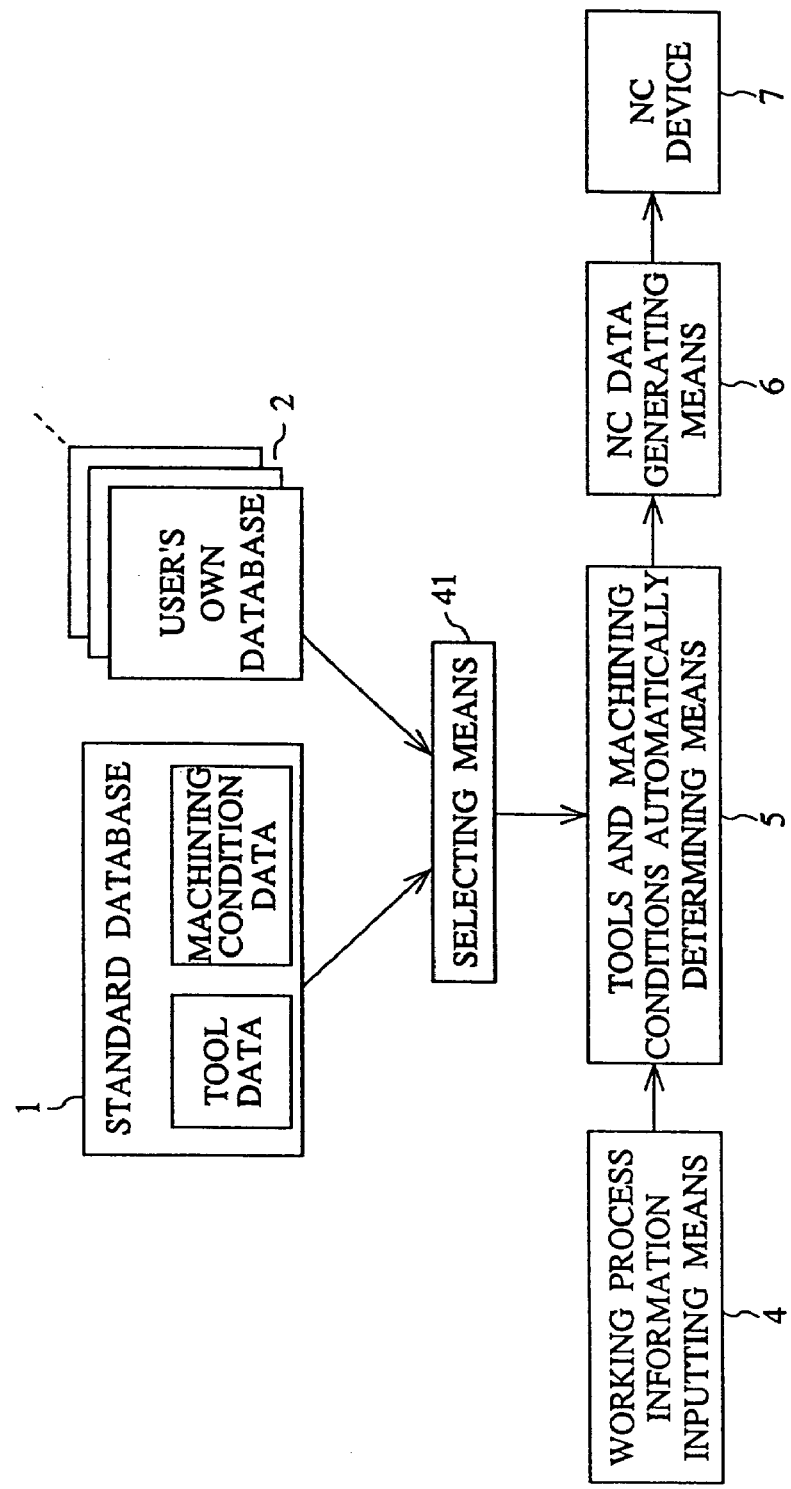
FIG. 11 illustrates a block diagram showing the NC apparatus for the machine tool of the embodiment 5 of the present invention.

FIG. 11 illustrates a block diagram of an NC apparatus for a machine tool of an embodiment of the invention. In FIG. 11, reference numeral 1 designates a standard database, reference numeral 2 designates a user's own database, reference numeral 4 designates a working process information inputting means, reference numeral 5 designates a tool and machining condition automatically determining means, reference numeral 6 designates an NC data generating means, reference numeral 7 designates an NC device, and reference numeral 41 designates a selecting means. The selection means 41 is to appoint either the aforementioned standard database 1 or the aforementioned user's own database 2 for use before an operator makes up an NC program.

Figure 12:
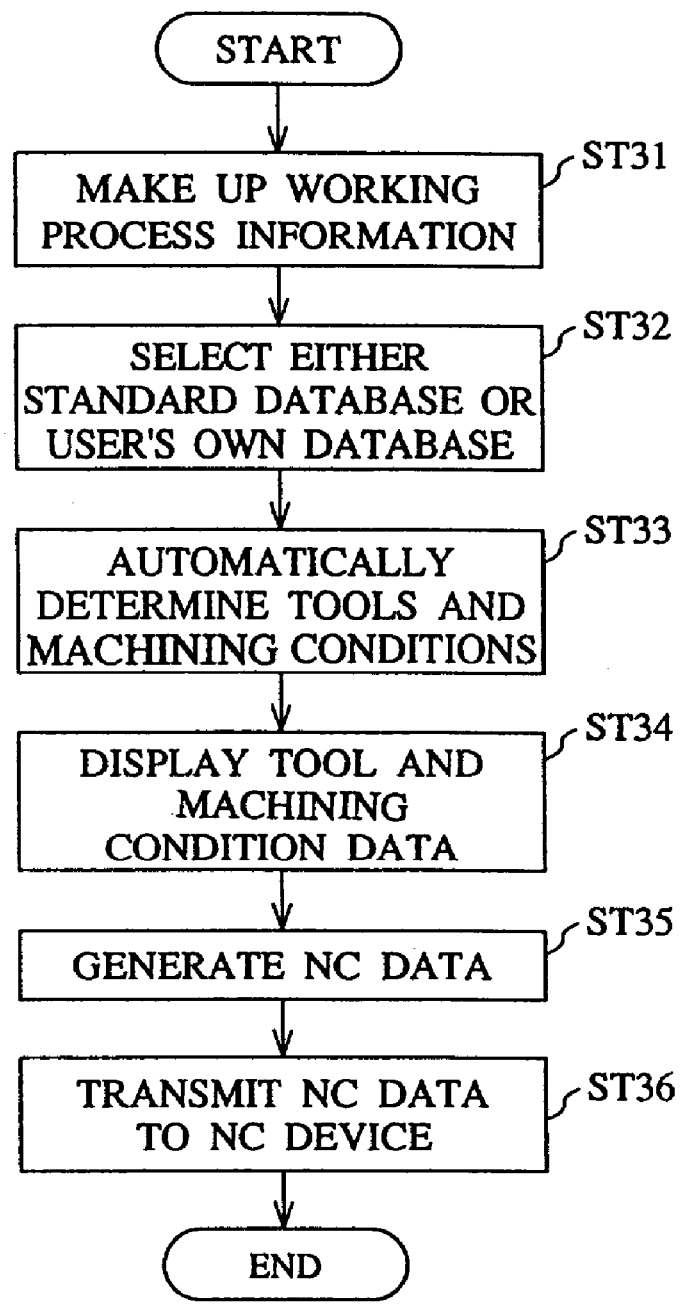
FIG. 12 illustrates a flow chart for describing the operation of the apparatus shown in FIG. 11.

Next, the operation will be described thereof. FIG. 12 illustrates a flow chart showing the procedures of manipulations and operations, and the description will be done on the basis of FIG. 12. Using the NC apparatus for the machine tool constructed as mentioned above, an operator makes up each working process information by inputting material forms, working forms, work material qualities and the like, and by dividing working processes, and so forth in conformity with NC programs making works (STEP ST31).

Next, the operator selects either the standard database 1 or the user s own database 2 with the selecting means 41 before the tools and machining conditions are automatically determined (STEP ST32). When the tools and machining conditions are automatically determined, only the aforementioned selected database is used and the tools and machining conditions are automatically determined by the tool and machining condition automatically determining means 5 (STEP ST33). The automatically determined tools and the machining conditions corresponding to the tools are displayed on a display unit (not shown) (STEP ST34). The automatically determined tool and machining condition data are transformed into NC data by the NC data generating means 6 together with the working process information (STEP ST35) to be transmitted to the NC device 7 (STEP ST36).

As mentioned above, the NC apparatus for the machine tool of this embodiment can cope with the operator's intention, that is to say, both of the cases where he wants to determine using only the standard database 1 and using only the user's own database 2 can be treated by his selection of the databases to be used before the automatic determination.

EMBODIMENT 6

Figure 13:
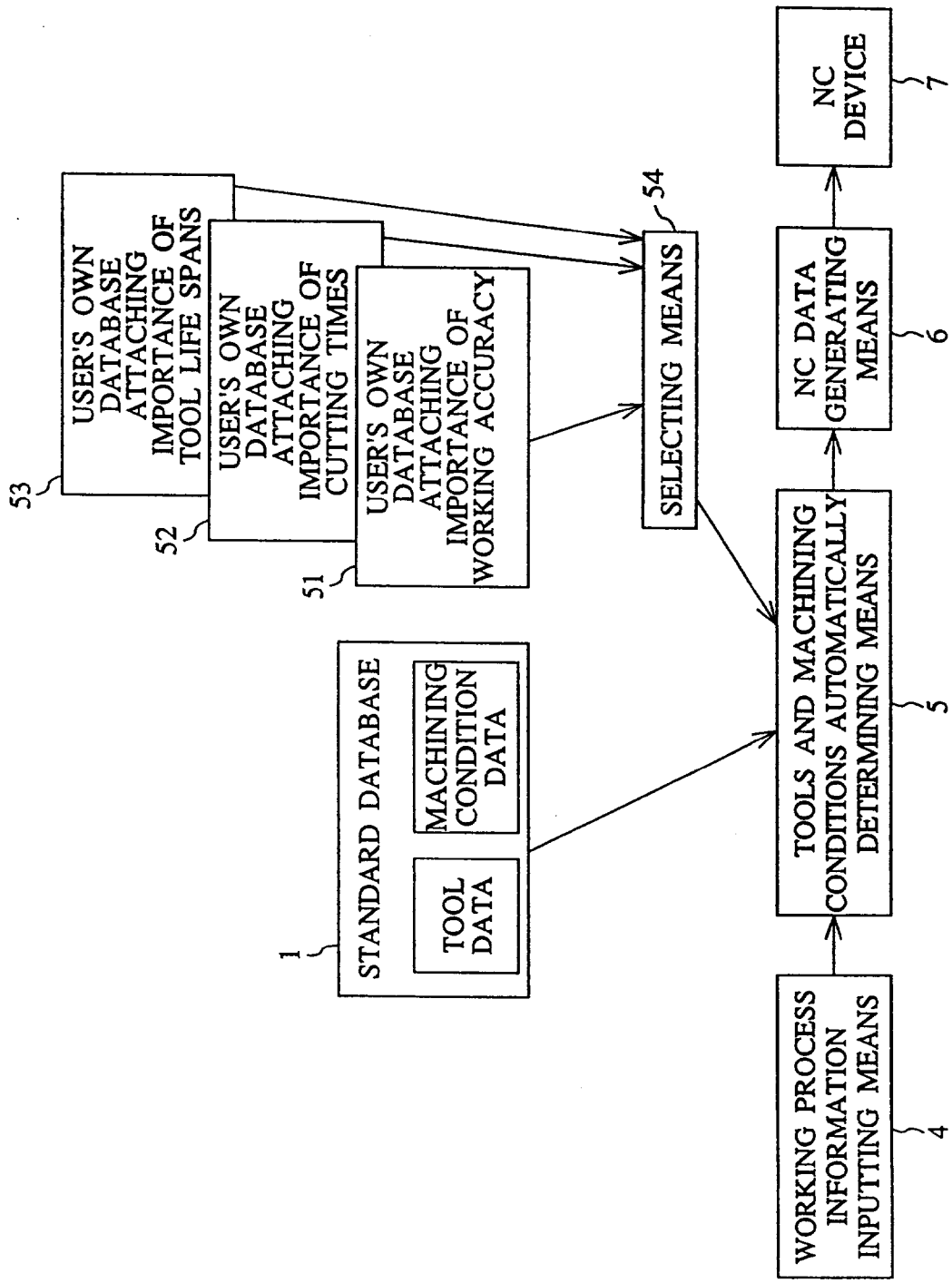
FIG. 13 illustrates a block diagram showing the NC apparatus for the machine tool of the embodiment 6 of the present invention.

FIG. 13 illustrates a block diagram of a machine tool NC apparatus of an embodiment of the invention. In FIG. 13, reference numeral 1 designates a standard database, reference numeral 51 designates a user's own database attaching the importance of working accuracy, reference numeral 52 designates a user's own database attaching the importance of cutting time, reference numeral 53 designates a user's own database attaching the importance of tool life spans, reference numeral 4 designates a working process information inputting means, reference numeral 5 designates a tool and machining condition automatically determining means, reference numeral 6 designates an NC data generating means, reference numeral 7 designates an NC device, and reference numeral 54 designates a selecting means. The selecting means 54 is for appointing a database to be used among plural user's own databases 2.

Figure 14:
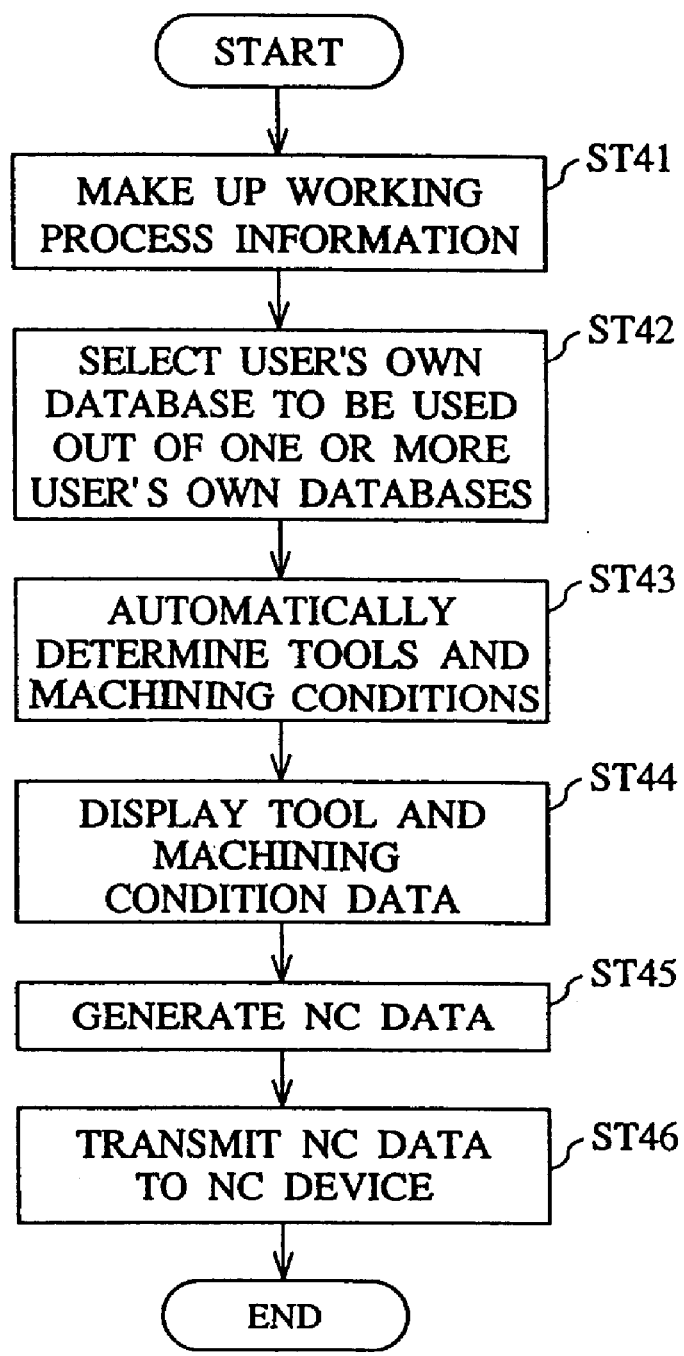
FIG. 14 illustrates a flow chart for describing the operation of the apparatus shown in FIG. 13.

Next, the operation will be described thereof. FIG. 14 illustrates a flow chart showing the procedures of manipulations and operations, and the description will be done on the basis of FIG. 14. In FIG. 13, the user's own databases 2 are composed of three databases storing user's own data, based on the knowledge and the experiences of skillful experts, respectively attaching the importance of working accuracy (or user's own database 51), cutting speeds (or user's own database 52) and tool life spans (or user's own database 53).

An operator can select a user's own database to use with the selecting means 54 before the automatic determination of the tool to be used and the machining conditions to a certain working process (STEP ST42). In case of executing the finishing requiring high working accuracy for example, it is possible to make the most of the know-how, possessed by experts by experiences, how to use which kinds of tools in which machining conditions for improving the working accuracy by selecting and using the user's own database attaching the importance of working accuracy 51.

Similarly, in the case where the operator wants to the economical working having long tool life spans or the working having possibly short working time, it is possible to select and use the user's own database attaching the importance of tool life spans 53 and the user's own database attaching the importance of cutting time 52 respectively.

EMBODIMENT 7

In the aforementioned embodiment 6, the user's own databases 2 are composed of the user's own database attaching the importance of working accuracy 51, the user's own database attaching the importance of cutting speeds 52 and the user's own database attaching the importance of tool life spans 53. Now, the user's own databases 2 may have respective user's own database attaching the importance of every material quality of work materials respectively, and respective cutting characteristics of each material quality of work materials can be utilized in the automatic determination of tools and machining conditions as the know-how.

EMBODIMENT 8

The user's own database 2 can be utilized in the form of being divided by every material quality of tools apart from the forms of the aforementioned embodiments 6 and 7.

EMBODIMENT 9

The user's own database 2 can be utilized in the form of being divided by every skillful worker apart from the forms of the aforementioned embodiments 6, 7 and 8.

EMBODIMENT 10

The user's own database 2 can be utilized in the form of being divided by every tool maker apart from the forms of the aforementioned embodiments 6, 7, 8 and 9.

EMBODIMENT 11

The user's own database 2 can be utilized in the form of being divided by every machine tool apart from the forms of the aforementioned embodiments 6, 7, 8, 9 and 10.

EMBODIMENT 12

Figure 15:
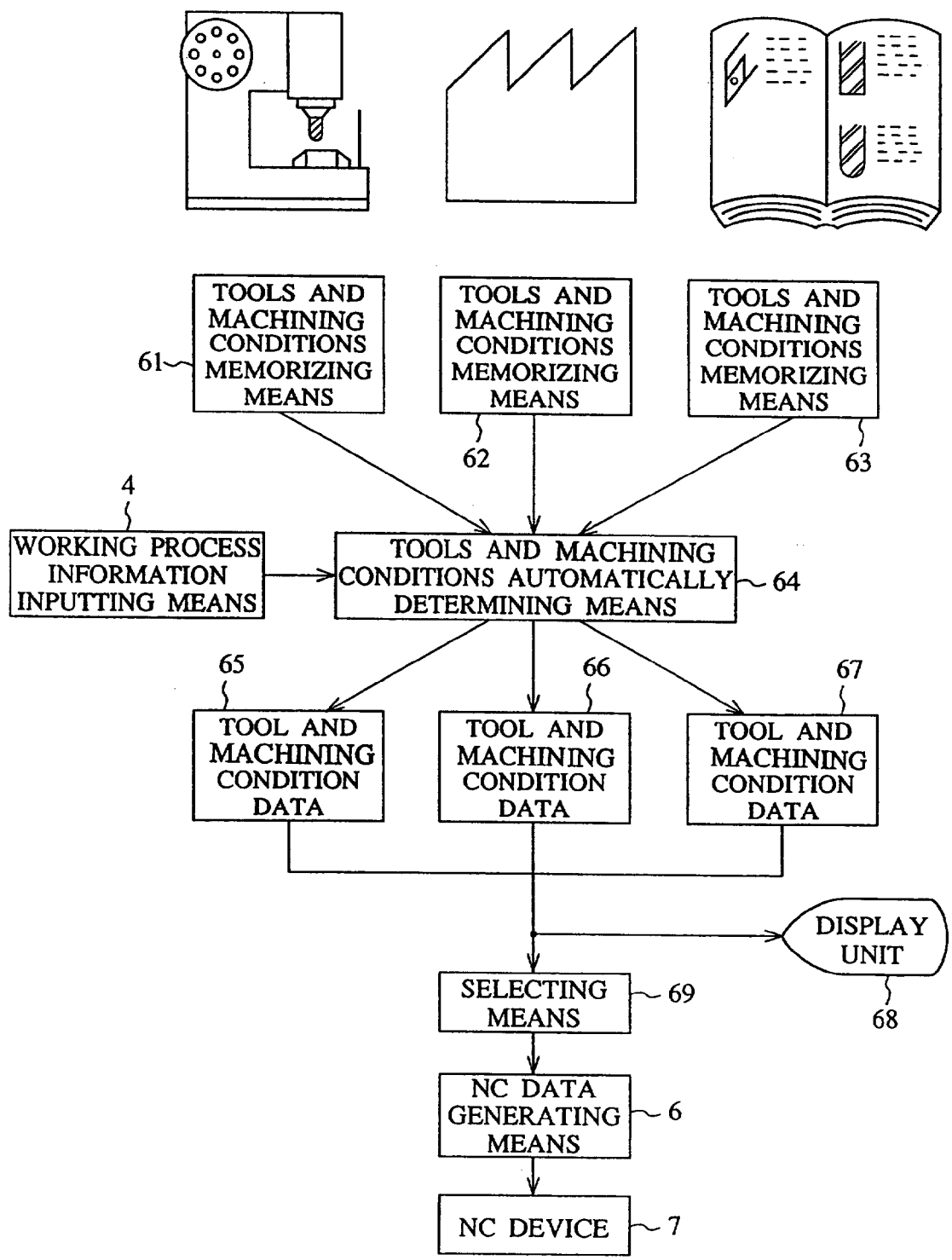
FIG. 15 illustrates a block diagram showing the NC apparatus for the machine tool of the embodiment 12 of the present invention.

FIG. 15 illustrates a block diagram of an NC apparatus for a machine tool of an embodiment of the invention. In FIG. 15, reference numeral 61 designates a tool and machining condition memorizing means memorizing the tools and the machining conditions concerning the tools attached to the magazine of a machine tool, reference numeral 62 designates a tool and machining condition memorizing means memorizing the tools and the machining conditions of the whole tools supervised at the tool warehouse of a factory, reference numeral 63 designates a tool and machining condition memorizing means memorizing the tools and the machining conditions made up from general recommended machining conditions and the like, reference numeral 4 designates a working process information inputting means, reference numeral 64 designates a tool and machining condition automatically determining means, reference numeral 65 designates the optimum tool and machining condition data determined out of the tools of the tool and machining condition memorizing means 61, reference numeral 66 designates the optimum tool and machining condition data determined out of the tools of the tool and machining condition memorizing means 62, reference numeral 67 designates the optimum tool and machining condition data determined out of the tools of the tool and machining condition memorizing means 63, reference numeral 68 designates a display unit, reference numeral 69 designates a selecting means, reference numeral 6 designates an NC data generating means, and reference numeral 7 designates an NC device. The aforementioned tool and machining condition memorizing means 61, 62 and 63 apparently memorize data different in contents or kinds respectively. These tool and machining condition memorizing means 61, 62 and 63 are equipped apart from the ordinary standard database and user's own database (both of them are not shown).

Figure 16:
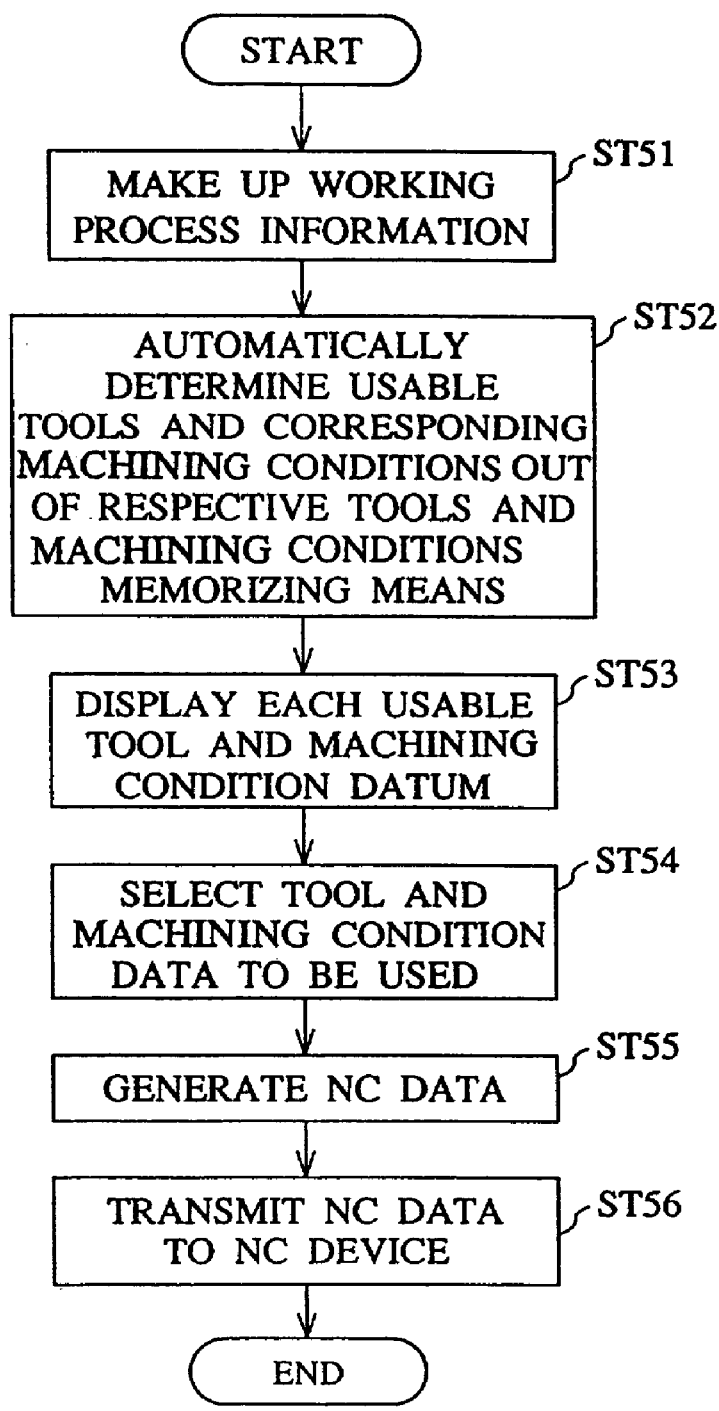
FIG. 16 illustrates a flow chart for describing the operation of the apparatus shown in FIG. 15.

Next, the operation will be described thereof. FIG. 16 illustrates a flow chart showing the procedures of manipulations and operations, and the description will be done on the basis of FIG. 16. Using the NC apparatus for the machine tool constructed as mentioned above, an operator makes up each working process information by inputting materials and working forms, and dividing working processes, and so forth in conformity with NC programs making works (STEP ST51).

Next, the tools and machining conditions to be used at each working process are automatically determined by the tool and machining condition automatically determining means 64 by receiving the working process information as the inputs (STEP ST52).

At that time, the tool and machining condition automatically determining means 64 determines the optimum tools an machining conditions among the data of the tool and machining condition memorizing means 61, the optimum tools an machining conditions among the data of the tool and machining condition memorizing means 62, and the optimum tools an machining conditions among the data of the tool and machining condition memorizing means 63 respectively concerning the tools attached to the magazine of the machine tool now.

Making the aforementioned three groups of the tools and the machining conditions display on the display unit 68

(STEP ST53), an operator determines the tools and the machining conditions to use with the consideration of the labor of exchanging tools, the working accuracy, the expenditure in case of newly purchasing the tools and the like out of the displayed tools and machining conditions, and selects the determined tools and machining conditions with the selecting means 69 (STEP ST54).

The tool and machining condition data selected as mentioned above are transformed into NC data by the NC data generating means 6 together with the working process information (STEP ST55) to be transmitted to the NC device 7 (STEP ST56).

EMBODIMENT 13

Figure 17:
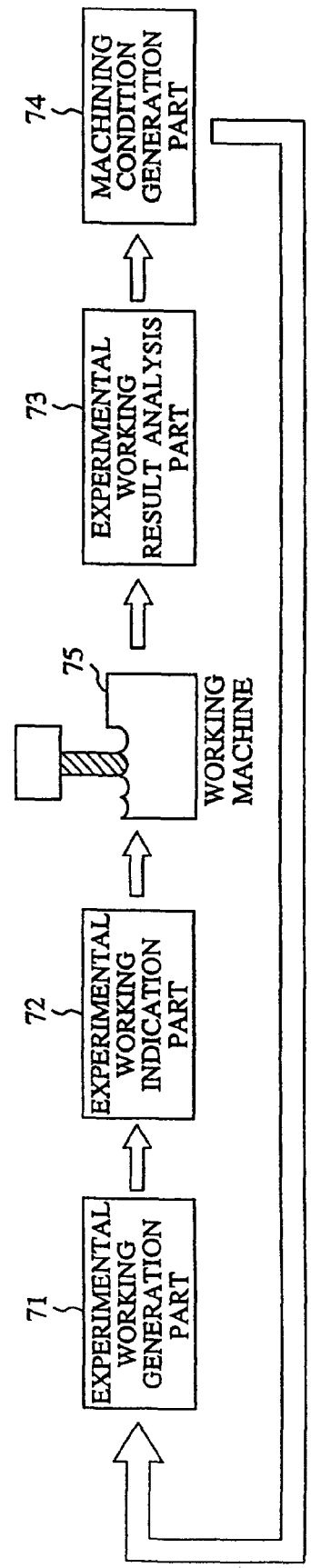
FIG. 17 illustrates a block diagram showing the NC apparatus for the machine tool of the embodiment 13 of the present invention.

FIG. 17 is a block diagram of an NC apparatus for a machine tool of an embodiment of the invention. In FIG. 17, reference numeral 71 designates an experimental working generation part, reference numeral 72 designates an experimental working indication part, reference numeral 73 designates an experimental working result analysis part, reference numeral 74 designates a machining condition generation part, and reference numeral 75 designates a working machine.

Figure 18:
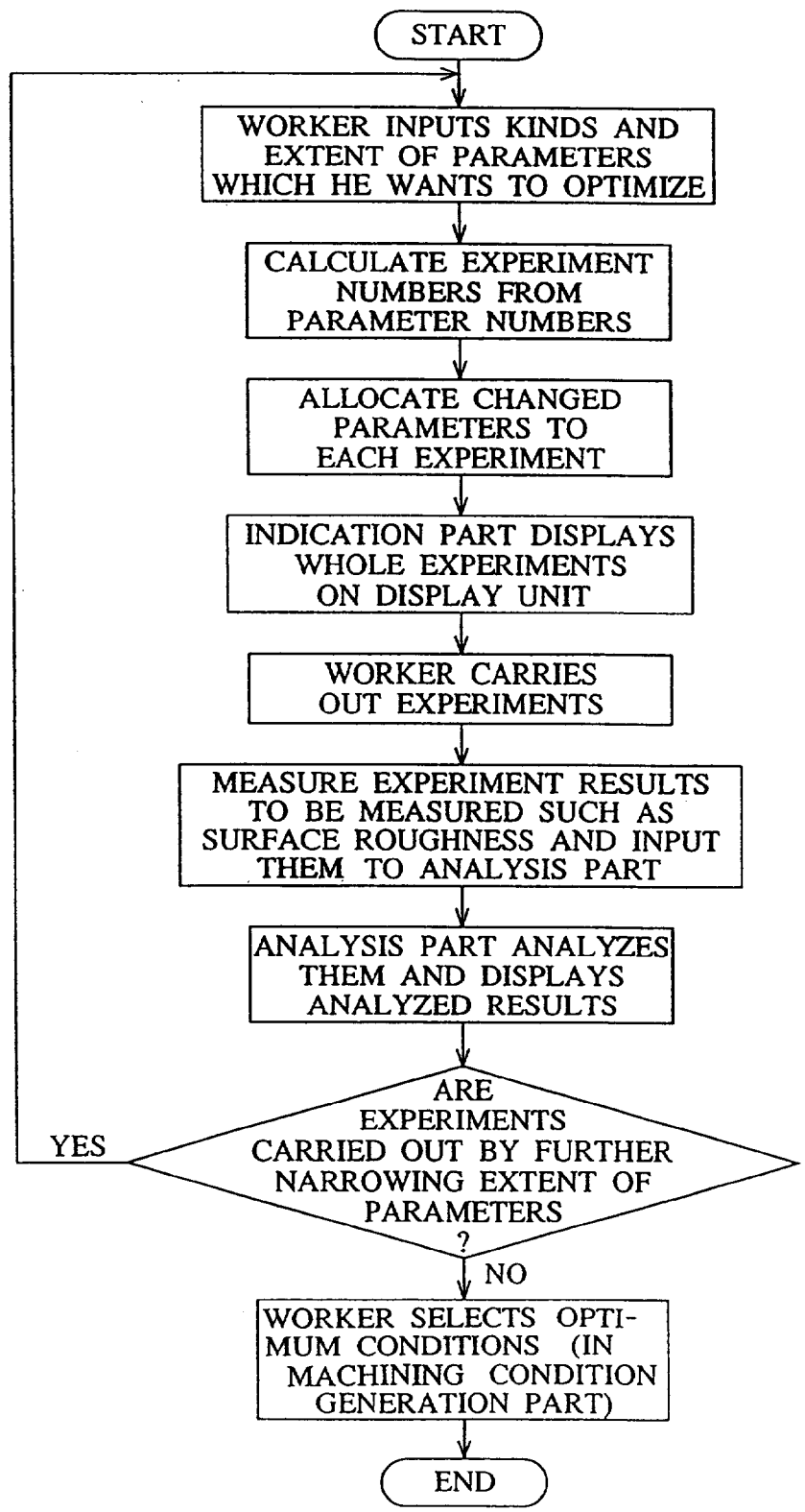
FIG. 18 illustrates a flow chart for describing the operation of the embodiment 13 of the present invention.

Next, the operation will be described. FIG. 18 is a flow chart showing the procedures of manipulations and operations, and the following description is based on basis of FIG. 18. At first, a worker selects the machining conditions which he wants to experimentally change and the values which he wants to optimize at that time, for example working time, surface roughness, the degree of consumption of tools, and so on, and he inputs the extent of the machining conditions and notches to be changed in an experiment.

Now, supposing that the worker wants to find the machining conditions having the optimum surface roughness, then he would concretely examine the changes in the surface roughness by changing the cutting speed and the machining fluid pressure. Supposing that the cutting speed is changeable from 200 notches, being the set value on a control panel, to the 300 notches in increments of every 25 notches, and the fluid pressure is changeable from 2 notches to 8 notches in increments of every 2 notches.

The worker selects the machining fluid pressure and the cutting speed out of all the parameters capable of being set on the control panel, which parameters are displayed on a display unit. The method of the selection is supposed to be, for example: moving the cursor on each item displayed on the screen in a table format, pushing down the input key on the item which he wants to select, and displaying the selected item with inverted characters as the result of the selection.

Next, the extent of the working experiment, which is wanted by the worker, and its notch widths are inputted to each item. As mentioned above, because the cutting speed is changed from 200 notches to 300 notches in 25 notch increments and the cutting pressure is changed from 2 notches to 8 notches in increments of every 2 notches, such numerals as 200, 300, 25, 2, 8, 2 and so on are inputted with a ten-key keyboard, etc.

Next, the experimental working generation part 71 displays the number of experiments required, calculated from the aforementioned input results. In this case, if all combinations are selected, the number of experiments comes to 20. Although the order of the experiments is randomized in practice, the experiments are displayed as is, because the display is only for confirmation. This is shown in FIG. 19. The randomization is for excluding the possibility of the appearance of specified phenomena in case of continuously changing the parameters, and it is commonly practiced in experiments. In the case where there are many parameters that can to be changed and the notch increments are small, the number of experiments is explosively enlarged, the experiments should be allocated by utilizing an orthogonal table (which is utilized in the analysis of experimental data and so on) and the number of experiments should be kept constant, accordingly. The displayed number of experiments on the screen is controlled to be about 32 at the maximum in accordance with the kind of working machine, too. (It depends on the differences in working time, costs of the experiments, and so forth.) The reason of the restriction of the number for experiments is that so many experiments take much labor.

Moreover, when an experimental working is actually done, it is, of course, necessary to set the apparatus in a state so that the experiment numbers is displayed on the screen of the display unit, and so that the display of the experiment practiced at the time and a display of the experiments not practiced are made, and further that the operator can call out the display at any time when he needs it, even if the display are not made. Besides, the machining fluid pressures and the cutting speeds are automatically set in the NC apparatus.

Now, the worker executes 20 selected experiments to input the results into the experimental working result analysis part 73. In this case, the worker measures the surface roughness and inputs the result.

Figure 21A:
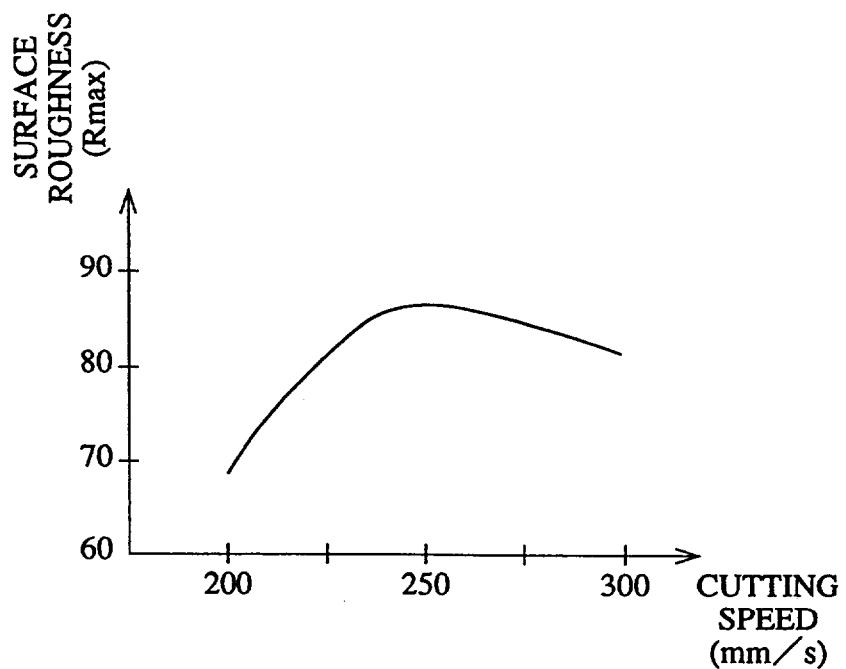
FIG. 21(*a*) and FIG. 21(*b*) illustrate explanatory graphs of the embodiment 13 of the present invention.
Figure 21B:
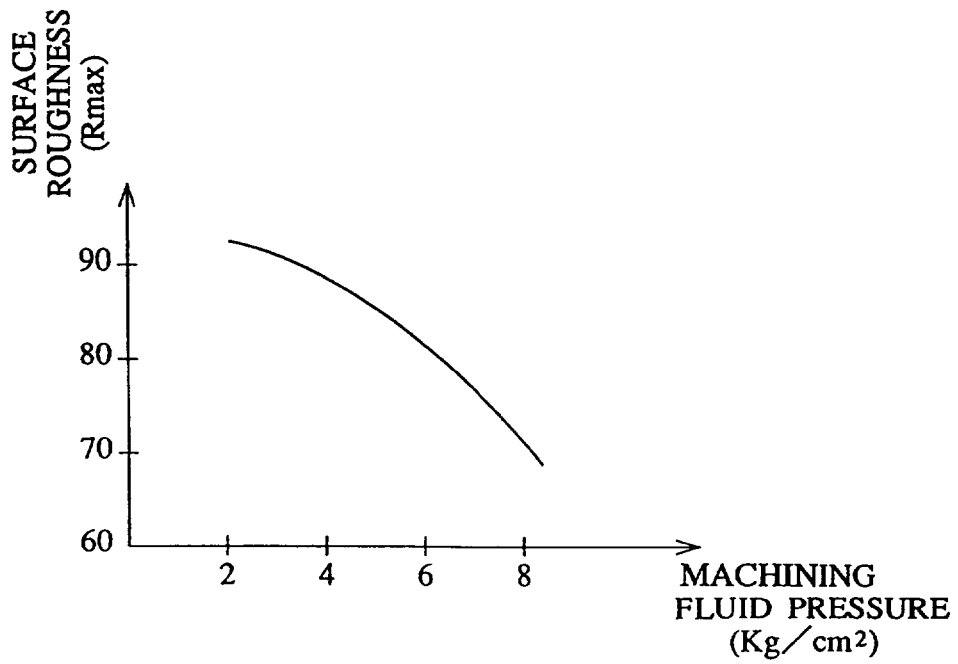

After all inputs are completed, as shown in FIG. 20, the experimental working result analysis part 73 begins to analyze the result. In this case, there cannot be found a relationship, called and interaction, between the surface roughness and the cutting speeds and a relationship between the surface roughness and the machining fluid pressures that are displayed in graphs accordingly. These graphs are shown in FIG. 21(a) and FIG. 21(b).

In this case, the relationship $$Rmax=A*Speed+C*Speed*Pressure+B*Pressure$$

was supposed, in order to execute a regression analysis, and the value of coefficient C was judged to be negligibly small (or the value is within the extent of errors statistically, and to differentiate them is meaningless), each graph is solely displayed accordingly.

Looking at these displays, the worker can know that it is better to set the machining fluid pressure higher, near 250 notches, in cutting speed, then he comes to select the maximum notch to be set, provided that the worker is expected to select a point of compromise with his own consideration for the relationship between the surface roughness to be obtained and the running cost in the case where machining fluid has a particular character and is very expensive. That means that this embodiment can help the achieve the worker's goals.

EMBODIMENT 14

Figure 22:
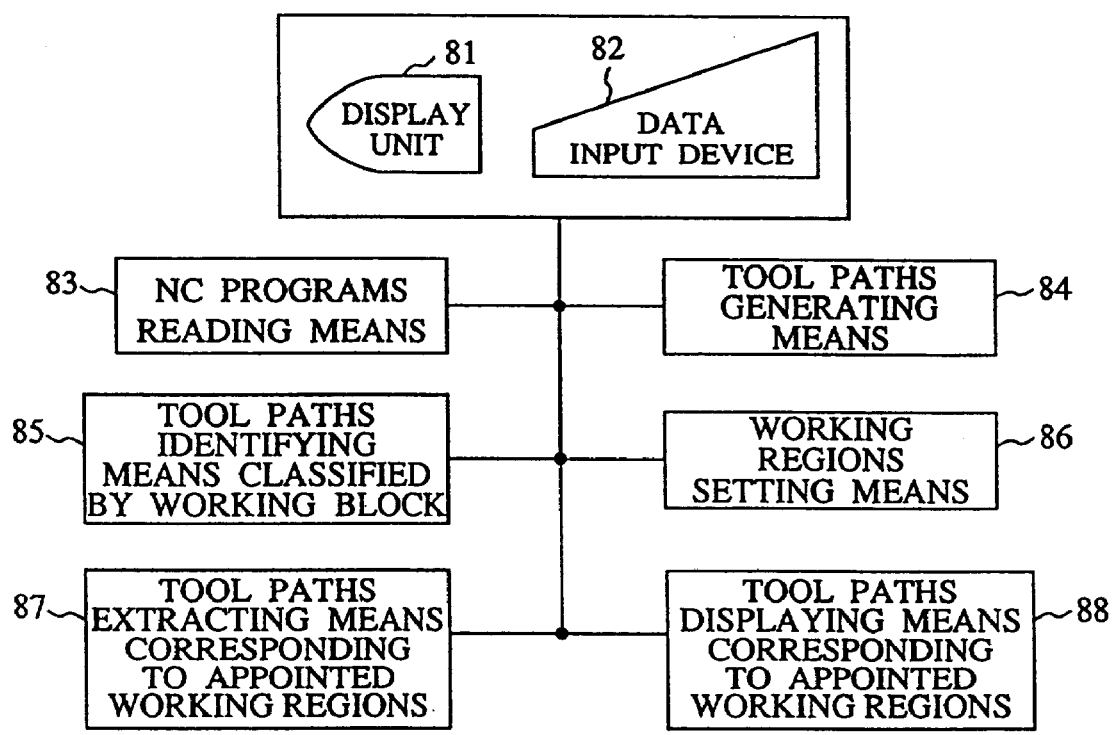
FIG. 22 illustrates a block diagram showing the NC apparatus for the machine tool of the embodiment 14 of the present invention.

FIG. 22 illustrates a block diagram of an NC apparatus for a machine tool of an embodiment of the invention. In FIG. 22, reference numeral 81 designates a display unit, reference numeral 82 designates a data input device, reference numeral 83 designates an NC program reading means, reference numeral 84 designates a tool path generating means generating tool paths on the basis of an NC program, reference numeral 85 designates a tool path identifying means classified by a working block adding an identifier so as to be able to identify by dividing the generated tool paths into fine segments by the working block, reference numeral 86 designates a working region setting means appointing desired regions to one or more working regions displayed on the display unit 81, reference numeral 87 designates a tool path extracting means corresponding to the appointed working region extracting the tool paths corresponding to the appointed working regions, and reference numeral 88 designates a tool path displaying means corresponding to the appointed working region specifying the tool paths corresponding to the existing extent of the appointed working regions to display the specified tool paths on the display unit 81.

Figure 24:
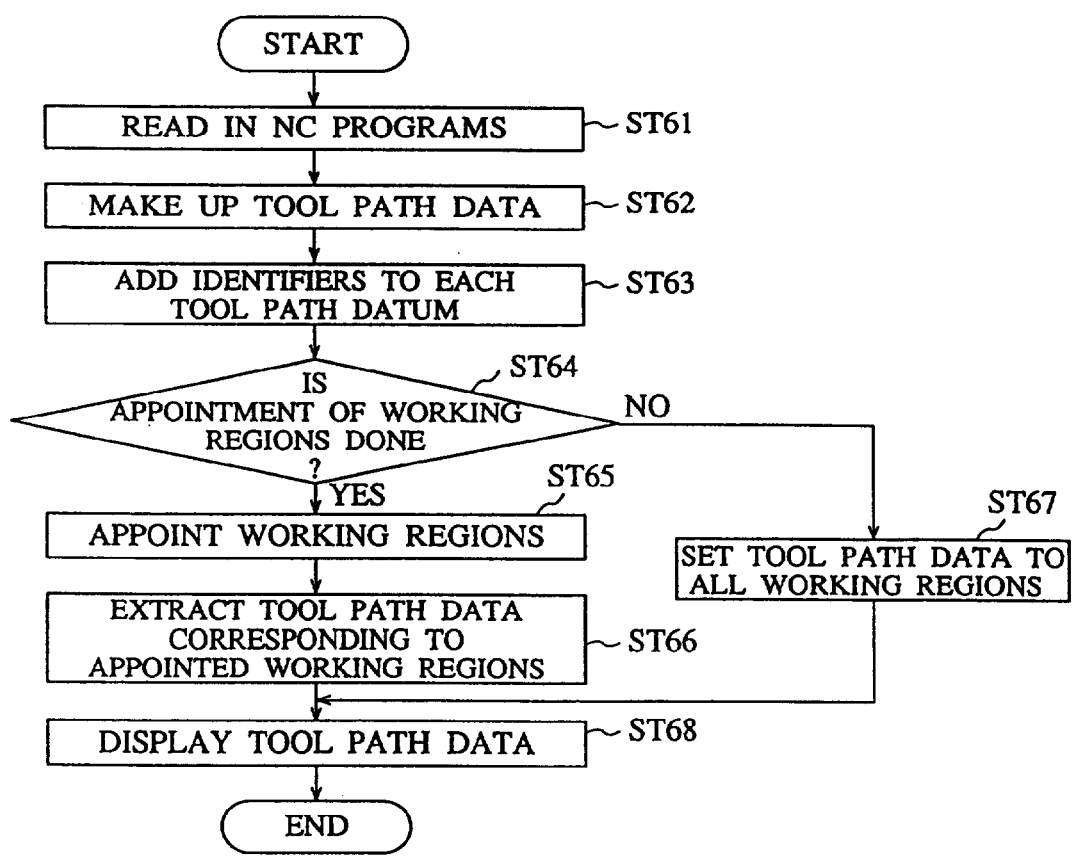
FIG. 24 illustrates a flow chart for describing the operation of the NC apparatus of the embodiment 14.

Next, the operation will be described thereof. FIG. 24 illustrates a flow chart showing the procedures of manipulations and operations, and the description will be done on the basis of FIG. 24. At first, the apparatus reads in the NC programs made up by an operator (STEP ST61). The read NC programs are transformed into working blocks, and each of the transformed working blocks becomes tool path data (STEP ST62). That is to say, the coordinate value data in the data of the working blocks are transformed into a display coordinate system for displaying them on the display unit 81, and the coordinate data are added to the data of the working blocks to become the tool path data. Identifiers, being sequence numbers, are added to each of the made up tool path data so as to enable the high speed retrieval (STEP ST63).

Now, the working blocks will be described briefly. In an NC program, the tool path information for working one or more working regions (or holes, pockets, ditches, and so on) is expressed, and the working block expresses a certain state of the tool paths. That is to say, a working region is ordinarily expressed by plural working blocks. Then, new block information is described every change of the state (for example, a case where a straight line changes to a circular arc, a case where a feed speed changes, and the like). The generally used blocks are concretely composed of the next seven words. The words are composed by arranging address characters first, the codes of positive or negative in case of necessity next, and the data of numerals after those.

(1) sequence number word: showing the position of the block or the group of blocks. A numeral is added after the address of N. The digit of the numeral is prescribed in the format detailed classification in each NC apparatus. The numeral has ordinarily three digits.

(2) preparatory function word (G function): a word for appointing the mode of the control motion of the block. The word appoints the mode with the combination of the two-digit numeral following the address G.

(3) dimension word: showing the move positions or angles of tools in the form of adding a numeral after a sign such as X, Y, Z, A, B, C and the like.

(4) feed function word (F function): appointing feed speeds with a numeral following the address F. The digit of the numeral is appointed in the format specification of each NC apparatus.

(5) main spindle function word (S function): appointing the rotation numbers of a main spindle.

(6) tool function word (T function): a function for appointing tools. The word appoints tools with a numeral following the address T. The digit of the numeral is appointed in the format specification of each NC apparatus.

(7) miscellaneous function word (M function): commanding on-off control and the like at the machine tool side. The word commands on-off control and the like with a two-digit numeral following the address M. The relationship of two-digit codes and functions are prescribed in Japanese Industrial Standard (JIS) B6314. Some machines often add particular functions to the contents in JIS B6314.

The coordinate values described in working blocks express actual tool positions (or the coordinate system of the machine tool). On the other hand, tool path data are the data for displaying tool paths on the display unit, then they are the data constructed by adding the coordinate values in the display coordinate system of the display unit which values are transformed from the actual tool position coordinate values into the data of the working blocks. That is to say, the difference between the tool path data and the working blocks is the difference that the coordinate value data of the display coordinate system exist or not. Besides, the information of the identifiers which are added to the tool path data includes the name information of the working regions on the NC programs, then the apparatus can specify working regions with the identifiers.

The operator judges whether he appoints the working regions which he wants to locally display the tool paths or not (STEP ST 64). If he appoints the working regions, he appoints the visible outlines which he wants to display the tool paths to every displayed working region (STEP ST65). And, the apparatus identifies the working kinds, the existing extent and the like to the appointed visible outlines by the operator for extracting the tool path data corresponding to the appointed working regions by identifying the aforementioned identifiers (STEP ST66).

Since the tool path data are connected to the working regions by the identifiers, the appointment of the visible outlines can be done by appointing the cursor position on the screen. Or, it may also be applicable to display the summary of the working regions defined in the NC programs in a table format having the sequence numbers in the order of the programs and the names of the working regions (or working kinds) to appoint working regions by appointing the sequence numbers.

The procedures from the appointment of the working regions which the operator wants to display locally to the extraction of the tool path data come to as follows: "The operator determines visible outlines."→"The working regions which he wants to display locally are determined."→"The identifiers corresponding to the determined working regions are determined."→"The tool path data having the same names as the names of the working regions described in the determined identifiers are retrieved."→"The tool path data are extracted by the retrieving."

If the operator does not determine working regions, the tool path data to all of the working regions in the NC programs are set as the tool paths to be displayed (STEP ST67).

Next, the correction calculations are executed to the tool path data set as mentioned above to make them to become incremental movement quantities of every working block. Besides, the corrections of the tool diameters and tool lengths to be used are made, and the renewing processes of coordinate values, too, are made. The renewal of the coordinate values to the display screen of the display unit 81 to these data are done. As a result of the aforementioned processes, in the case where the operator appoints the working regions which he wants to display locally, only the tool paths corresponding to the working regions are displayed on the display screen of the display unit 81 (STEP ST68).

Figure 23:
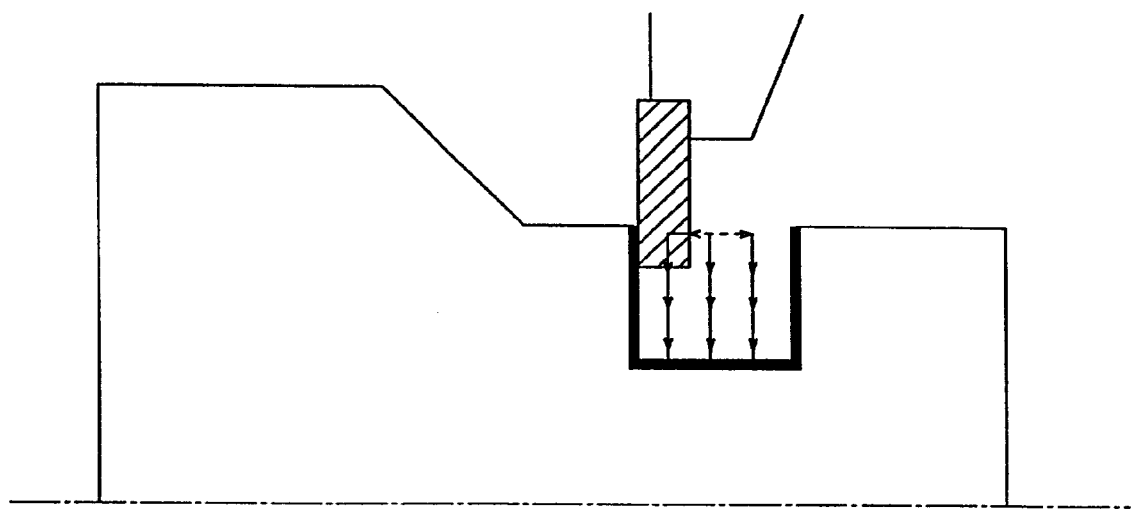
FIG. 23 illustrates a display screen picture of the NC apparatus of the embodiment 14.

FIG. 23 illustrates an example of the display screen of the present embodiment. Using an NC program for lathes, an operator can make a working region be displayed as shown in FIG. 23, and can make the tool paths corresponding to the working region be display by appointing a ditch part to the working region. Moreover, it is of course possible to display the summary of the kinds and numbers etc. of the working regions in an NC program in a form of a menu to appoint them by selecting the menu when the operator locally appoints working regions.

EMBODIMENT 15

Figure 25:
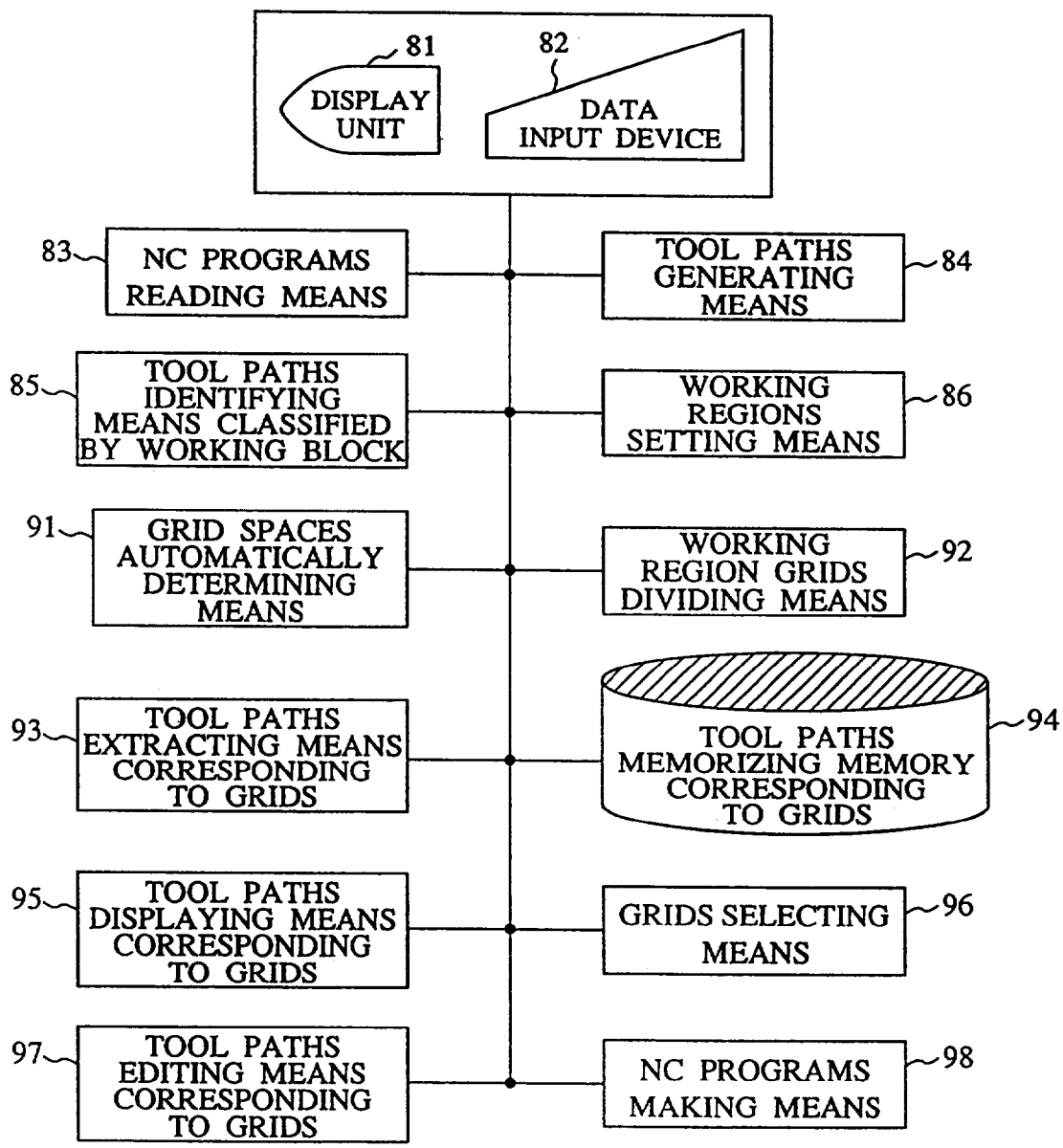
FIG. 25 illustrates a block diagram showing the NC apparatus for the machine tool of the embodiment 15 of the present invention.

FIG. 25 illustrates a block diagram of an NC apparatus for a machine tool of an embodiment of the invention. In FIG. 25, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 91 designates a grid space automatically determining means operating the spaces of dividing the appointed working region into grids (or two-dimensional grid-like state) on the basis of the existing extent of the appointed working region, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid dividing the appointed working regions and the tool paths corresponding to the appointed working regions into grids on the basis of the operated spaces for displaying them on the display unit 81, reference numeral 96 designates a grid selecting means for appointing the displayed tool paths by the divided grid, reference numeral 97 designates a tool path editing means corresponding to a grid modifying the tool paths appointed by the grid selecting means 96 to give the apparatus editing data for making up a new NC program on the basis of the modified tool paths, and reference numeral 98 designates an NC program making means.

Figure 27:
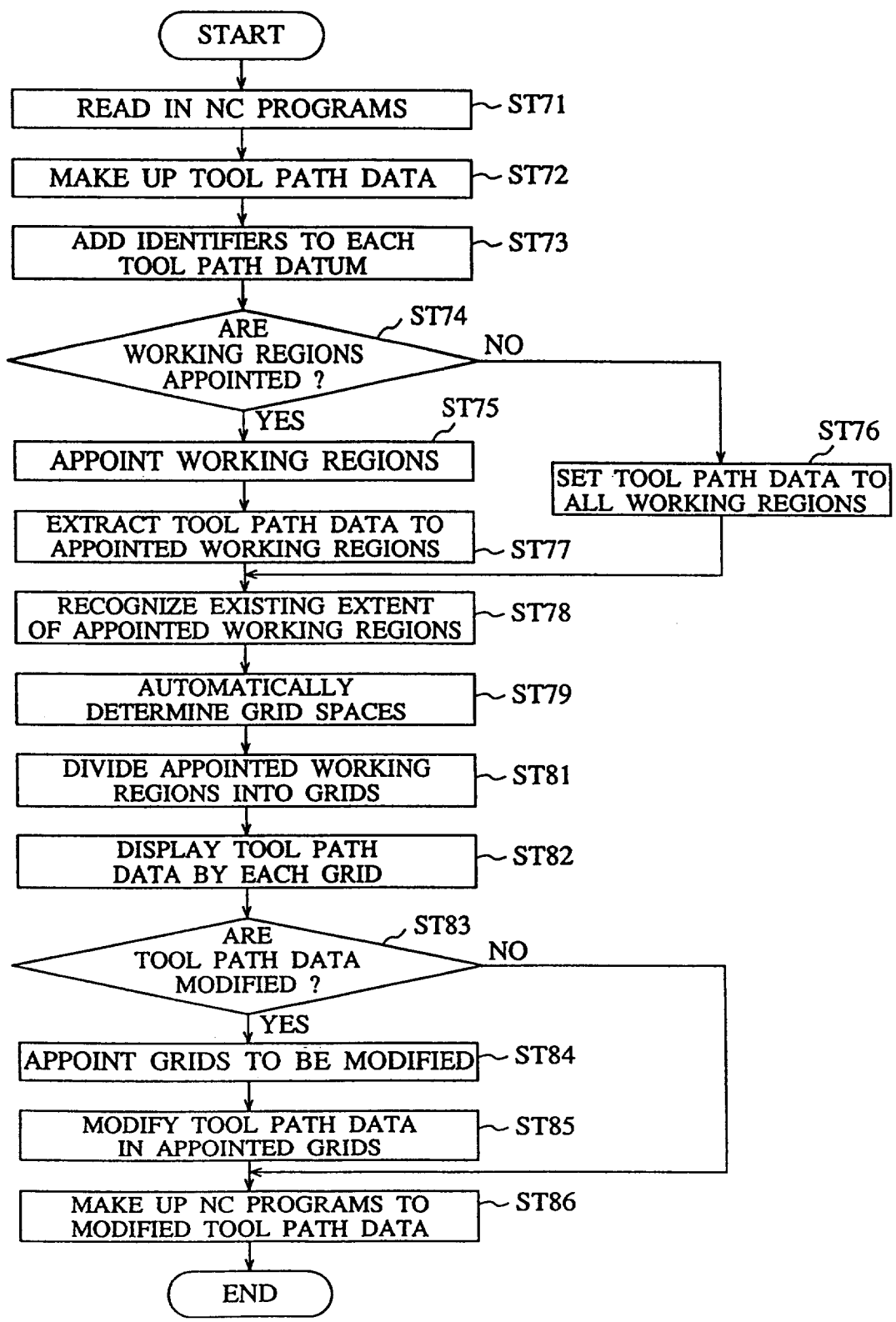
FIG. 27 illustrates a flow chart for describing the operation of the NC apparatus of the embodiment 15.

Next, the operation will be described thereof. FIG. 27 illustrates a flow chart showing the procedures of manipulations and operations, and the description will be done on the basis of FIG. 27. The first process of reading in the NC program made up by an operator and of the local appointment of working regions to all of the working regions in the displayed NC program on the display unit 81 by the operator is identical to that of the embodiment 14 (STEP ST71–STEP ST77).

Next, the existing extent of the working regions appointed by the operator is automatically identified by the apparatus by calculating the minimum coordinate values and the maximum coordinate values displayed on the display unit 81 (STEP ST78). Then, the space of dividing the working regions appointed in accordance with the aforementioned existing extent into grids is determined in conformity with a certain evaluation criterion (STEP ST79). For example, supposing that the existing extent of the Y coordinate values of an appointed working region is 32.6 mm, and the evaluation criterion is a criterion to divide the working region into ten pieces, the space of dividing the working region into grids becomes 3.26 mm. It is of course possible to display the aforementioned evaluation criterion on the display screen of the display unit 81 for the operator's modification to a different criterion.

Moreover, there is another evaluation criterion "division number" other than the aforementioned "division width". The evaluation criterion is initialized in accordance with the size of the display screen of the display unit 81 at first, and the operator can refer to the initialized value and can modify it.

Next, the working region appointed in accordance with the aforementioned division space is divided into grids to identify it (STEP ST81). That is to say, which part (or extent) of the visible outlines of the working region is included in each of the divided grids is identified. Then, the working path data corresponding to the visible outlines of the working region included in each grid are identified by retrieving the identifiers and the coordinate values of the working region, and the tool path data of each grid obtained as a result of this identification are displayed on the display screen of the display unit 81 together with the visible outlines of the working region (STEP ST82). The reason why the identifiers and the coordinate values are used is that specifying the tool paths to a working region is only possible by the use of the identifiers, but that the tool paths in some localized parts (or in grids) in the specified working region can not identified until the coordinate values of them are given. That is to say, the tool paths of the whole of a certain working region can be identified with the identifiers, and which part of the working region the tool paths correspond to is specified with the coordinate values. Besides, the tool path data of each of the displayed grids are memorized in the tool path memorizing memory corresponding to a grid 94.

Figure 26:
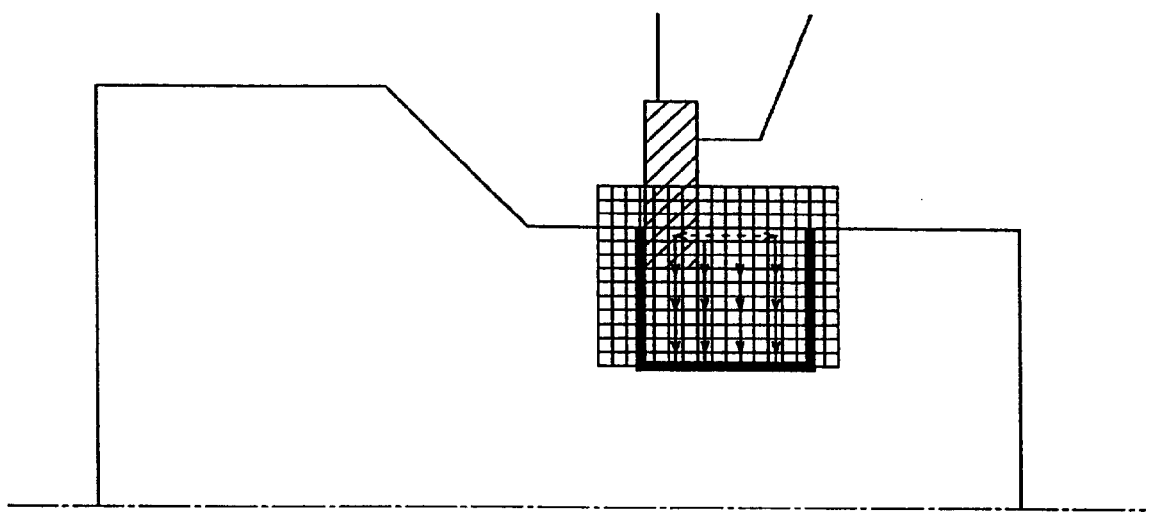
FIG. 26 illustrates a display screen picture of the NC apparatus of the embodiment 15.

Next, when the operator tries to locally modify the displayed tool paths (STEP ST83), he selects the grids including the tool paths which he tries to modify locally (or only the grids before the modification, which grids arrow marks are attached to in FIG. 26) (STEP ST84). Then, he modifies the tool paths in the grids selected on the display screen (STEP ST85). As for the modified tool paths, it is checked whether the modified tool paths are in the visible outlines of the working region or not. And, if the modified tool paths are within the visible outlines, the tool path memorizing memory corresponding to a grid 94 is retrieved, and the tool path data modified in the corresponding working region and the tool path data following the tool path data modified in the corresponding working region are renewed, and further the renewed tool path data are again memorized in the tool path memorizing memory corresponding to a grid 94 (STEP ST86). Namely, in this step, it is checked whether the tool paths modified by the operator are defined outside the working regions or not, and after that, the process of renewing (or modifying) the modified tool path data and the following tool path data is executed in the working region. As a result of the processes mentioned above, the locally modified NC program is resulted to be made up by locally modifying the tool paths corresponding to the working region appointed by the operator after selecting grids.

As for the method of the manipulations of selecting grids, for example, following methods are used, that is to say, the method appointing grids by the position of the cursor on the screen, the method appointing grids by the numbers given to each grid, and the like. In case of the appointment of a region, all of the grid including the region can be selected by appointing "selecting all of the region". Besides, the numbers of grids are given in conformity to a rule on the display surface. (For example, a rule as follows: the screen of display unit 81 is regarded as an X-Y plane at first, then numbers are given to the X coordinates from its minimum value to its maximum value in order at the minimum value of the Y coordinate. If the X coordinates reached to its maximum value, the Y coordinate value is increased by the width of the grids, then numbers are similarly given to the X coordinates from its minimum value to its maximum value by scanning.) Moreover, when the tool path data are written in the tool path memorizing memory corresponding to a grid 94, their addresses are related to the grid numbers in a one to one correspondence.

When the grids which are wanted to be locally modified are selected, the measurement values of the tool paths included in the grids are displayed. These measurement values are not the coordinate values of the display coordinate system, but the coordinate values of working blocks (or actual working coordinate values). The method of displaying is either to directly display coordinate values on the tool paths inside the grids or to display the coordinate values on the same screen in a table format. The operator appoints (or inputs) the modified coordinate values after he ascertains the coordinate values. The tool path data memorized in the memory 94 is composed by adding the corresponding working regions, the coordinate values in the display coordinate system and grid numbers to the working block information as the identifier information. The information which the operator modifies is the coordinate values of working blocks, then the extent being influenced by the modification is absolutely the tool path data in the working region. The NC program can be modified by renewing the tool path data having modified.

FIG. 26 illustrates an example of the display screen of the present embodiment. As compared to the aforementioned NC program for lathes shown in FIG. 23, the ditch part is divided into grids, and the operator selects plural grids to the divided grids, and further the tool paths which were fed three times to Z-axis are fed four times by modifying, then the modified tool paths are shown in FIG. 26. It is of course possible to select single grid for modifying the coordinate values of the tool paths locally.

EMBODIMENT 16

Figure 28:
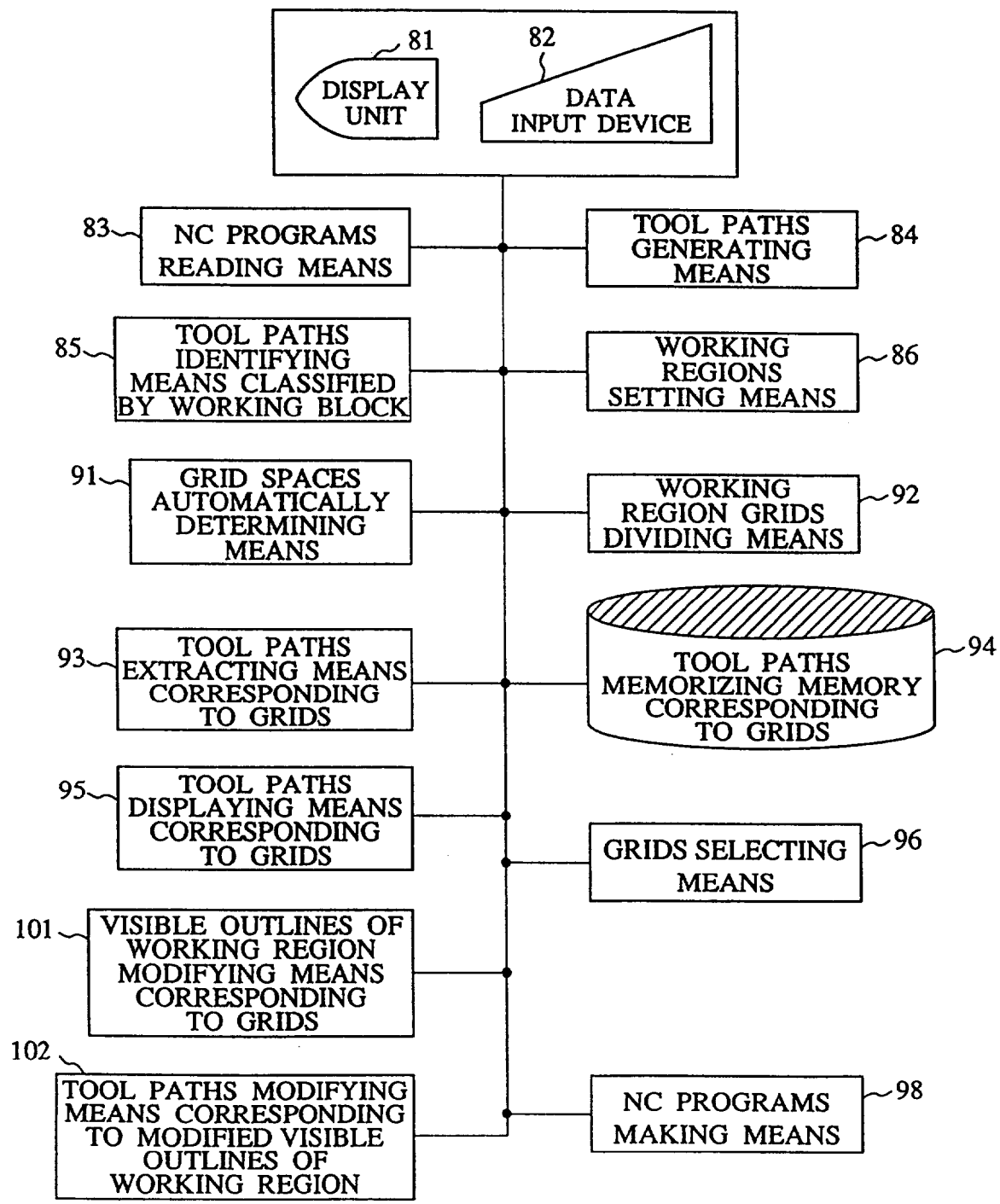
FIG. 28 illustrates a block diagram showing the NC apparatus for the machine tool of the embodiment 16 of the present invention.

FIG. 28 illustrates a block diagram of an NC apparatus for a machine tool of an embodiment of the invention. In FIG. 28, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 91 designates a grid space automatically determining means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 98 designates an NC program making means, reference numeral 101 designates a visible outline of a working region modifying means corresponding to a grid modifying the visible outlines of the working regions appointed by the grid selecting means 96, and reference numeral 102 designates a tool path modifying means corresponding to a modified visible outline of a working region modifying tool paths in connection with the working regions modified by the visible outline of a working region modifying means corresponding to a grid 101.

Figure 30:
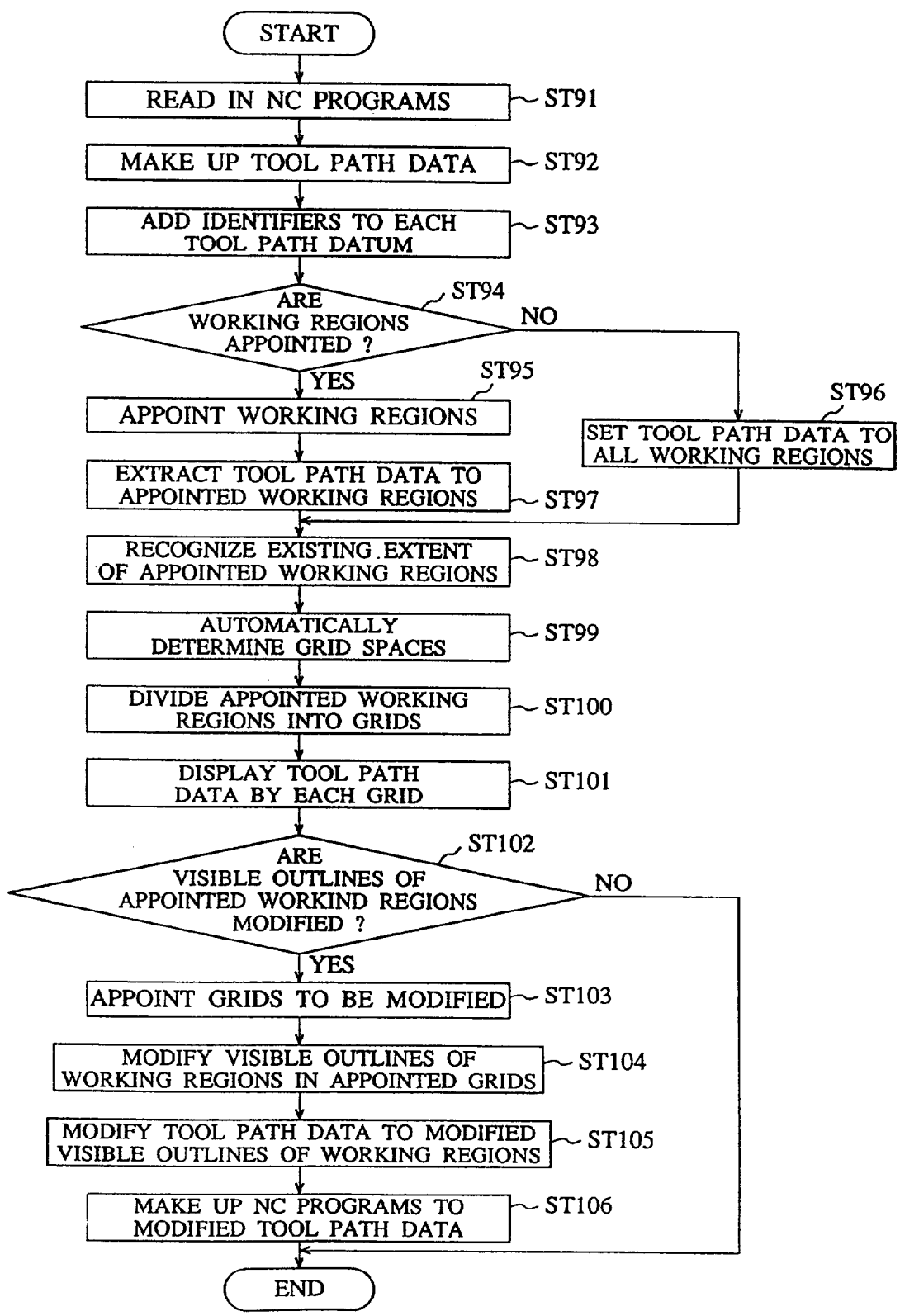
FIG. 30 illustrates a flow chart for describing the operation of the NC apparatus of the embodiment 16.

Next, the operation will be described thereof. FIG. 30 illustrates a flow chart showing the procedures of manipulations and operations, and the description will be done on the basis of FIG. 30. The first process of reading in the NC program made up by an operator, the operator's locally appointing working regions to all of the working regions in the NC program displayed on the display unit 81, dividing the appointed working regions into grids, and displaying the tool paths of each of divided the grids is identical to that of the embodiment 15 (STEP ST91–STEP ST101).

Next, when the operator wants to modify the visible outlines of the displayed working regions locally (STEP ST102), he selects the grids including the visible outlines of the working regions being wanted to be modified locally (STEP ST103). When he selects the grids including the visible outlines which he wants to locally modify, the tool paths memorizing memory corresponding to grids 94 is retrieved, and the working regions which he wants to modify are identified. Then, the parameters set by the NC programs concerning the working regions are displayed on the same display screen. These parameters are, for example, if the working region is a ditch, the values of the ditch width and the ditch depth. The operator modifies the visible outlines of the working regions in the grids by ascertaining the displayed parameters and modifying the parameters to the values which he wants to modify (STEP ST104). Accordingly, the tool paths are modified so as to correspond to the modified working regions (STEP ST105). To the modified tool paths, the aforementioned correction calculations and interpolation processes are executed again, and they are transformed into the tool path data to be memorized in the tool path memorizing memory corresponding to a grid 94 (STEP ST106).

As a result of the processes mentioned above, the locally modified NC program is resulted to be made up by locally modifying the tool paths corresponding to the working regions appointed by the operator after selecting grids.

Moreover, the tool path memorizing memory corresponding to a grid 94 in case of the embodiment 16 has the information of the visible outlines, too, attached to the tool path information included in the grids apart from that of the embodiment 15. In this information, there are included the corresponding working regions, their input parameters and the coordinate value data in the display coordinate system as the identifier information. That is to say, the tool path memorizing memory corresponding to a grid 94 in the present embodiment includes both the tool path data in accordance with the grid numbers and the visible outline data. The grids only including the visible outlines can be selected by retrieving the memory 94, and the aforementioned processes can be executed.

Figure 29:
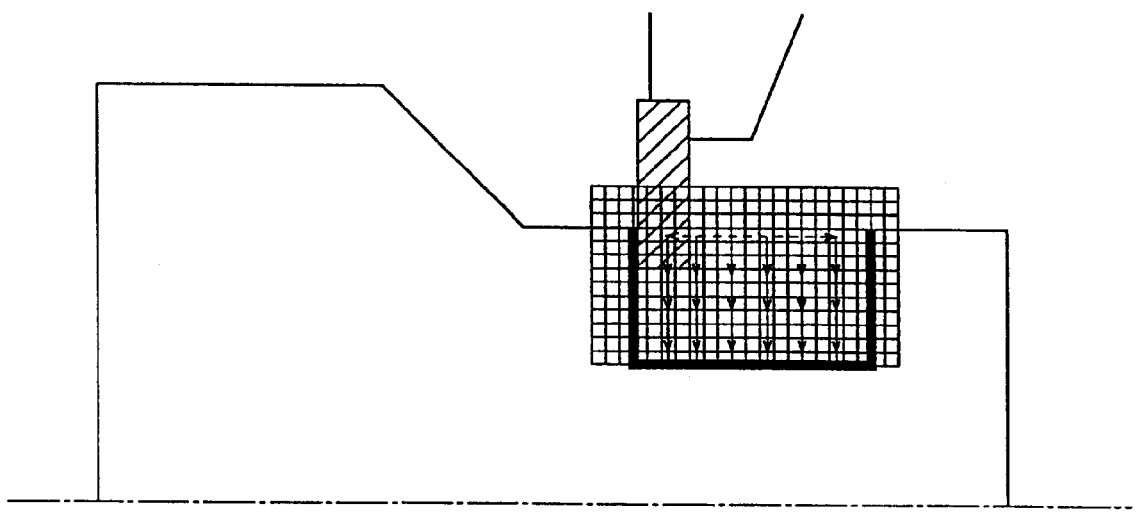
FIG. 29 illustrates a display screen picture of the NC apparatus of the embodiment 16.

FIG. 29 illustrates an example of the display screen of the present embodiment. As compared to the aforementioned NC program for lathes shown in FIG. 26, the operator selects the grids including the bottom part visible lines, and further the tool paths corresponding to the ditch width which is widen by enlarging the length of the bottom part visible lines are displayed.

EMBODIMENT 17

Figure 31:
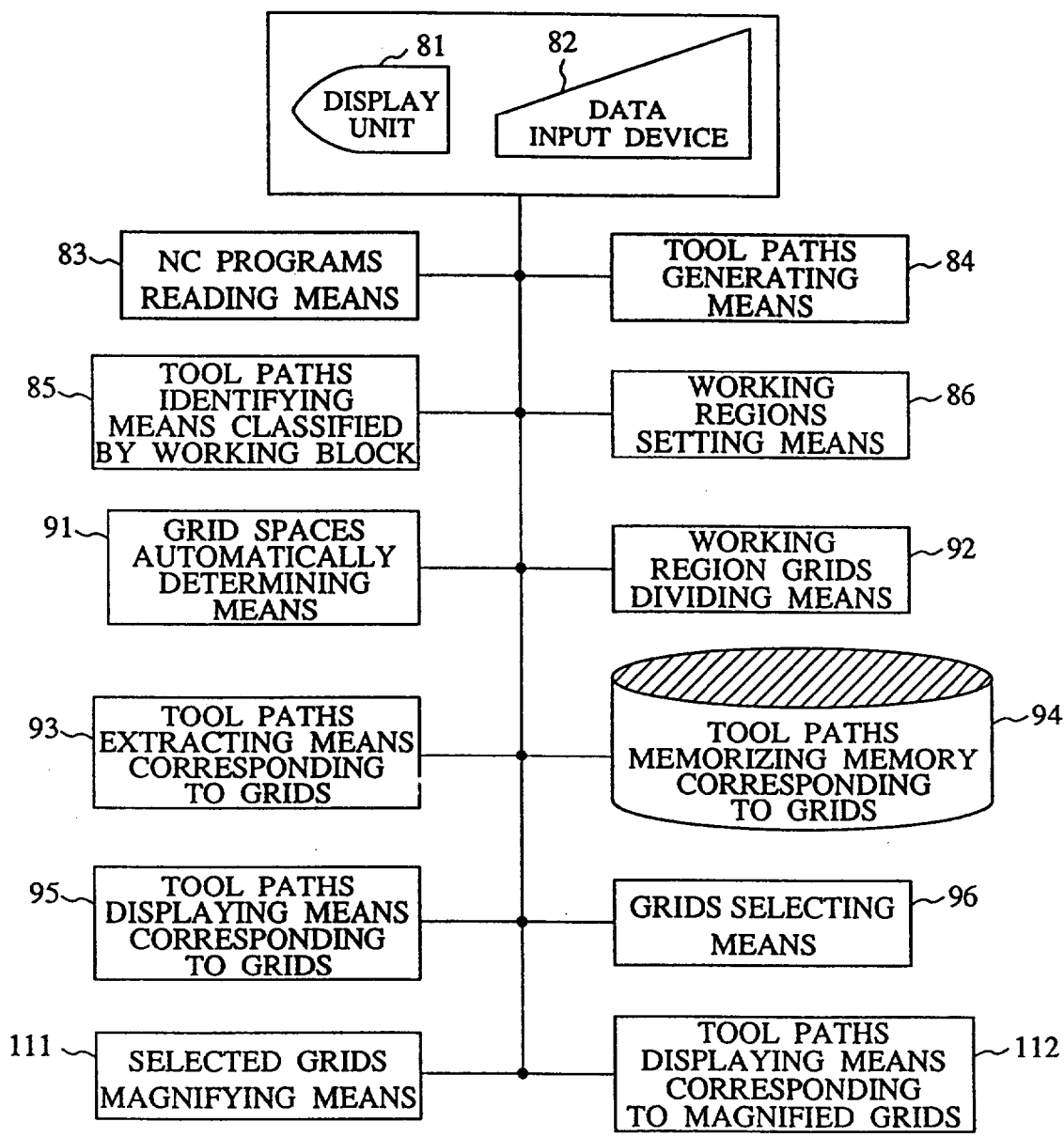
FIG. 31 illustrates a block diagram showing the NC apparatus for the machine tool of the embodiment 17 of the present invention.

FIG. 31 illustrates a block diagram of an NC apparatus for a machine tool of an embodiment of the invention. In FIG. 31, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 91 designates a grid space automatically determining means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 111 designates a selected grid magnifying means, and reference numeral 112 designates a tool path displaying means corresponding to a magnified grid.

Figure 33:
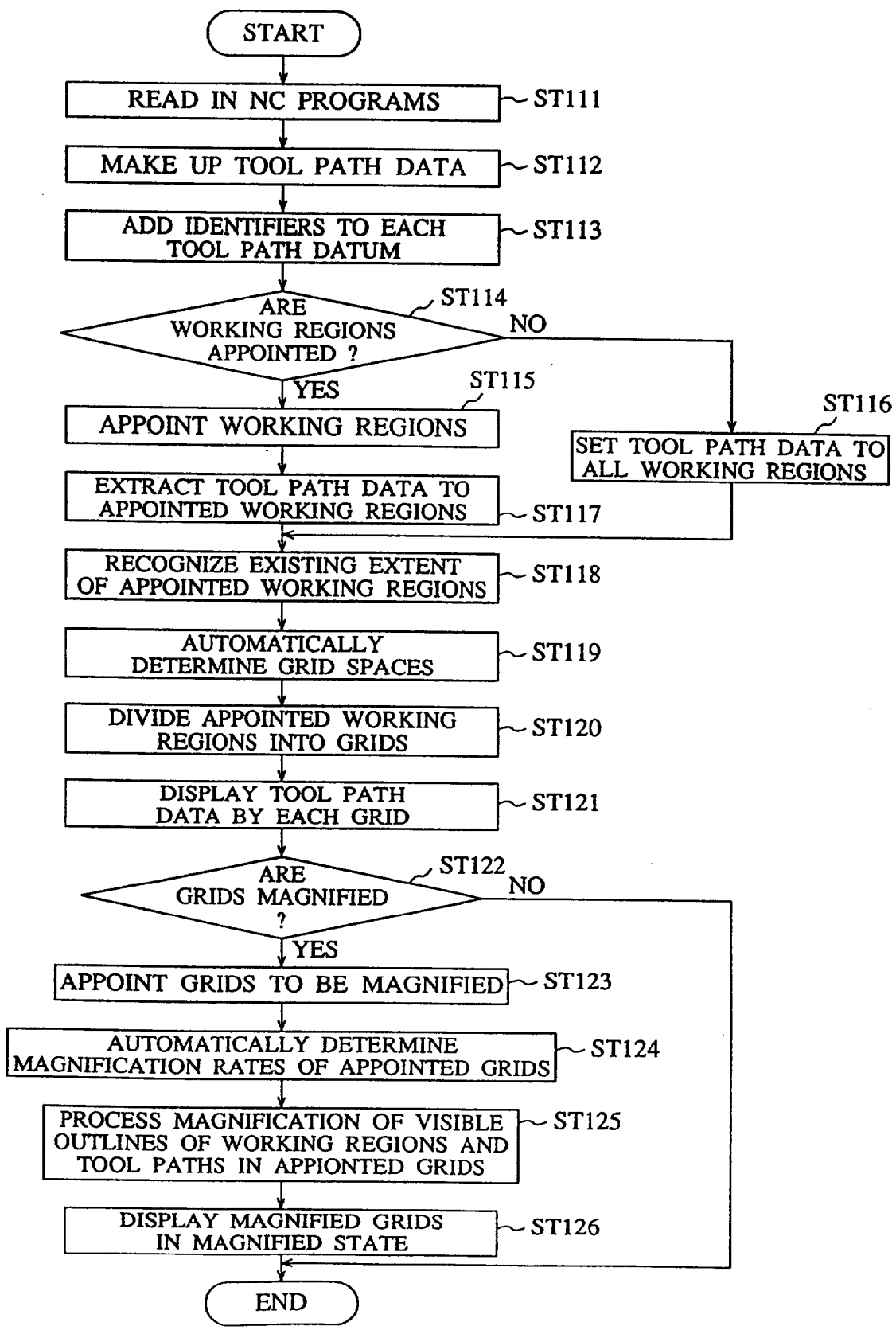
FIG. 33 illustrates a flow chart for describing the operation of the NC apparatus of the embodiment 17.

Next, the operation will be described thereof. FIG. 33 illustrates a flow chart showing the procedures of manipulations and operations, and the description will be done on the basis of FIG. 33. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15 and 16 (STEP ST111–STEP ST121).

Next, when the operator wants to locally magnify the visible outlines of the displayed working regions and the tool paths in the working regions to ascertain them (STEP ST122), he selects the grids including the visible outlines of the working regions and the tool paths in the working regions which visible outlines and tool paths are wanted to be modified locally (STEP ST123). And, he calculates the magnification rates of the selected grids in conformity to the previously determined standards by the use of the display extent of the display screen and the size of the selected grids (STEP ST124). It is of course possible to display the aforementioned previously determined standards on the display screen for operator's setting different standard.

Next, the working regions in the grids and the tool paths in the working regions are magnified according to the determined magnification rates (STEP ST125) for displaying them on the display screen (STEP ST126). As a result of the processes mentioned above, the locally magnified working regions and tool paths appointed by the operator can be ascertained in a locally magnified state by selecting the grids.

Figure 32:
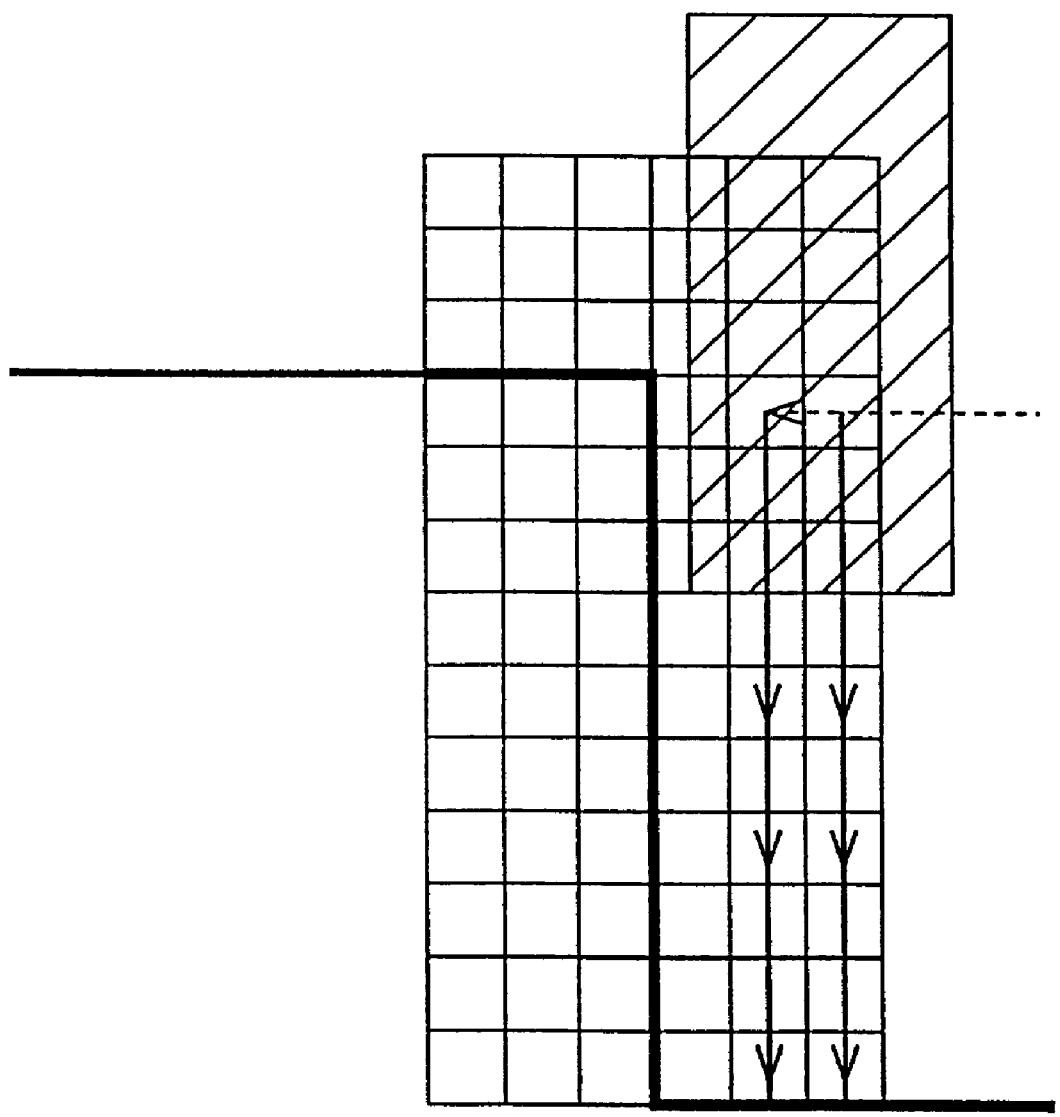
FIG. 32 illustrates a display screen picture of the NC apparatus of the embodiment 17.

FIG. 32 illustrates an example of the display screen of the present embodiment, and shows the visible outlines of the working region and the tool paths in the case where the operator selected the plural girds on the left side of the ditch part displayed in conformity with the aforementioned NC program for lathes shown in FIG. 29 to magnify them.

EMBODIMENT 18

Figure 34:
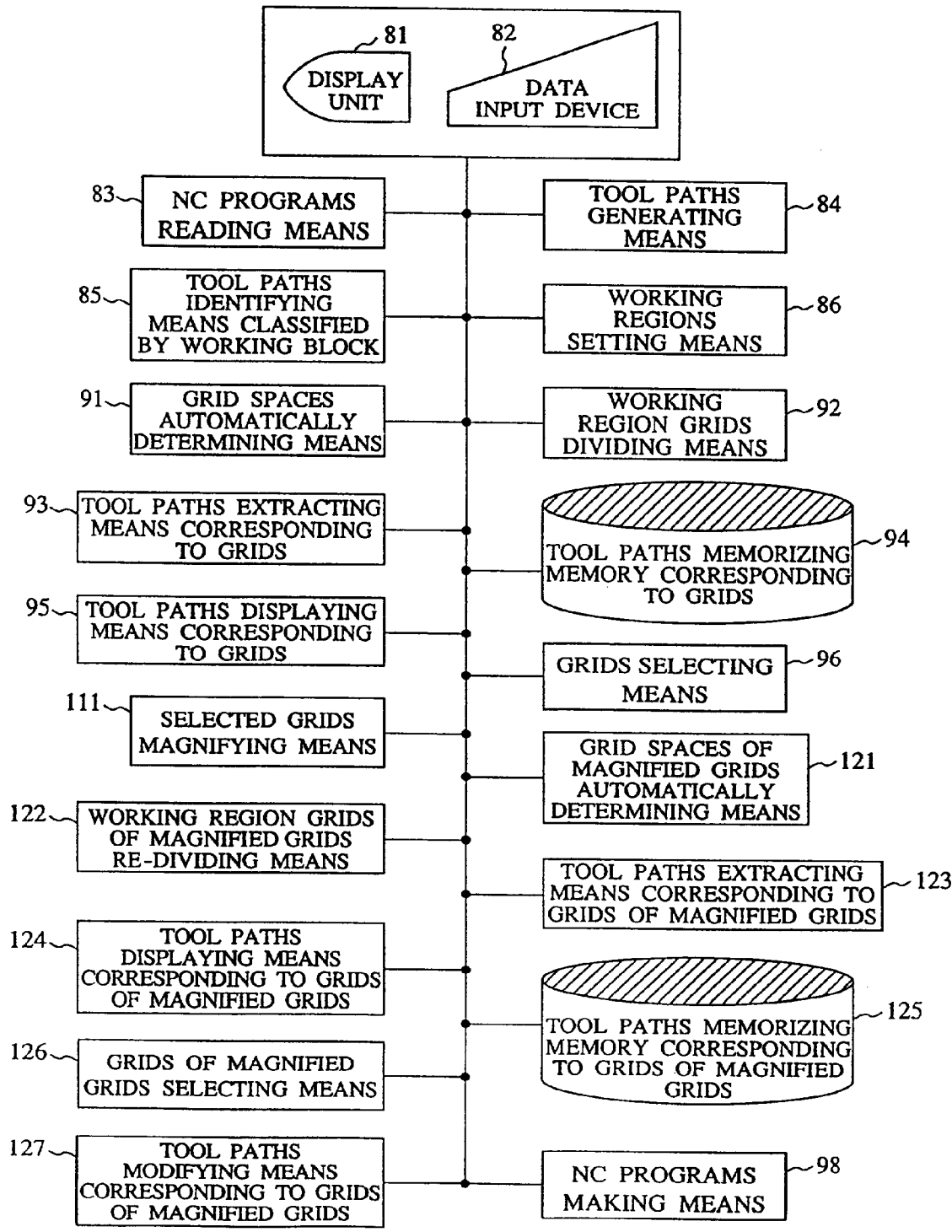
FIG. 34 illustrates a block diagram showing the NC apparatus for the machine tool of the embodiment 18 of the present invention.

FIG. 34 illustrates a block diagram of an NC apparatus for a machine tool of an embodiment of the invention. In FIG. 34, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 91 designates a grid space automatically determining means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 98 designates an NC program making means, reference numeral 111 designates a selected grid magnifying means, reference numeral 121 designates a grid space of a magnified grid automatically determining means operating the spaces of further dividing on the magnification extent in case of magnifying the grids appointed by the grid selecting means 96, reference numeral 122 designates a working region grid of a magnified grid re-dividing means re-dividing the working regions included in the appointed grids and the tool paths corresponding to the working regions into grids on the basis of the operated spaces, reference numeral 123 designates a tool path extracting means corresponding to a grid of a magnified grid, reference numeral 124 designates a tool path displaying means corresponding to a grid of a magnified grid displaying the tool paths corresponding to the re-divided grids of the magnified grids, reference numeral 125 designates a tool path memorizing memory corresponding to a grid of a magnified grid, reference numeral 126 designates a grid of a magnified grid selecting means for appointing the displayed tool paths by the divided re-divided grid, and reference numeral 127 designates a tool path modifying means corresponding to a grid of a magnified grid.

Figure 36:
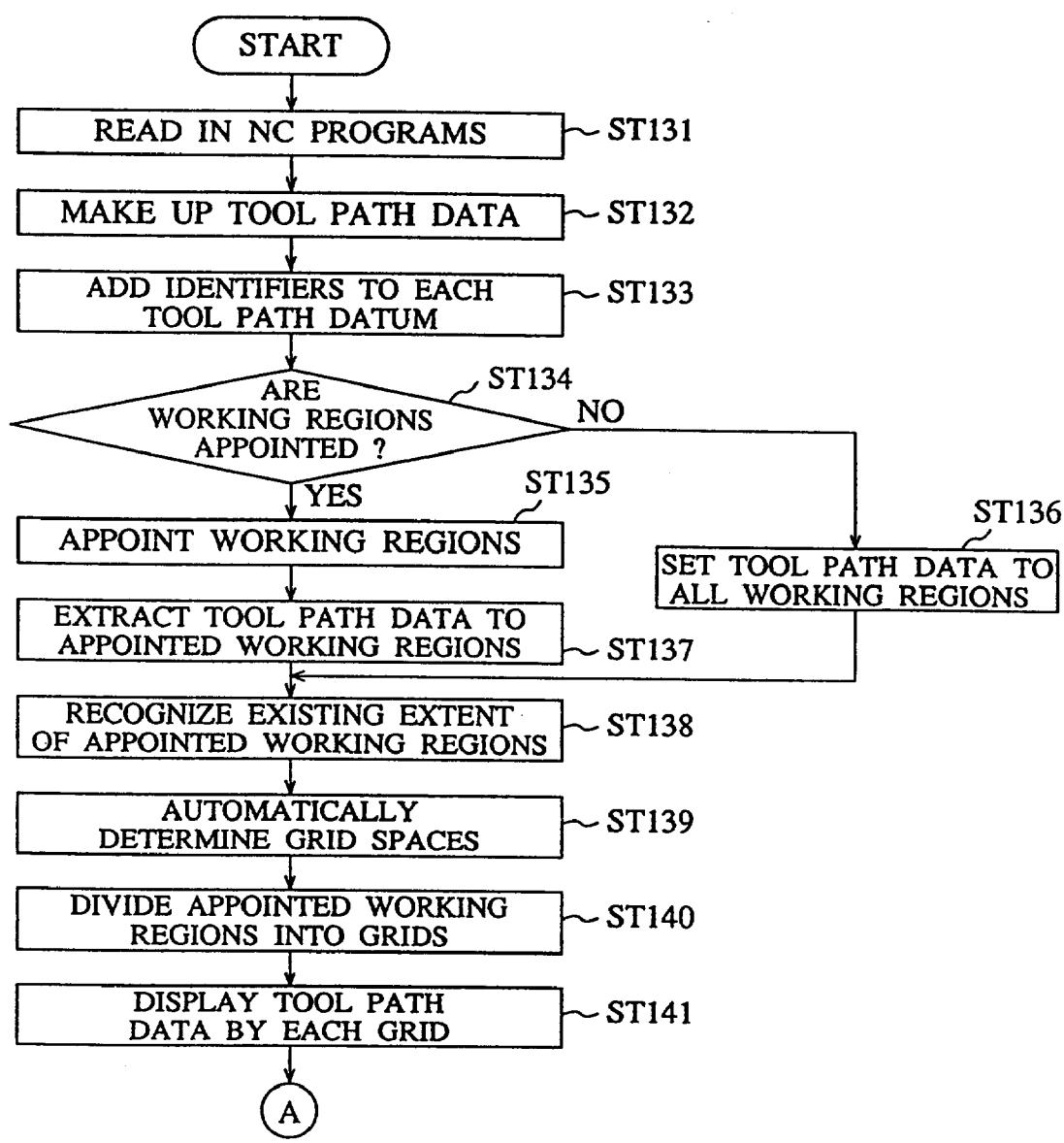
FIG. 36 illustrates a flow chart for describing the operation of the NC apparatus of the embodiment 18.
Figure 37:
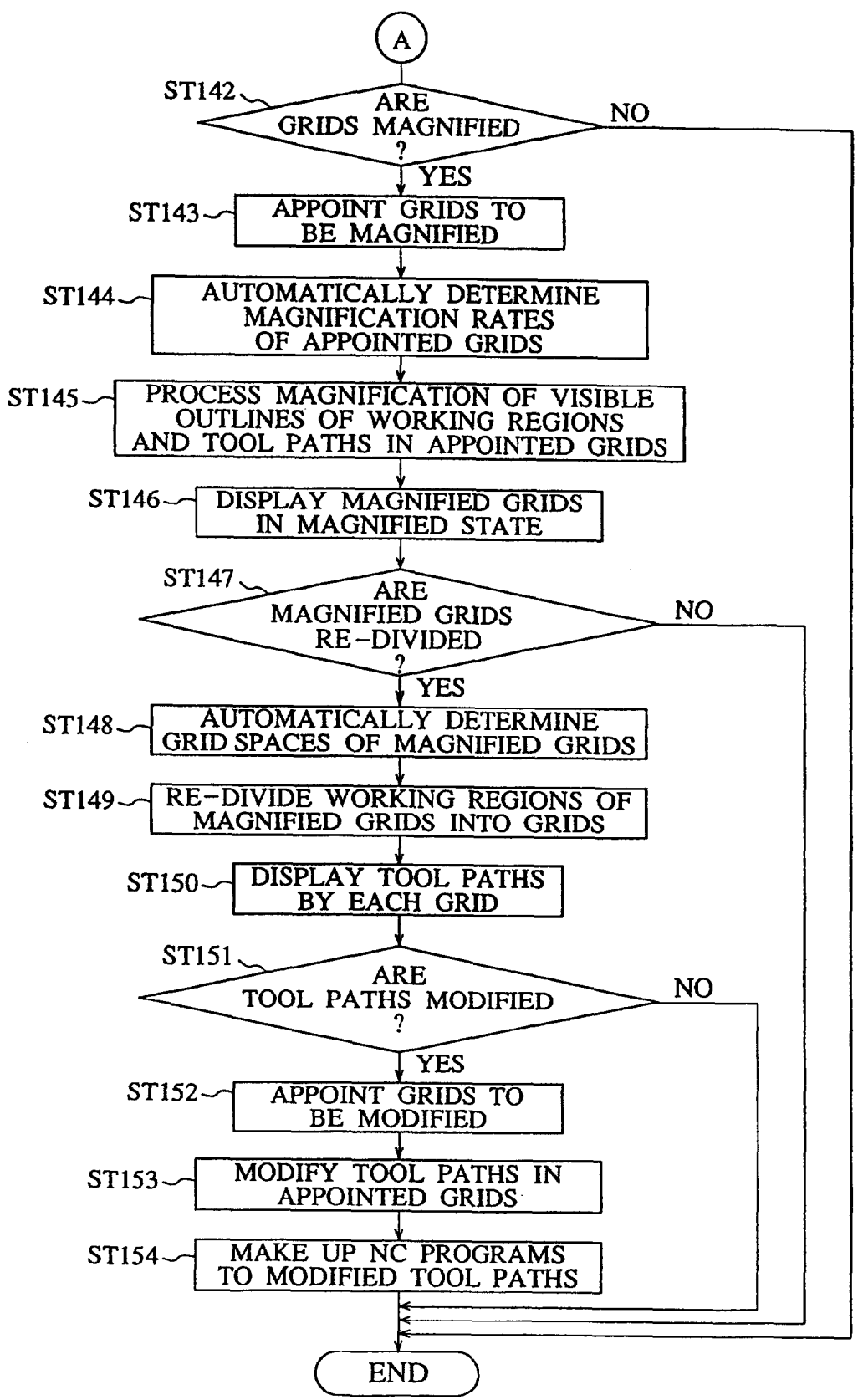
FIG. 37 illustrates a continuation of the flow chart of FIG. 36.

Next, the operation will be described thereof. FIG. 36 and FIG. 37 illustrate flow charts showing the procedures of manipulations and operations, and the description will be done on the basis of FIG. 33 and FIG. 37. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15, 16 and 17 (STEP ST131–STEP ST141). Besides, the processes of operator's selecting grids to display the visible outlines of the working regions and the tool paths in a locally magnified state are identical to those of the embodiment 17 (STEP ST142–STEP ST146).

Next, when the operator wants to further locally modify the tool paths corresponding to the visible outlines of the working regions displayed in a magnified state, he appoints the grids displayed in a magnified state to further divide (or divide one grid into further finer grids) (STEP ST147). And he determines the spaces of further dividing the grids displayed in a magnified state into grids in conformity to a certain evaluation criterion in accordance with the aforementioned existing extent (or the existing extent of the displayed part) of the working region displayed in a magnified state (or only the a part actually displayed in a magnified state) (STEP ST148). And, he further divides the displayed working region into grids to identify the part of the visible outlines of the working regions which part is included in the divided grids (STEP ST149). In this case, since the grids to be re-divided are only the part displayed in a magnified state, it is necessary to recognize the existing extent of them again. Besides, the tool path data corresponding to the visible outlines of the working region included in each grid (or grids after re-dividing) are identified by retrieving the identifiers and their coordinate values (the object of the retrieval is the tool paths memorizing memory corresponding to grids 94), and the tool path data and the visible outlines of the working region of each re-divided grid which tool path data and visible outlines are obtained by the retrieval are displayed on the display screen of the display unit 81 (STEP ST150). And, the displayed tool path data of each re-divided grid are memorized in the tool path memorizing memory corresponding to a grid of a magnified grid 125.

The concrete procedures are as follows: "re-dividing the grids including the appointed working region"→"making up the re-divided grid numbers and their information"→"extracting the corresponding tool path grid information out of the tool path memorizing memory corresponding to a grid 94 in accordance with the existing extent (or coordinates) of the working regions in the re-divided grid information"→"identifying the extent (or the numbers of grids) of the extracted grids in the re-divided grids"→"re-dividing the extracted tool path grids"→"making up the grid numbers of the re-divided grids and their information"→"displaying the tool path data of each re-divided grid".

Next, the operator appoints the tool paths displayed in a magnified state so as to locally modify them (STEP ST151), and selects the re-divided grids including the tool paths which he wants to modify locally (STEP ST152). And, he modifies the tool paths in the selected re-divided grids on the display screen (STEP ST153). To the modified tool paths, the aforementioned correction calculations and interpolation processes are executed again, and they are transformed into the tool path data to be memorized in the tool path memorizing memory corresponding to a grid of a magnified grid 125 (STEP ST154). As a result of the processes mentioned above, the further locally modified NC program is resulted to be made up by displaying the working region appointed by the operator in a locally magnified state, further dividing it into grids to select the divided grids, and further modifying the selected grids locally.

Figure 35:
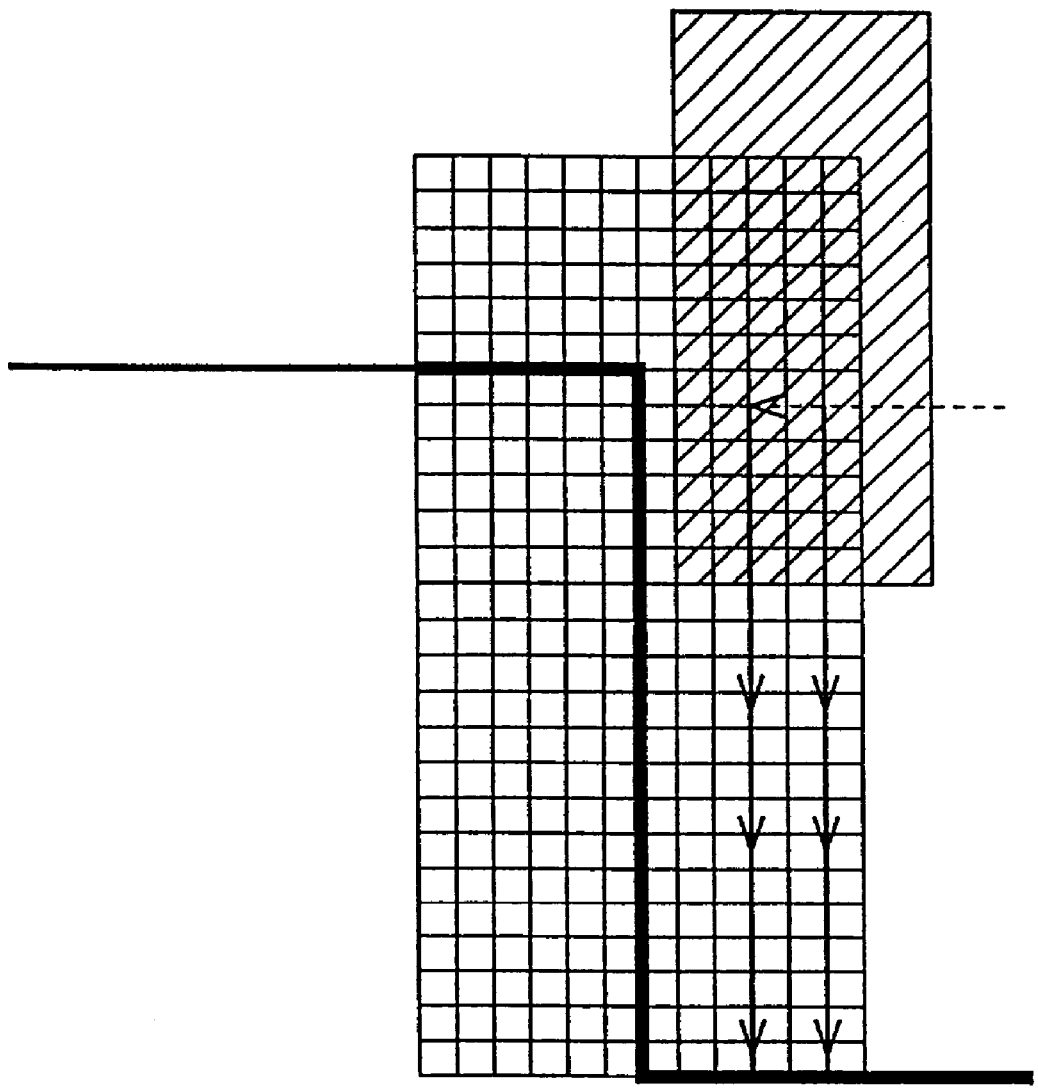
FIG. 35 illustrates a display screen picture of the NC apparatus of the embodiment 18.

FIG. 35 illustrates an example of the display screen of the present embodiment. FIG. 35 shows the modified tool paths in the case where the visible outlines of the working region and the tool paths in the working region displayed in a magnified state in the aforementioned FIG. 32 were further divided in grids and further the operator modified the cutting quantity of the tool path. In this example, the grids shown in FIG. 32 are further divided to four grids having the half spaces of the original grids. In the example of FIG. 35, the arrow marks showing tool paths exist at boundaries between grids. In this case, the tool paths are interpreted to be included in both grids. Provided that the arrow marks as the information of grids are distinguished by the existing boundaries of grids.

EMBODIMENT 19

Figure 38:
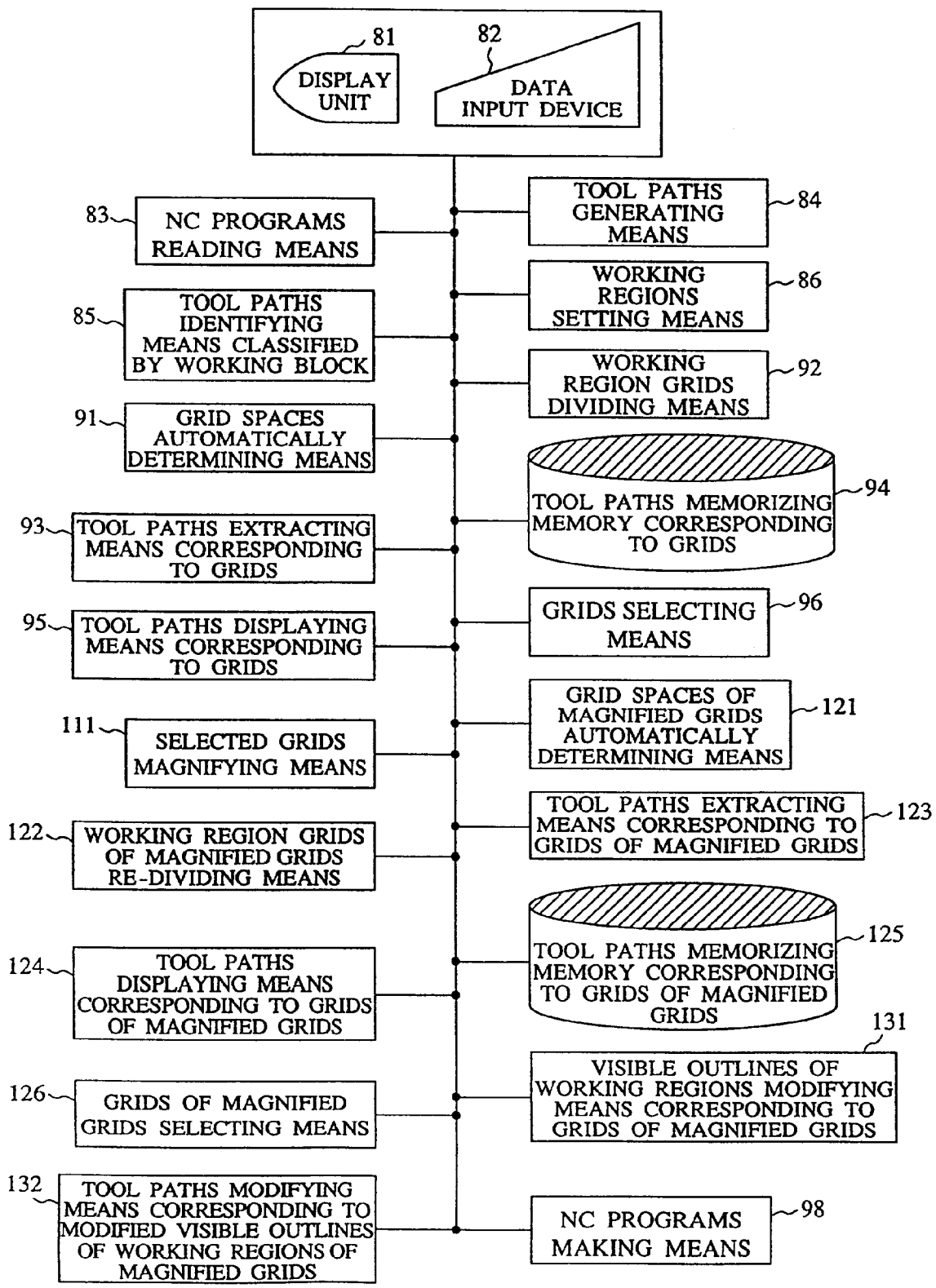
FIG. 38 illustrates a block diagram showing the NC apparatus for the machine tool of the embodiment 19 of the present invention.

FIG. 38 illustrates a block diagram of an NC apparatus for a machine tool of an embodiment of the invention. In FIG. 38, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 91 designates a grid space automatically determining means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 111 designates a selected grid magnifying means, reference numeral 121 designates a grid space of a magnified grid automatically determining means, reference numeral 122 designates a working region grid of a magnified grid re-dividing means, reference numeral 123 designates a tool path extracting means corresponding to a grid of a magnified grid, reference numeral 124 designates a tool path displaying means corresponding to a grid of a magnified grid, reference numeral 125 designates a tool path memorizing memory corresponding to a grid of a magnified grid, reference numeral 126 designates a grid of a magnified grid selecting means, reference numeral 131 designates a visible outline of a working region modifying means corresponding to a grid of a magnified grid, and reference numeral 132 designates a tool path modifying means corresponding to a modified visible outline of a working region of a magnified grid.

Figure 40:
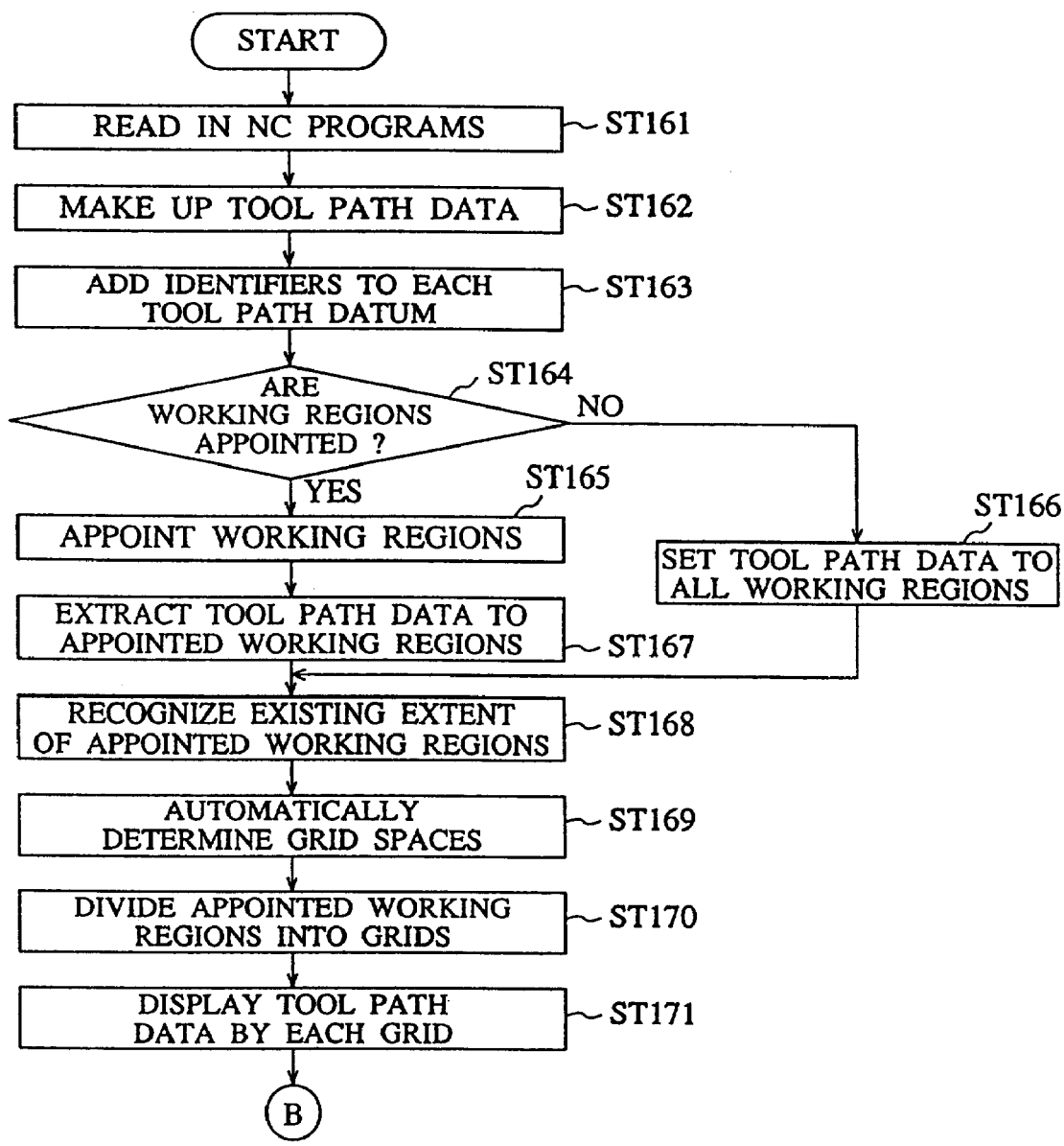
FIG. 40 illustrates a flow chart for describing the operation of the NC apparatus of the embodiment 16.
Figure 41:
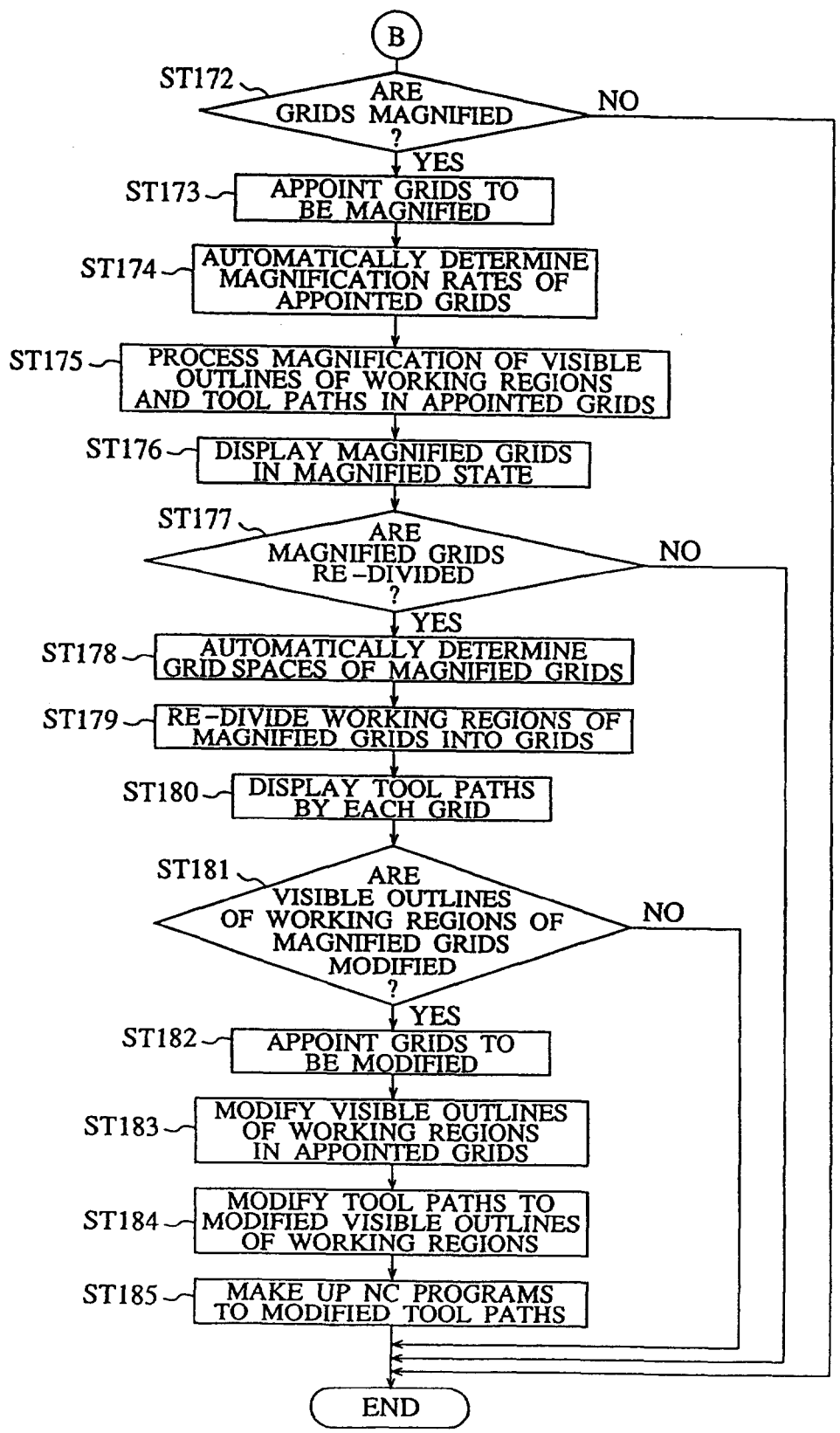
FIG. 41 illustrates a continuation of the flow chart of FIG. 40.

Next, the operation will be described thereof. FIG. 40 and FIG. 41 illustrate flow charts showing the procedures of manipulations and operations, and the description will be done on the basis of FIG. 40 and FIG. 41. The first process of reading in the NC program made up by an operator, the operator's locally appointing working regions to all of the working regions in the NC program displayed on the display unit 81, dividing the appointed working regions into grids, and displaying the tool paths of each of divided the grids is identical to that of the embodiments 15, 16, 17 and 18 (STEP ST161–STEP ST171). Besides, the processes of operator's selecting grids to display the visible outlines of the working regions and the tool paths in a locally magnified state are identical to those of the embodiments 17 and 18 (STEP ST172–STEP ST176). Furthermore, the processes of re-dividing the grids displayed in a magnified state and displaying the working region and the tool paths included in each re-divided grid on the display unit are identical to those of the embodiment 18 (STEP ST177–STEP ST180).

Next, when the operator wants to locally modify the visible outlines of the displayed working region displayed in a magnified state furthermore (STEP ST181), he selects the re-divided grids including the visible outlines of the working region being wanted to be modified locally (STEP ST182). And, he modifies the visible outlines of the working region in the re-divided working region selected on the display screen (STEP ST183), and modifies the tool paths so as to correspond to the modified working region (STEP ST184). To the modified tool paths, the aforementioned correction calculations and interpolation processes are executed again, and they are transformed into the tool path data to be memorized in the tool path memorizing memory corresponding to a grid of a magnified grid 125 (STEP ST185). As a result of the processes mentioned above, the further locally modified NC program is resulted to be made up by selecting re-dividing grids to the working region appointed by the operator and displayed in a magnified state, and by further locally modifying the grids.

Figure 39:
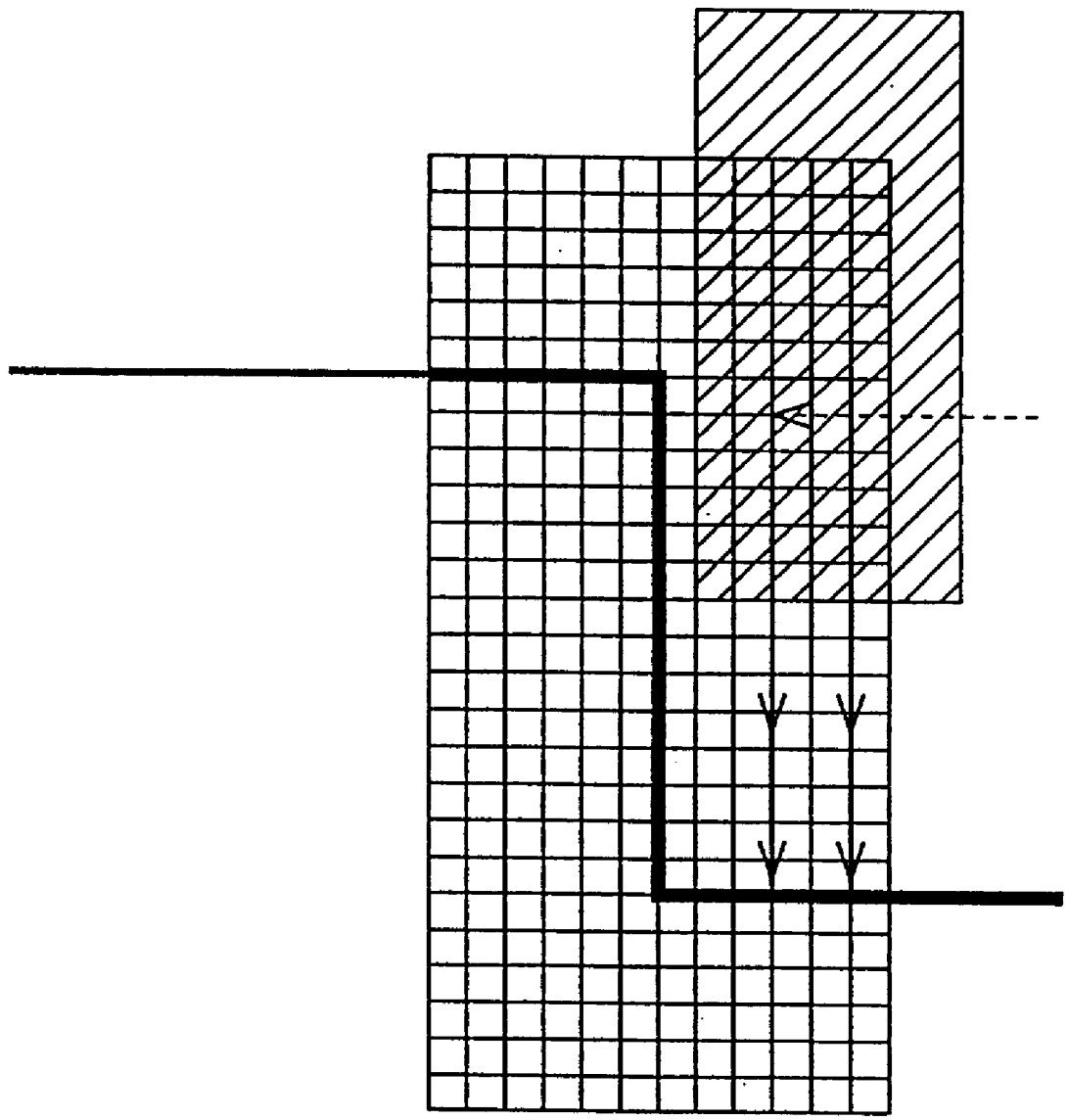
FIG. 39 illustrates a display screen picture of the NC apparatus of the embodiment 19.

FIG. 39 illustrates an example of the display screen of the present embodiment. FIG. 39 displays the tool paths corresponding to the visible outlines of the modified region in the case where the operator modifies the ditch depth to be shallower by selecting the grids including the visible outlines of the ditch wall and by modifying the length of the selected grids.

EMBODIMENT 20

Figure 42:
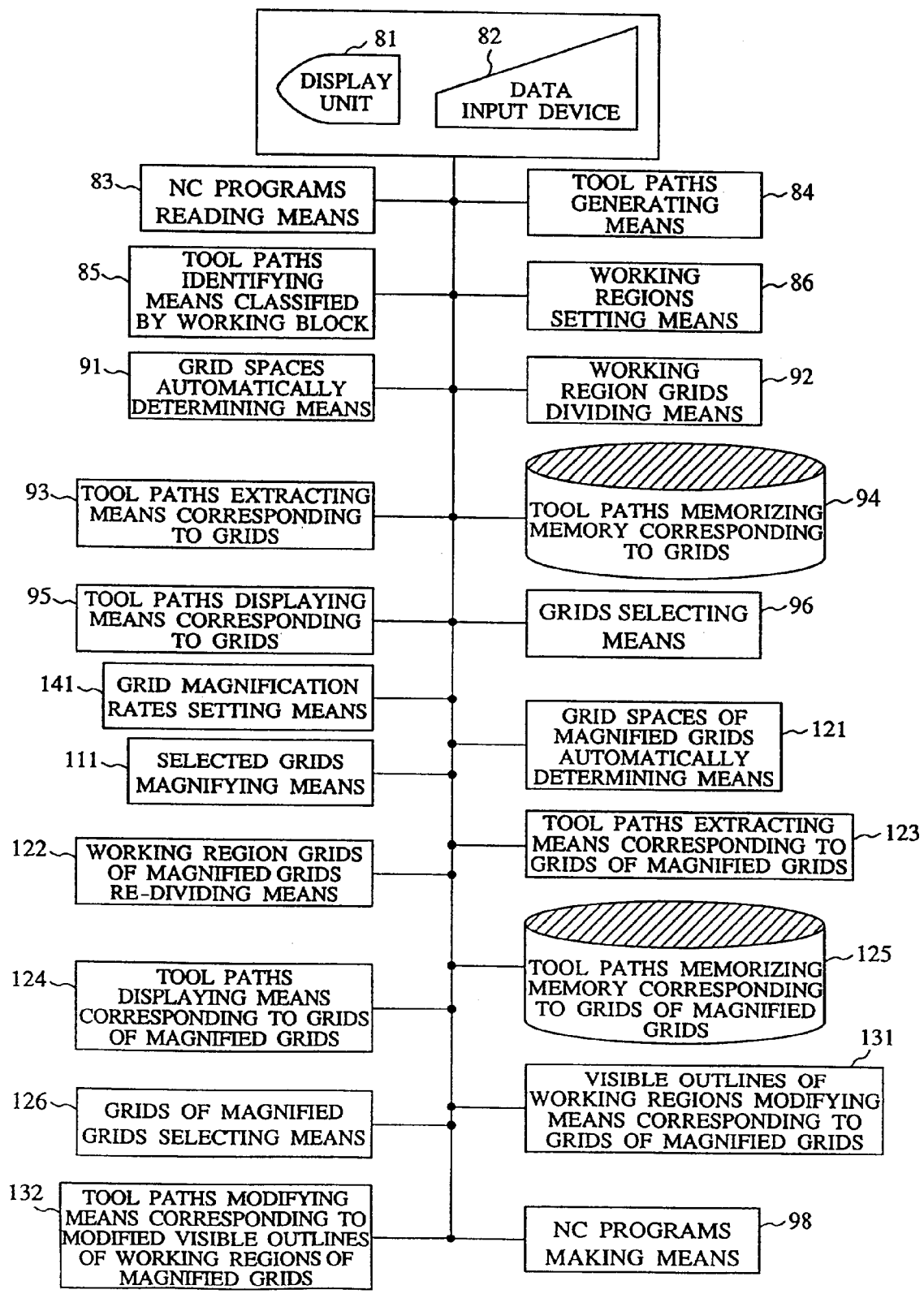
FIG. 42 illustrates a block diagram showing the NC apparatus for the machine tool of the embodiment 20 of the present invention.

FIG. 42 illustrates a block diagram of an NC apparatus for a machine tool of an embodiment of the invention. In FIG. 42, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 91 designates a grid space automatically determining means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 98 designates an NC program making means, reference numeral 111 designates a selected grid magnifying means, reference numeral 121 designates a grid space of a magnified grid automatically determining means, reference numeral 122 designates a working region grid of a magnified grid re-dividing means, reference numeral 123 designates a tool path extracting means corresponding to a grid of a magnified grid, reference numeral 124 designates a tool path displaying means corresponding to a grid of a magnified grid, reference numeral 125 designates a tool path memorizing memory corresponding to a grid of a magnified grid, reference numeral 126 designates a grid of a magnified grid selecting means, reference numeral 131 designates a visible outline of a working region modifying means corresponding to a grid of a magnified grid, reference numeral 132 designates a tool path modifying means corresponding to a modified visible outline of a working region of a magnified grid, and reference numeral 141 designates a grid magnification rate setting means.

Figure 44:
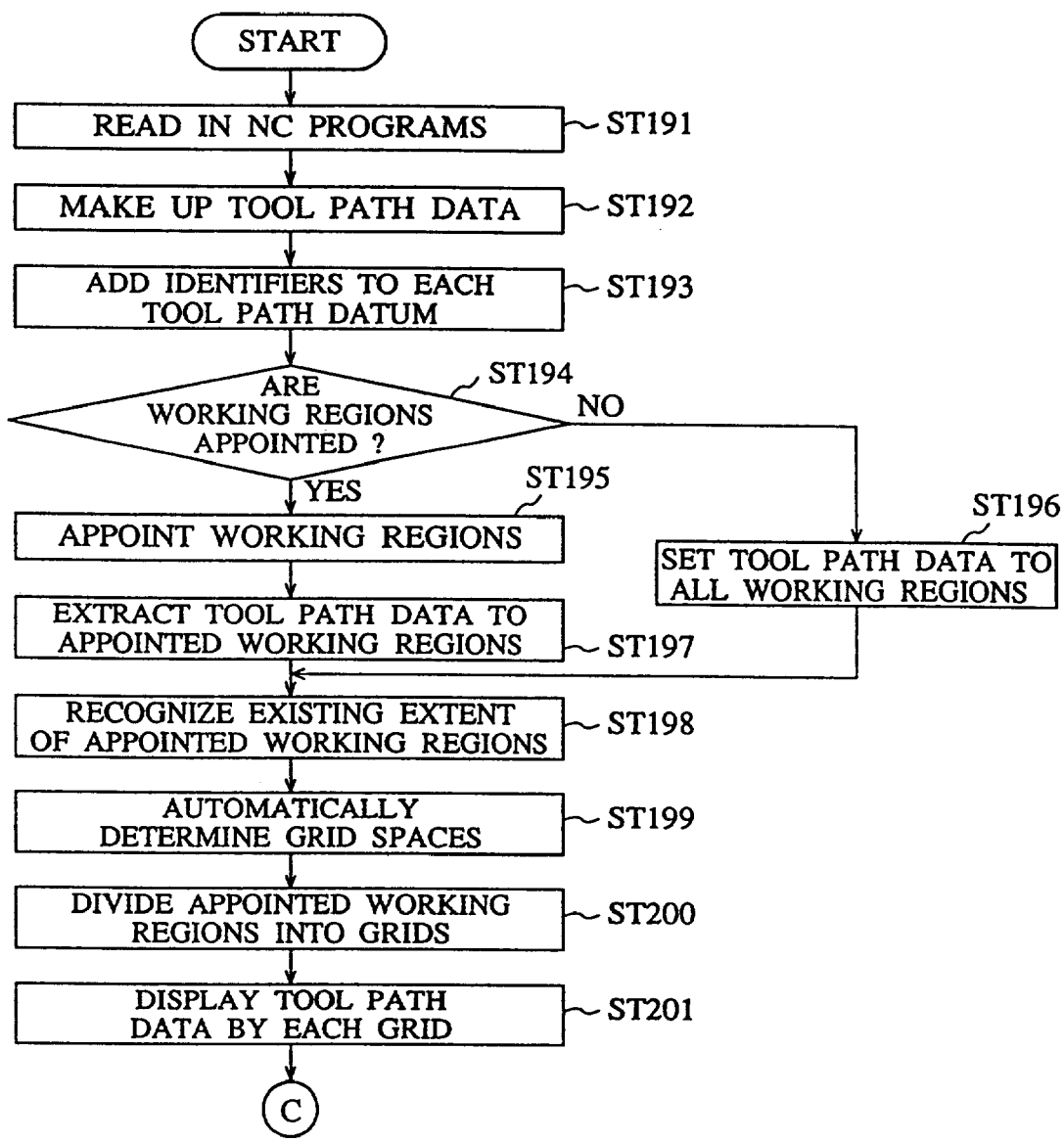
FIG. 44 illustrates a flow chart for describing the operation of the NC apparatus of the embodiment 20.
Figure 45:
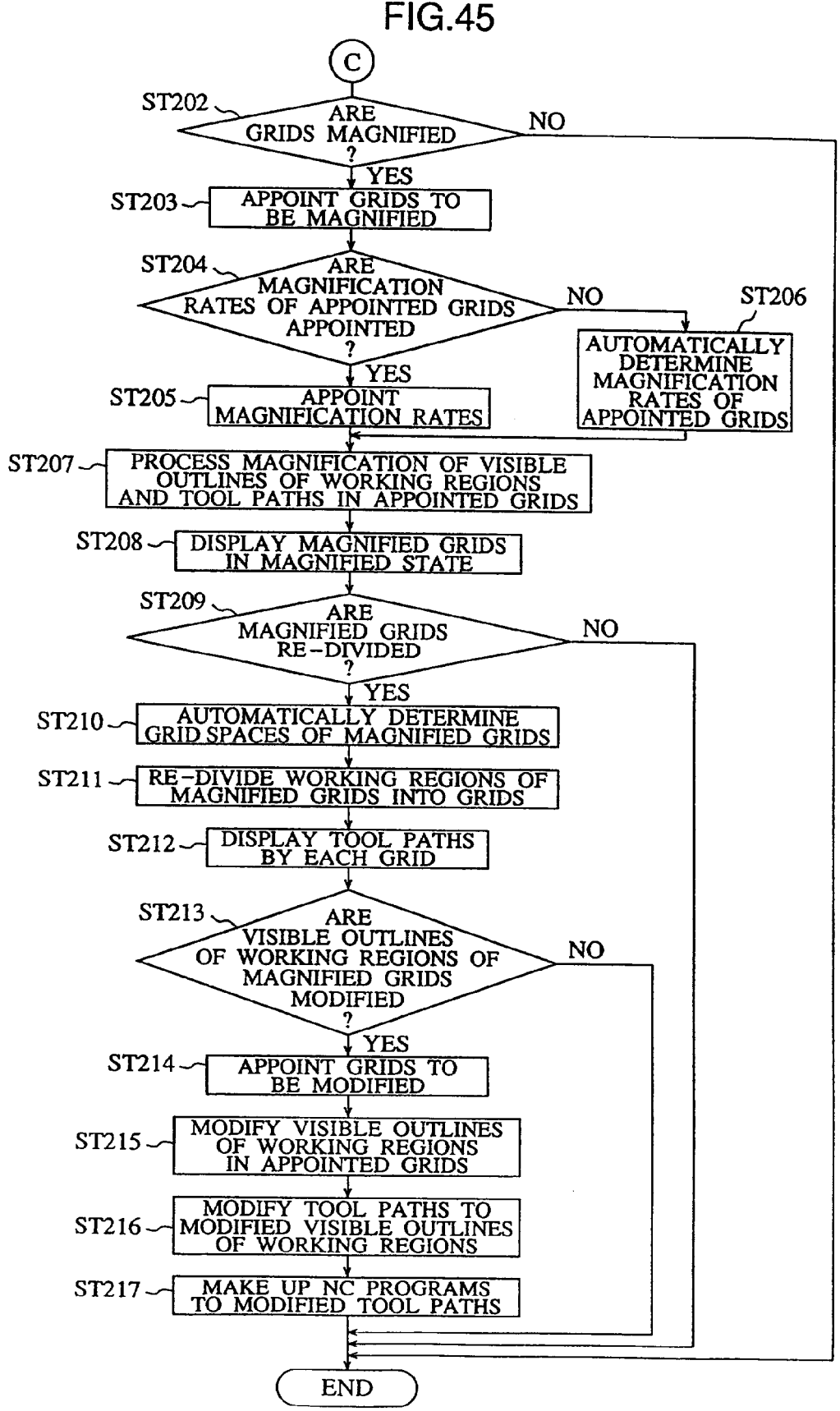
FIG. 45 illustrates a continuation of the flow chart of FIG. 44.

Next, the operation will be described thereof. FIG. 44 and FIG. 45 illustrate flow charts showing the procedures of manipulations and operations, and the description will be done on the basis of FIG. 44 and FIG. 45. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15, 16, 17, 18 and 19 (STEP ST191–STEP ST201). Besides, the processes of operator's selecting grids to display the visible outlines of the working regions and the tool paths in a locally magnified state are identical to those of the embodiments 17, 18 and 19 (STEP ST202, STEP ST203, STEP ST207, and STEP ST208). Moreover, the processes of re-dividing the grids displayed in a magnified state and displaying the working region and the tool paths included in each re-divided grid on the display unit are identical to those of the embodiments 18 and 19 (STEP ST209–STEP ST212). Furthermore, the processes of operator's selecting the re-divided grids, more locally modifying the visible outlines of the working region included in the selected grids, and making up the NC program modified more locally are identical to those of the embodiment 19 (STEP ST213–STEP ST217).

Next, when the operator wants to magnify the visible outlines of the working region and the tool paths included in the grids selected by the operator in an arbitrary magnification rate (STEP ST204), he displays the present magnification rate on the display screen, and he sets the magnification rate to the required rate after ascertaining the displayed magnification rate (STEP ST205). In the case where the operator does not want to magnify in an arbitrary magnification rate, the magnification rate is automatically determined similarly in the embodiments 18 and 19 (STEP ST206). As a result of the processes mentioned above, when the operator magnifies the appointed working regions and tool paths, they becomes being displayed in an arbitrary magnification rate.

Figure 43:
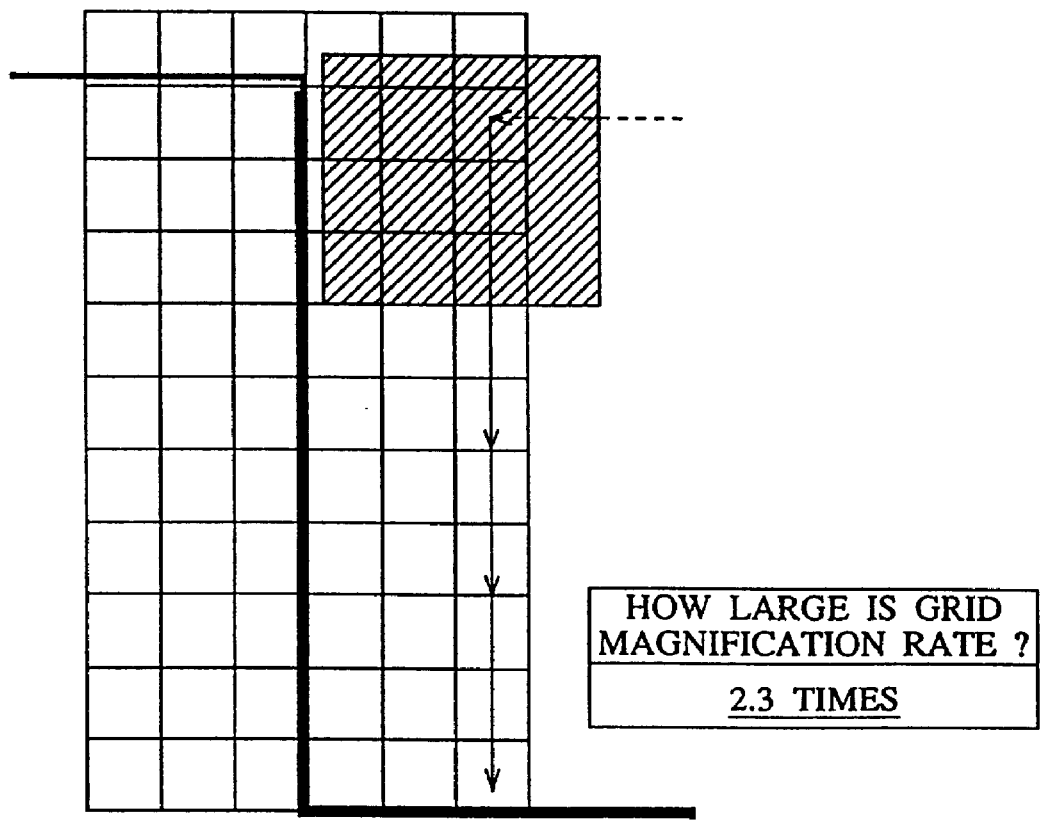
FIG. 43 illustrates a display screen picture of the NC apparatus of the embodiment 20.

FIG. 43 illustrates an example of the display screen of the present embodiment, and shows the visible outline and the tool path of the working region in the case where the operator set the magnification rate being 1.6 times shown in FIG. 32 to the rate being 2.3 times.

EMBODIMENT 21

Figure 46:
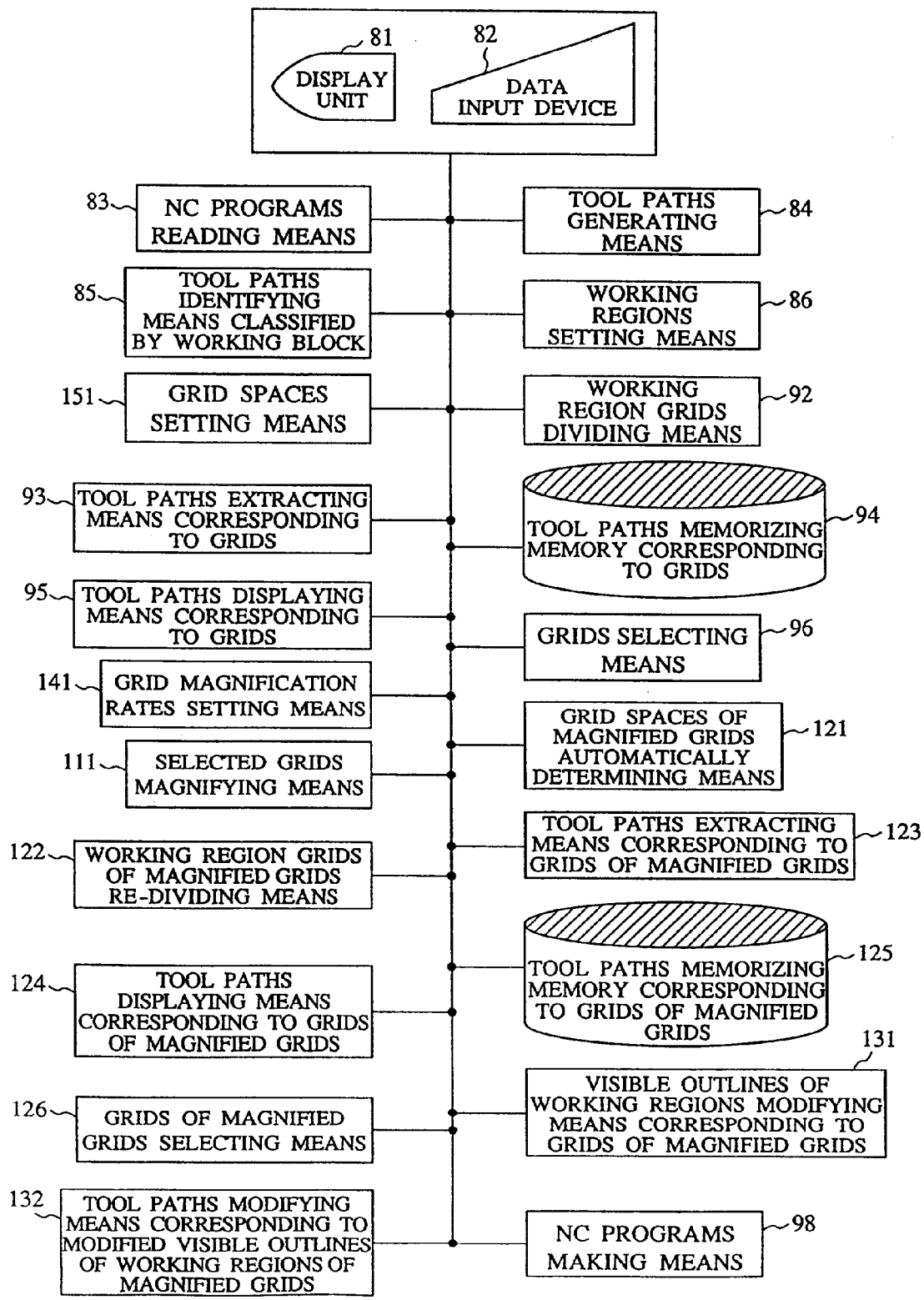
FIG. 46 illustrates a block diagram showing the NC apparatus for the machine tool of the embodiment 21 of the present invention.

FIG. 46 illustrates a block diagram of an NC apparatus for a machine tool of an embodiment of the invention. In FIG. 46, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 98 designates an NC program making means, reference numeral 111 designates a selected grid magnifying means, reference numeral 121 designates a grid space of a magnified grid automatically determining means, reference numeral 122 designates a working region grid of a magnified grid re-dividing means, reference numeral 123 designates a tool path extracting means corresponding to a grid of a magnified grid, reference numeral 124 designates a tool path displaying means corresponding to a grid of a magnified grid, reference numeral 125 designates a tool path memorizing memory corresponding to a grid of a magnified grid, reference numeral 126 designates a grid of a magnified grid selecting means, reference numeral 131 designates a visible outline of a working region modifying means corresponding to a grid of a magnified grid, reference numeral 132 designates a tool path modifying means corresponding to a modified visible outline of a working region of a magnified grid, reference numeral 141 designates a grid magnification rate setting means, and the reference numeral 151 designates a grid space setting means.

Figure 48:
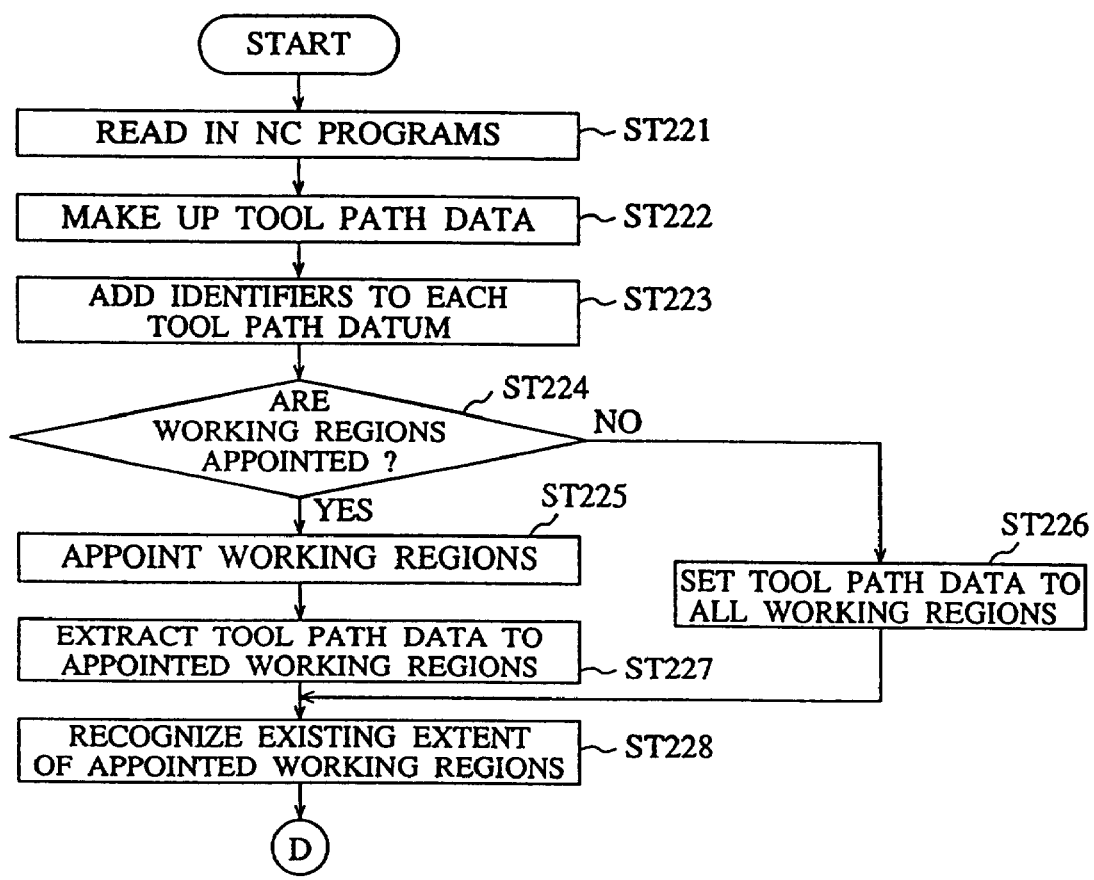
FIG. 48 illustrates a flow chart for describing the operation of the NC apparatus of the embodiment 21.
Figure 49:
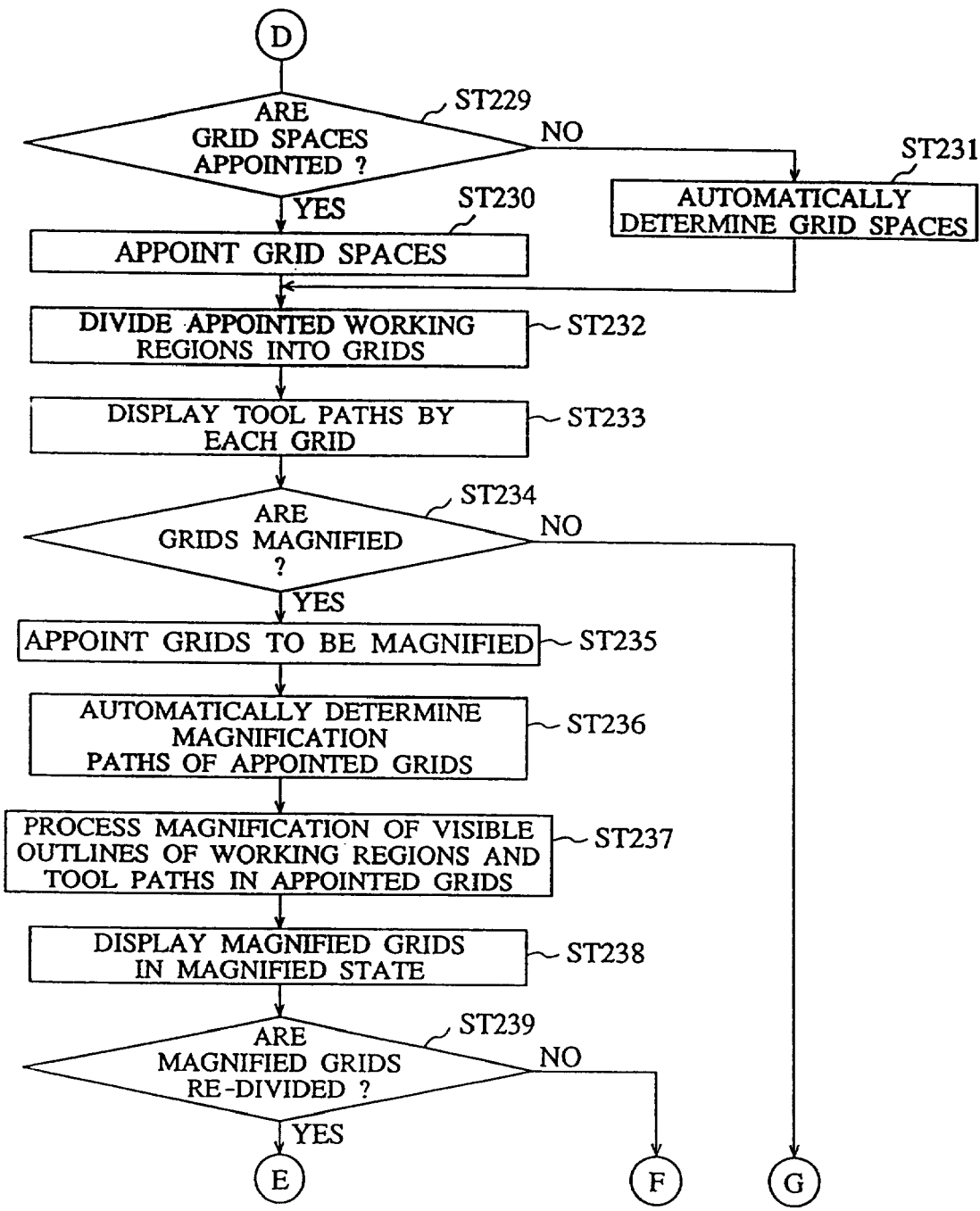
FIG. 49 illustrates a continuation of the flow chart of FIG. 48.
Figure 50:
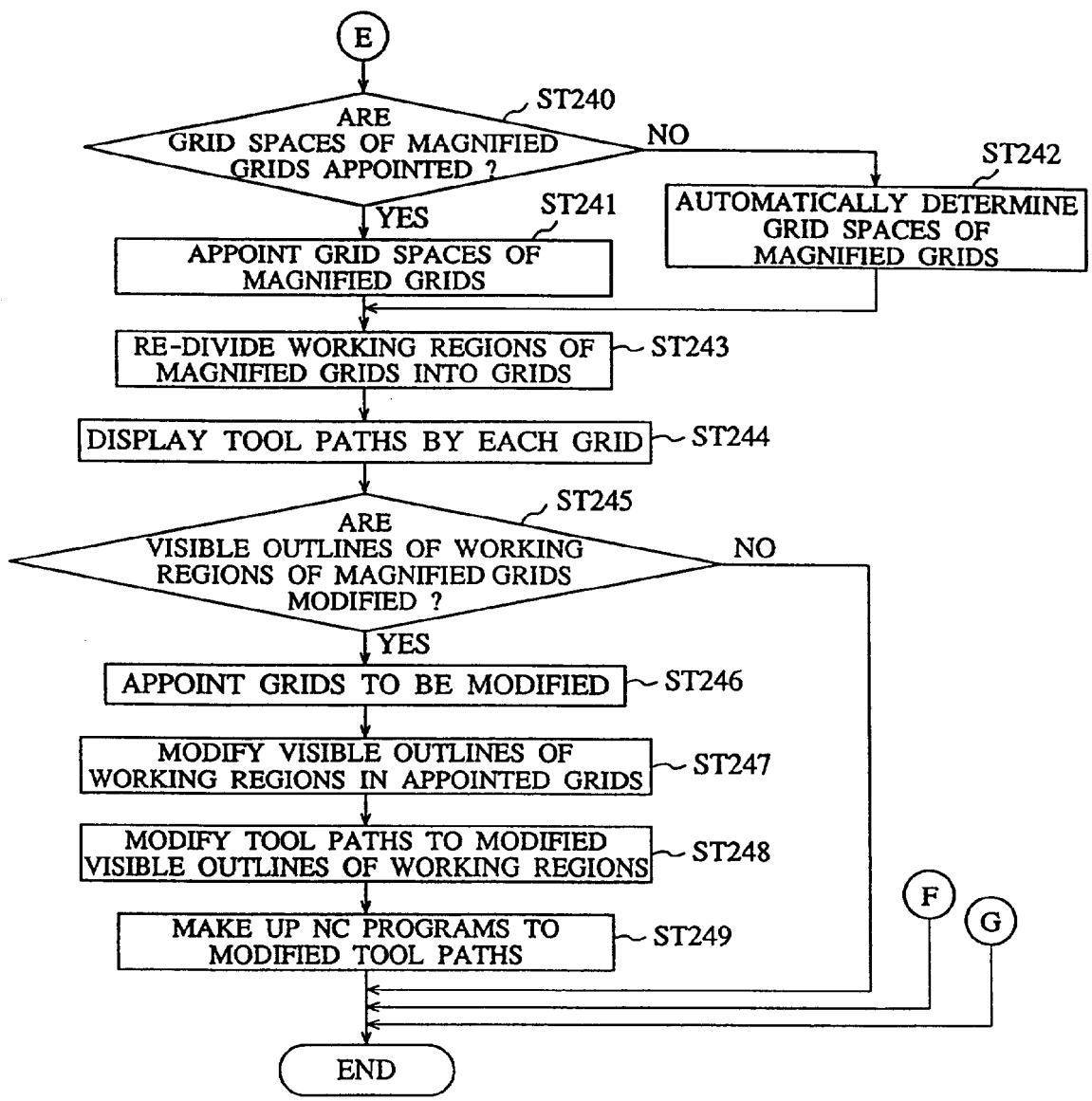
FIG. 50 illustrates a continuation of the flow chart of FIG. 49.

Next, the operation will be described thereof. FIG. 48 and FIG. 49 illustrate flow charts showing the procedures of manipulations and operations, and the description will be done on the basis of FIG. 48 and FIG. 49. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15, 16, 17, 18, 19 and 20 (STEP ST221–STEP ST228, STEP ST231–STEP ST233). Besides, the processes of operator's selecting grids to display the visible outlines of the working regions and the tool paths in a locally magnified state are identical to those of the embodiment 17, 18, 19 and 20 (STEP ST234–STEP ST238). Moreover, the processes of re-dividing the grids displayed in a magnified state and displaying the working region and the tool paths included in each re-divided grid on the display unit are identical to those of the embodiments 18, 19 and 20 (STEP ST239, STEP ST242–STEP ST244). Furthermore, the processes of operator's selecting the re-divided grids and more locally modifying the visible outlines of the working region included in the selected grids to make up the NC program modified more locally are identical to those of the embodiments 19 and 20 (STEP ST245–STEP ST249).

Next, when the operator wants to divide the working region selected by him or the working region displayed in a magnified state into grids in an arbitrary grid width (STEP ST229 or STEP ST240), he displays the present grid width on the display screen, and sets the grid width to the required grid width after ascertaining the displayed grid width (STEP ST230 or STEP ST241). In the case where the operator does not want to divide the working region in an arbitrary grid width, the grid width is automatically determined similarly in the embodiments 15, 16, 17, 18, 19 and 20 (STEP ST231 or STEP ST242). As a result of the processes mentioned above, when the operator divides the appointed working regions into grids, he comes to be able to appoint an arbitrary grid width.

Figure 47:
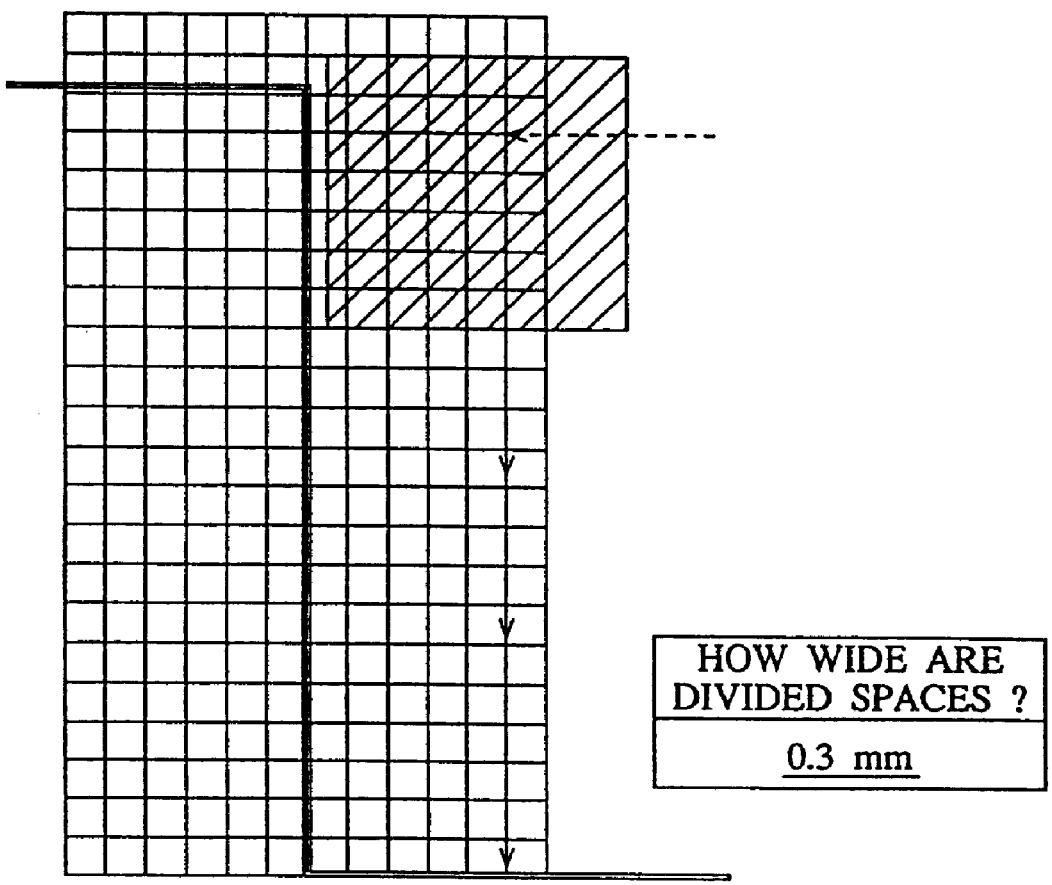
FIG. 47 illustrates a display screen picture of the NC apparatus of the embodiment 21.

FIG. 47 illustrates an example of the display screen of the present embodiment. FIG. 47 displays the visible outline and the tool path in the case where the operator re-sets the grid width being 0.6 mm shown in aforementioned FIG. 43 to the grid width being 0.3 mm and divided the working region into grids again.

EMBODIMENT 22

Figure 51:
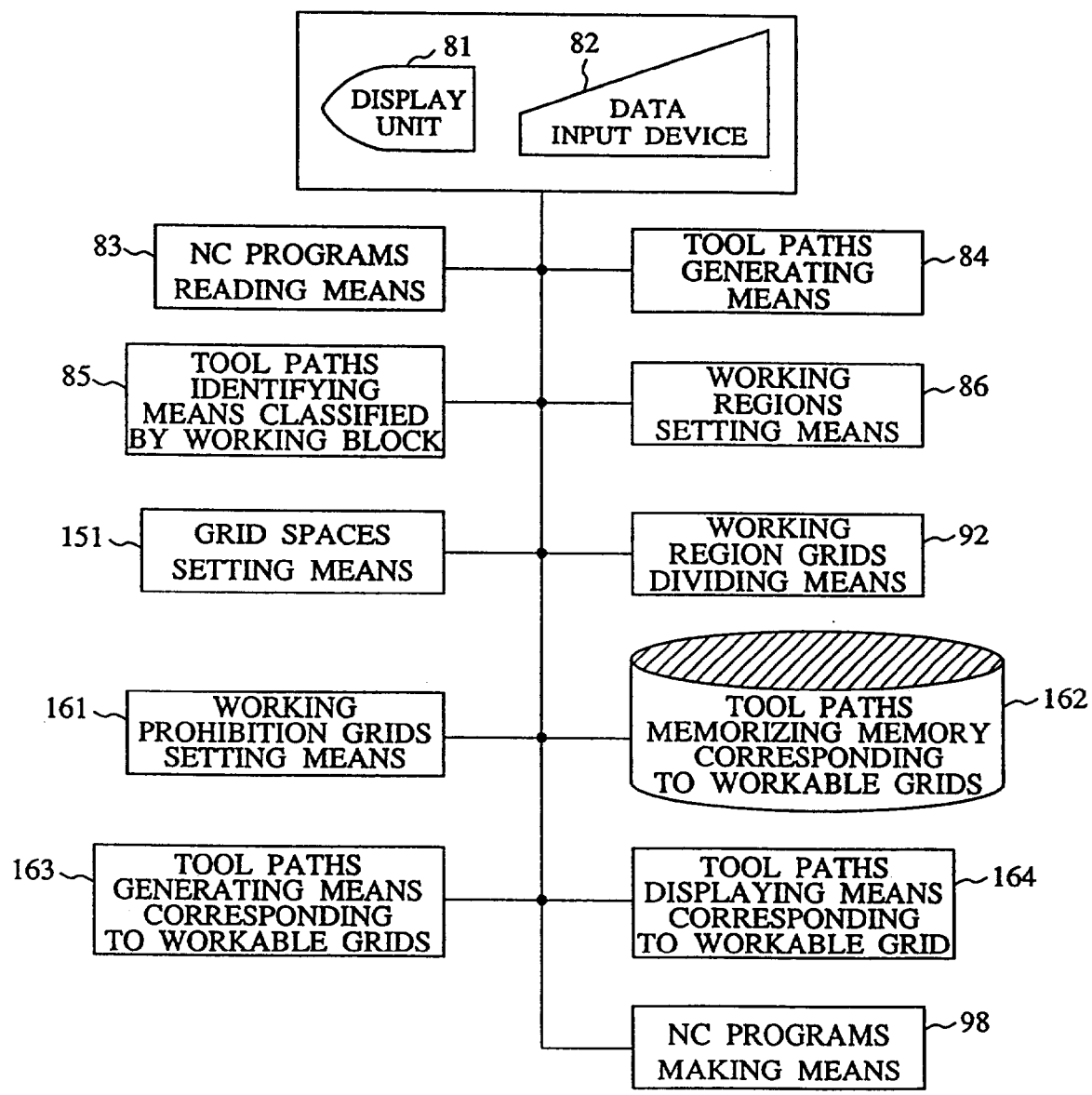
FIG. 51 illustrates a block diagram showing the NC apparatus for the machine tool of the embodiment 22 of the present invention.

FIG. 51 illustrates a block diagram of an NC apparatus for a machine tool of an embodiment of the invention. In FIG. 51, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 92 designates a working region grid-like dividing means, reference numeral 98 designates an NC program making means, reference numeral 151 designates a grid space setting means, reference numeral 161 designates a working prohibition grid setting means, reference numeral 162 designates a tool path memorizing memory corresponding to a workable grid, reference numeral 163 designates a tool path generating means corresponding to a workable grid, and reference numeral 164 designates a tool path displaying means corresponding to a workable grid.

Figure 53:
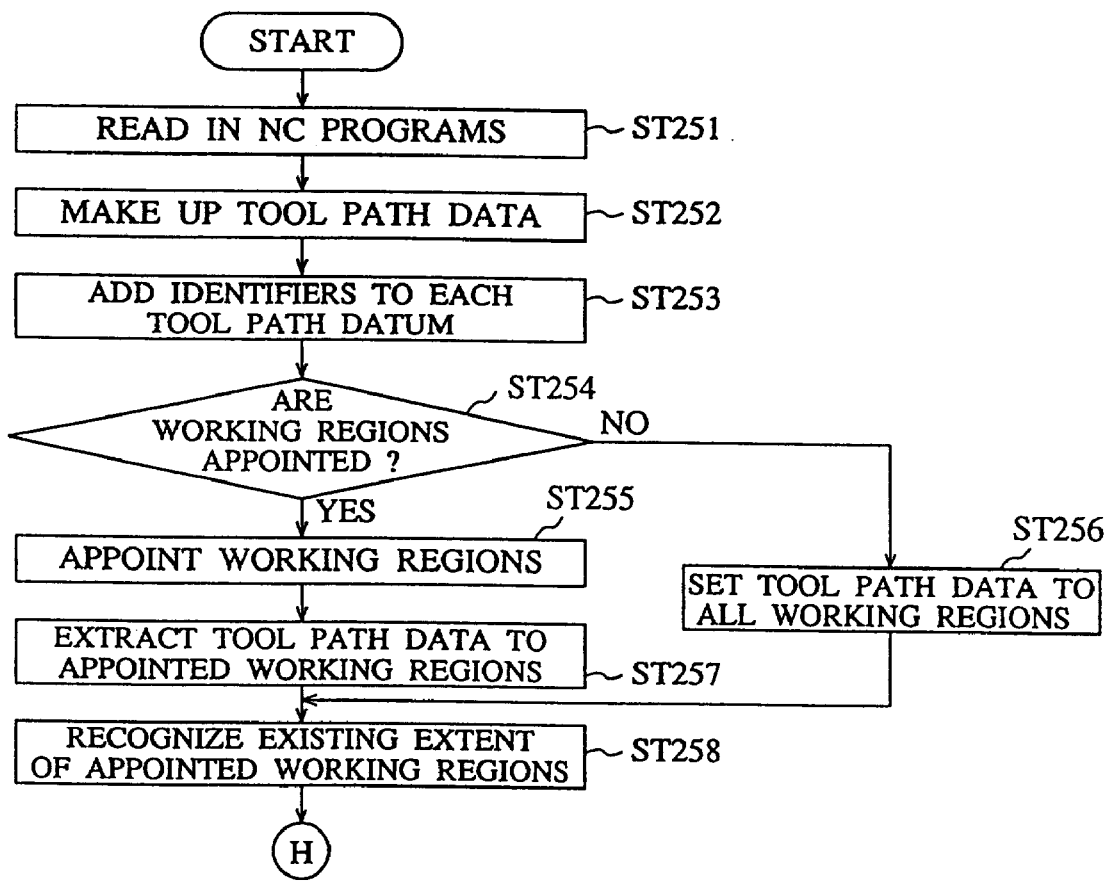
FIG. 53 illustrates a flow chart for describing the operation of the NC apparatus of the embodiment 22.
Figure 54:
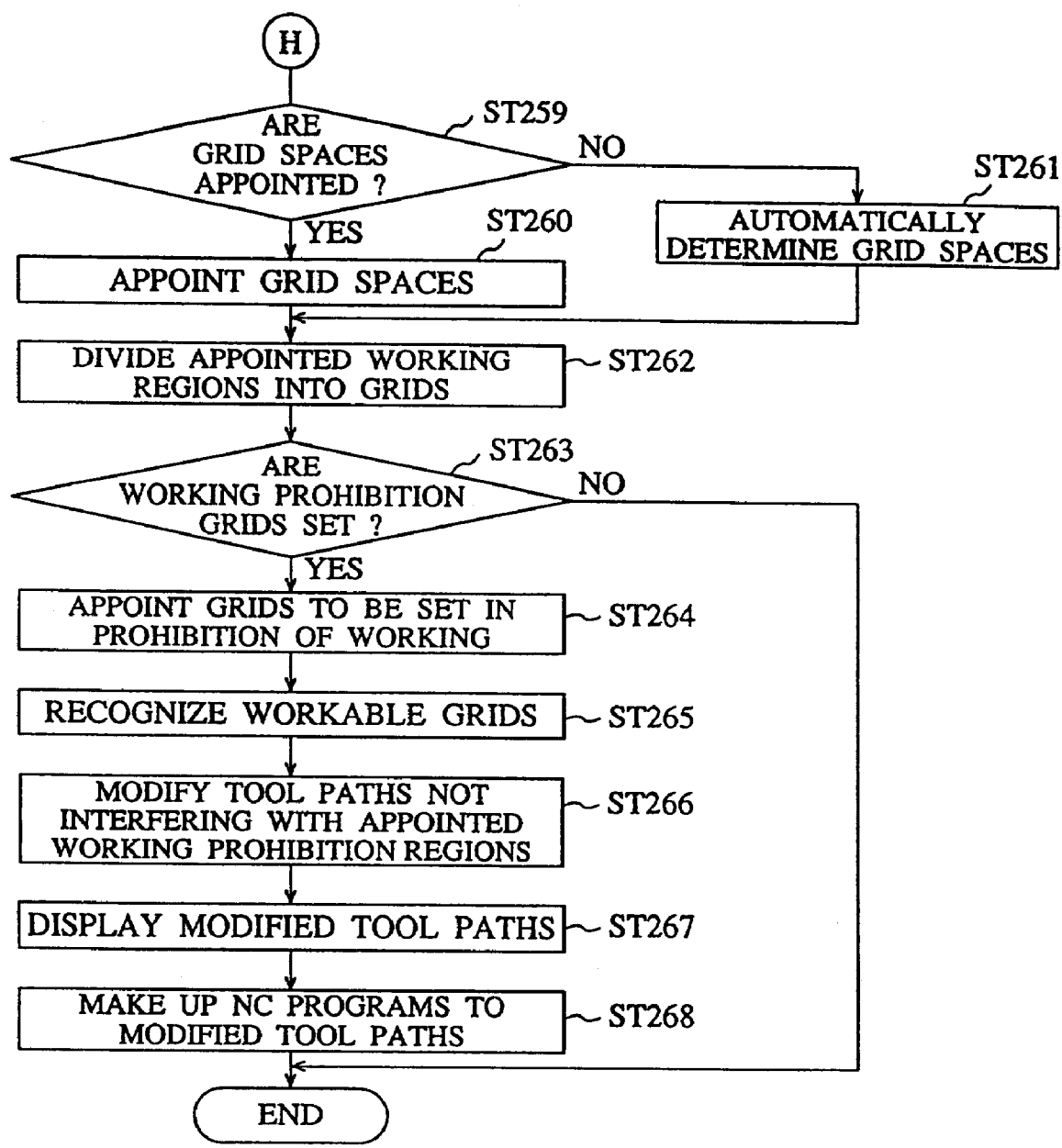
FIG. 54 illustrates a continuation of the flow chart of FIG. 53.

Next, the operation will be described thereof. FIG. 53 and FIG. 54 illustrate flow charts showing the procedures of manipulations and operations, and the description will be done on the basis of FIG. 53 and FIG. 54. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15, 16, 17, 18, 19, 20 and 21 (STEP ST251–STEP ST262).

Next, when the operator wants to appoint arbitrary grids as the working prohibition regions and to obtain the tool paths not to interfere with the working prohibition regions, he appoints so as to select the grids to be made to the working prohibition regions (STEP ST263), and selects the working prohibition grids indicating the chuck parts of lathes, the existing parts of fixtures used at machining centers, and the like out of the displayed grid groups (STEP ST264). Then, he identifies the grids other than the grids appointed as the working prohibition grids as the grids being workable regions (STEP ST265).

Next, he judges whether there are tool paths in the working prohibition grids or not. Then, if there are tool paths in the working prohibition regions, he modifies the tool paths so as to be included in the workable grids nearest to the working prohibition grids (STEP ST266). And, he displays the tool paths modified so that all of them are included in the workable grids on the display screen (STEP ST267). To the modified tool path data, the aforementioned correction calculations and interpolations are again executed, and they are transformed into the tool path data to be memorized in the tool paths memorizing memory corresponding to workable grids 162 (STEP ST268).

As a result of the aforementioned processes, the NC programs modified not to interfere are resulted to be made up by operator's selecting grids to set the working prohibition regions and by modifying the tool paths not so as to interfere with the working prohibition regions.

Figure 52:
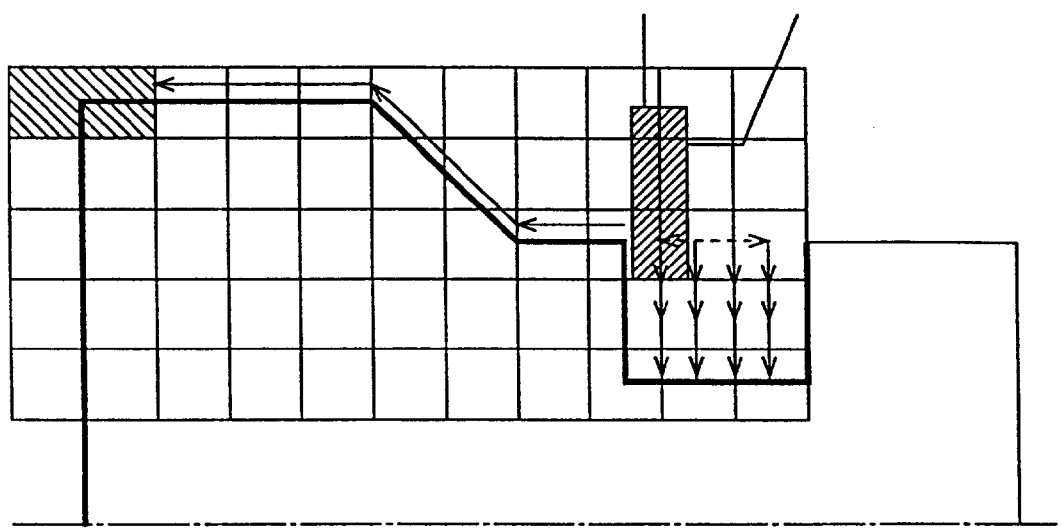
FIG. 52 illustrates a display screen picture of the NC apparatus of the embodiment 22.

FIG. 52 illustrates an example of the display screen of the present embodiment, and displays the screen in the case where the operator appoints the working regions of a ditch part and the outside diameter part following the ditch part to the NC programs for lathes shown in FIG. 23. This screen displays a working region being divided into grids, and the two grids appointed by the operator as the working prohibition region. Besides, FIG. 52 displays the tool paths modified not so as to interfere with the working prohibition region.

EMBODIMENT 23

Figure 55:
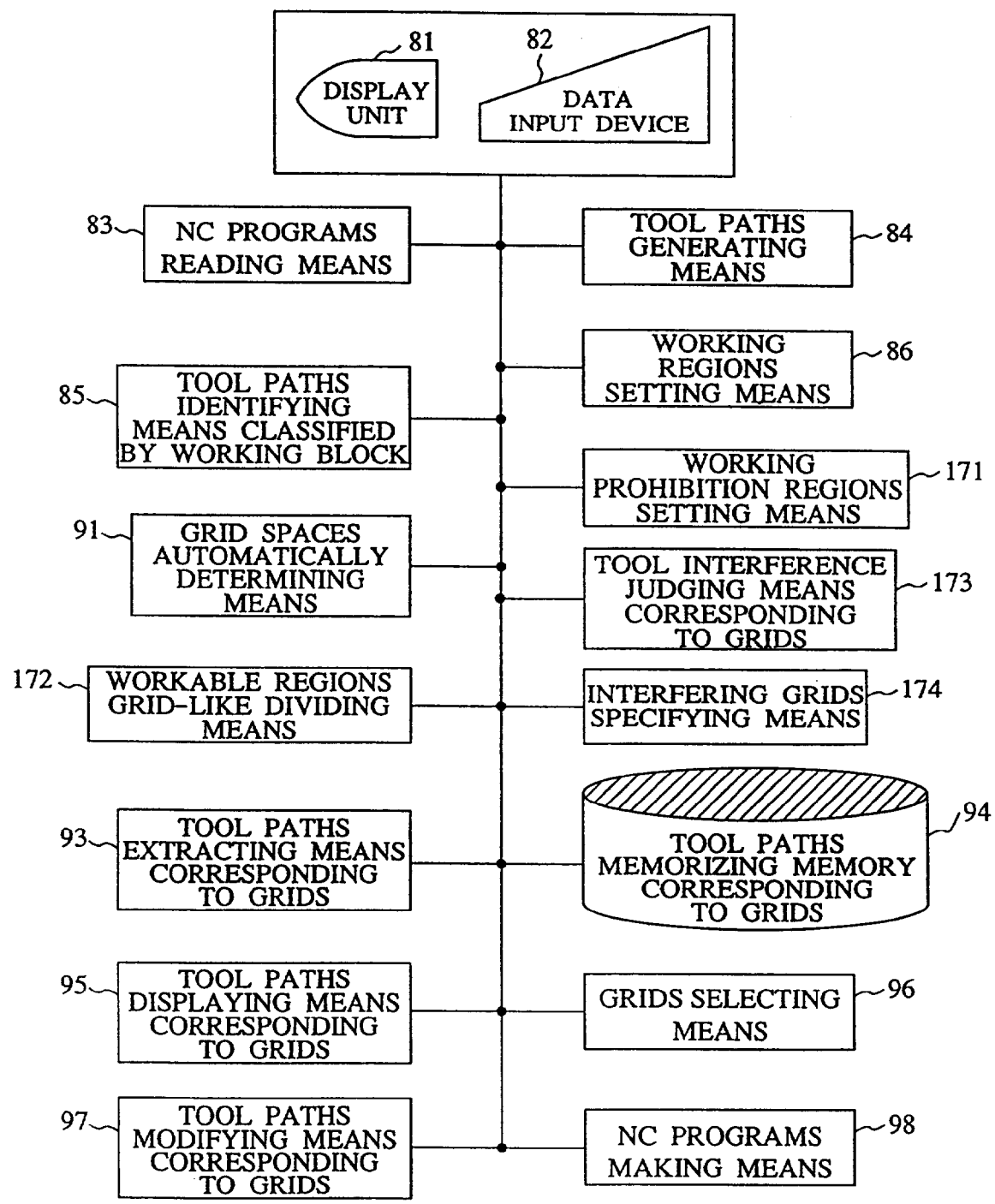
FIG. 55 illustrates a block diagram showing the NC apparatus for the machine tool of the embodiment 23 of the present invention.

FIG. 55 illustrates a block diagram of an NC apparatus for a machine tool of an embodiment of the invention. In FIG. 55, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 91 designates a grid space automatically determining means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 97 designates a tool path modifying means corresponding to a grid, reference numeral 98 designates an NC program making means, reference numeral 171 designates a working prohibition region setting means, reference numeral 172 designates a workable region grid-like dividing means, reference numeral 173 designates a tool interference judging means corresponding to a grid, and reference numeral 174 designates an interfering grid specifying means.

Figure 57:
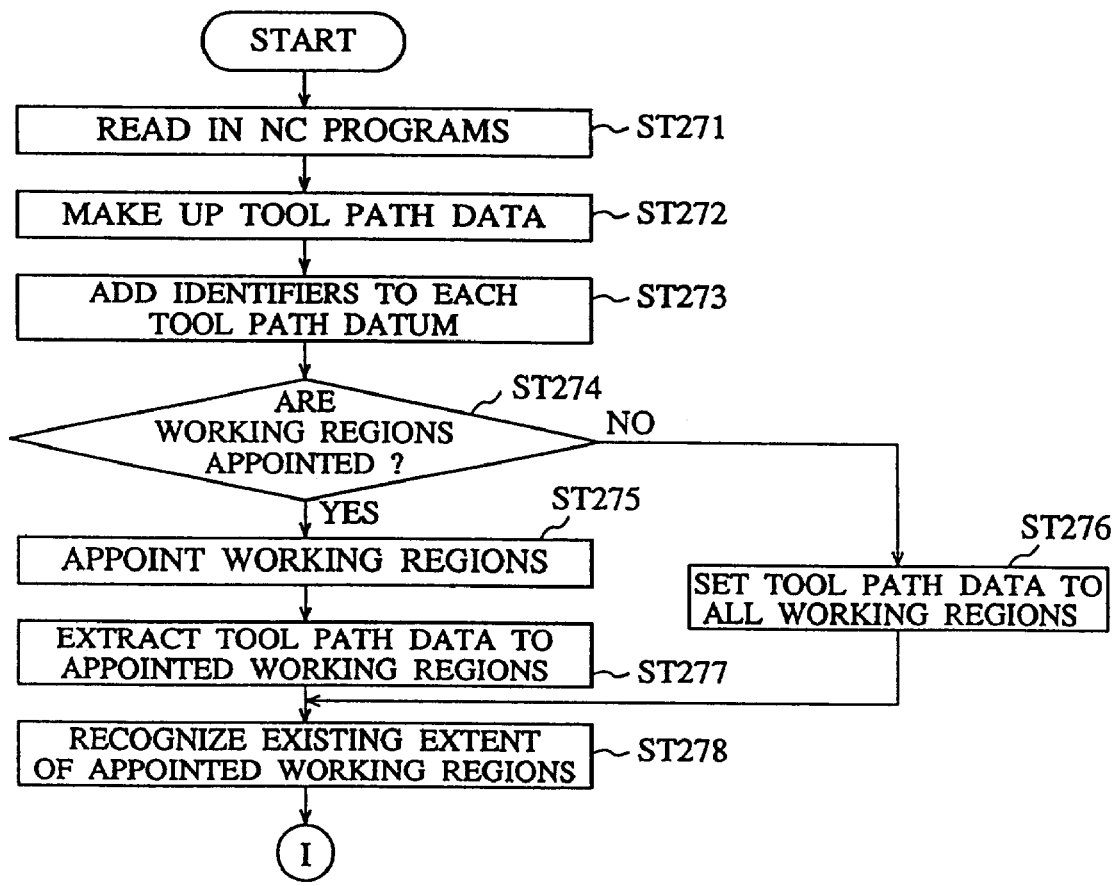
FIG. 57 illustrates a flow chart for describing the operation of the NC apparatus of the embodiment 23.
Figure 58:
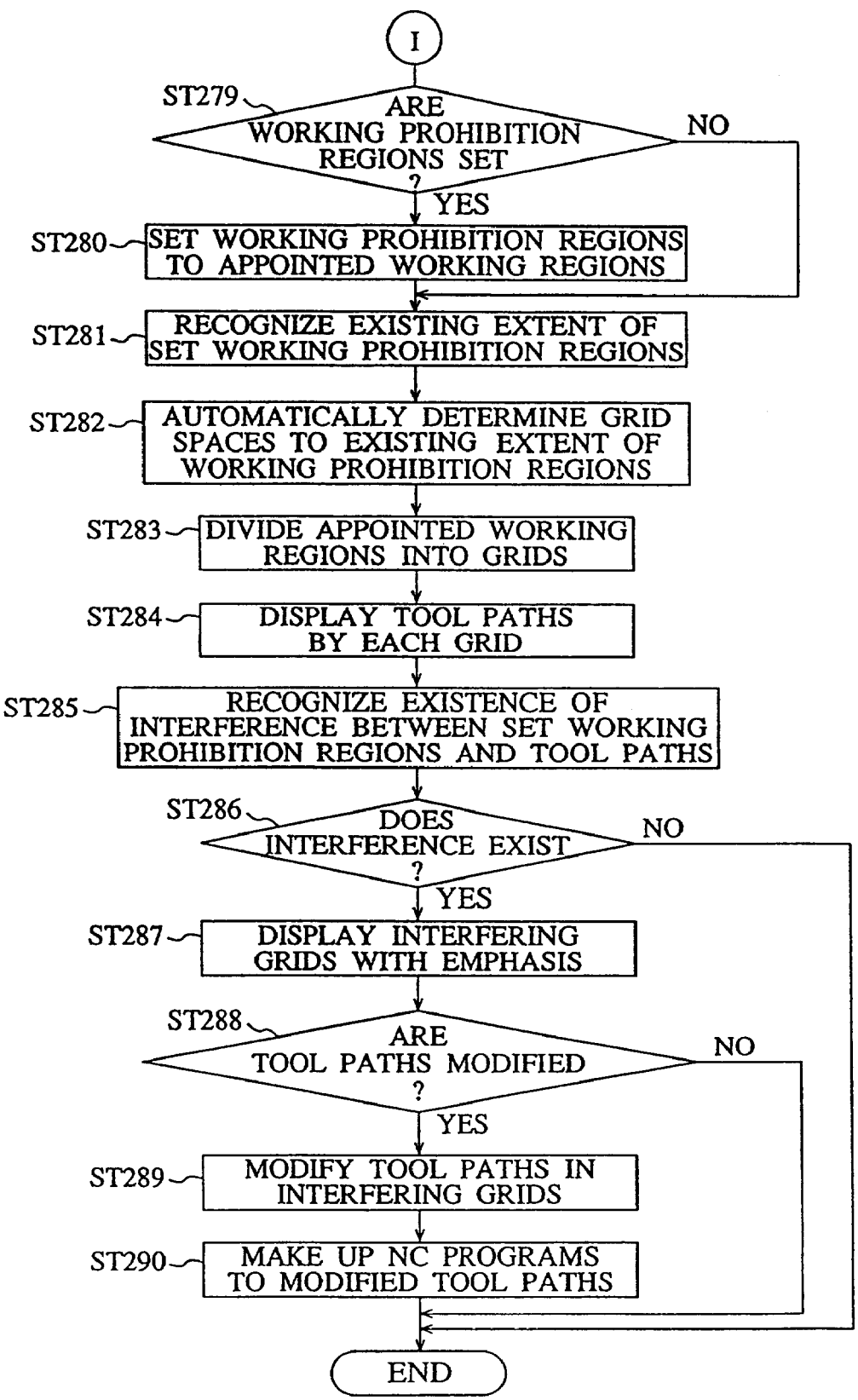
FIG. 58 illustrates a continuation of the flow chart of FIG. 57.

Next, the operation will be described thereof. FIG. 57 and FIG. 58 illustrate flow charts showing the procedures of manipulations and operations, and the description will be done on the basis of FIG. 57 and FIG. 58. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15, 16, 17, 18, 19, 20, 21 and 22 (STEP ST271–STEP ST278).

Next, when the operator wants to set working prohibition regions to the appointed working regions to check the interference with the working prohibition regions (STEP ST279), he sets the working prohibition regions by drawing the working prohibition regions to the working regions displayed on the display unit (STEP ST280). Then, he identifies the existing extent of the set working prohibition regions (STEP ST281), and makes grid spaces automatically be determined so as to correspond to the identified existing extent (STEP ST282). Although the input data of drawing are the coordinate values of the display coordinate system, the existing extent identified in this case are identified as the coordinate values of the working blocks. According to the sizes of the existing extent, the grid spaces are set so that the prohibition regions always come to the boundaries of grids. The grid spaces are set so as to judge whether the interference occurs or not. But the judgment of the interference is impossible at this point of time.

As for the method of the drawing of the working prohibition regions, following methods can be taken. That is to say, the method to draw the figures of closed shapes composed of liner lines or circular arcs as the working prohibition regions, the method to input the coordinate values of the standardized shapes such as chucks etc. in advance, or the like can be taken.

Next, the operator divides the appointed working regions in conformity to the determined grid spaces, and identifies the tool path data corresponding to each grid (STEP ST283). And, he makes the working regions included in each grid and their tool paths display on the display unit (STEP ST284).

Next, the operator judges whether there are tool path data in the grids including the working prohibition regions set by him or not (STEP ST286). Then, if some tool paths interfere with the working prohibition regions (STEP ST386), the tool paths in the interfering grids are highlighted (or displayed in boldfaced or colored) (STEP ST287).

When the operator tries to modify the interfering highlighted tool paths (STEP ST288), he modifies the tool paths included in the interfering grids (STEP ST289). And, to the modified tool paths, the aforementioned correction calculations and interpolation processes are again executed, and they are transformed into the tool path data to be memorized in the tool path memorizing memory corresponding to a grid 94 (STEP ST290). If the operator does not modify the interfering tool paths, the processes are finished as it is.

As a result of the aforementioned processes, the checking of the interference to the working regions which the operator appointed is executed by setting the working prohibition regions by drawing, and by dividing the working regions corresponding to the working prohibition regions into grids. And further the NC programs modified not so as to interfere are resulted to be made up by selecting grids from the result of the checking of the interference to modify the tool paths not so as to interfere.

Figure 56:
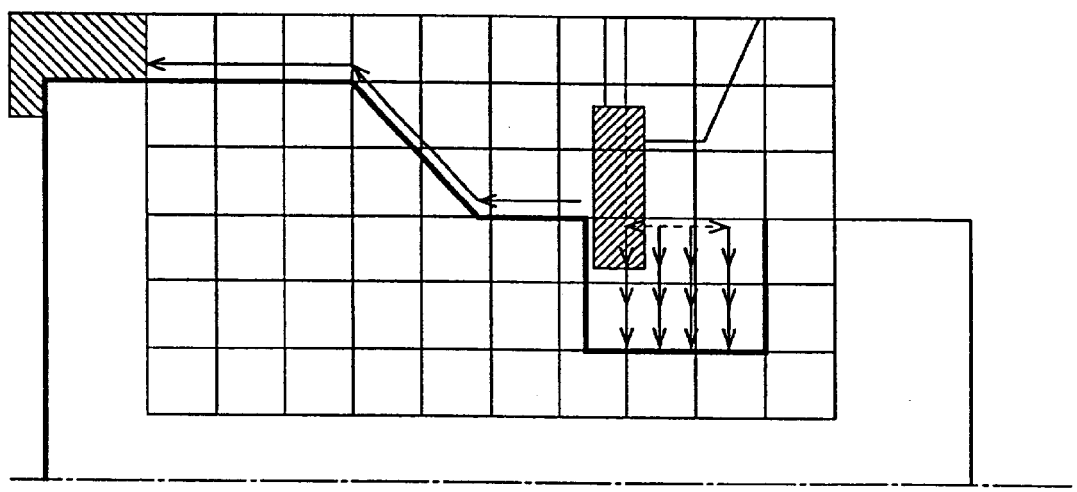
FIG. 56 illustrates a display screen picture of the NC apparatus of the embodiment 23.

FIG. 56 illustrates an example of the display screen of the present embodiment, and displays the screen in the case where the operator appoints the working regions of a ditch part and the outside diameter part following the ditch part to the NC programs for lathes shown in FIG. 23. This screen displays a working prohibition region drawn with hatching on the left side end of the working prohibition region and the grid corresponding to it in a divided state. Besides, FIG. 52 displays the modified tool paths in the case where the operator modified the tool paths after ascertaining the grids interfering the tool paths at the outside diameter part. The grids are drawn in the working prohibition regions also, in spite of not shown in FIG. 56.

EMBODIMENT 24

Figure 59:
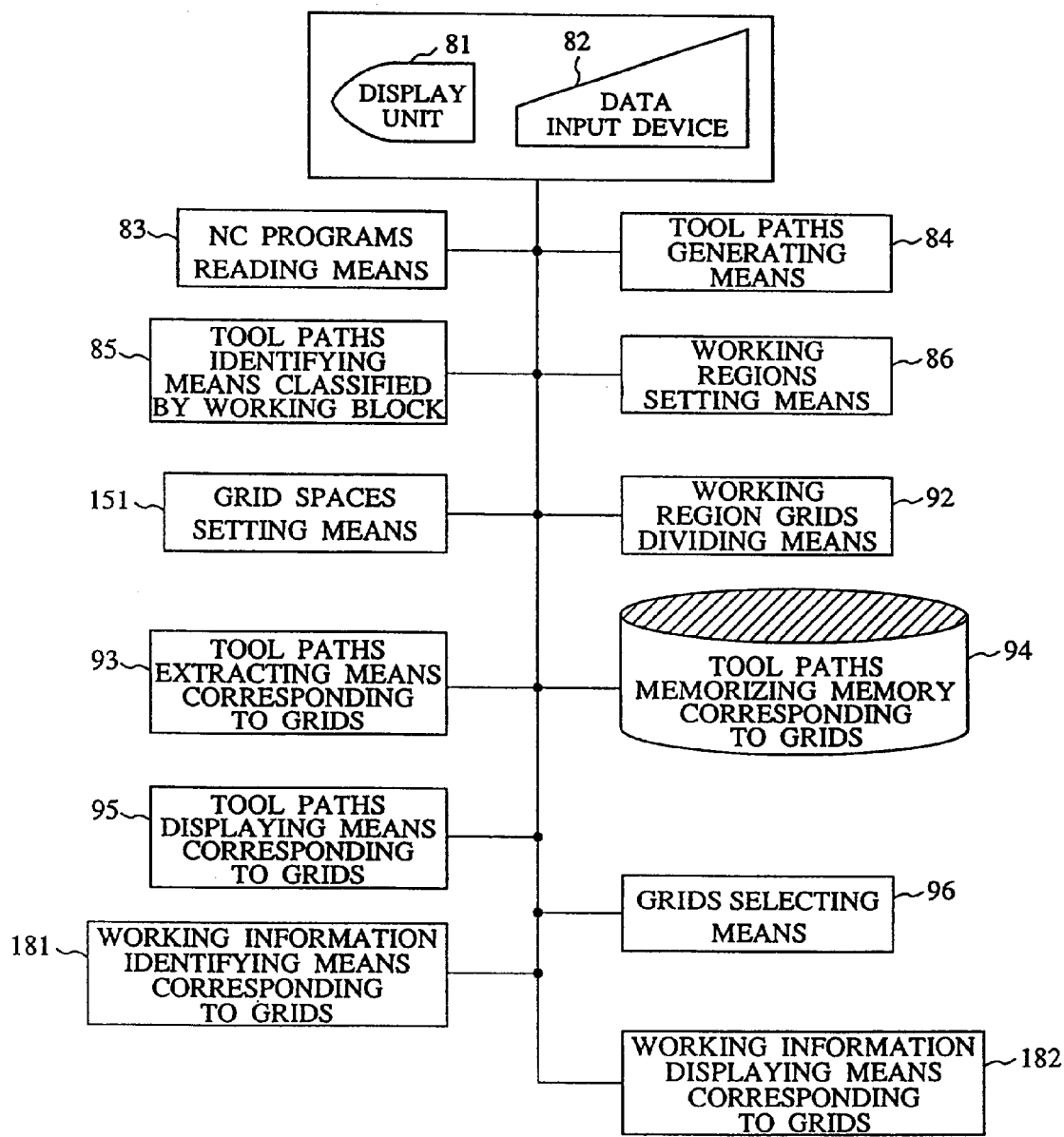
FIG. 59 illustrates a block diagram showing the NC apparatus for the machine tool of the embodiment 24 of the present invention.

FIG. 59 illustrates a block diagram of an NC apparatus for a machine tool of an embodiment of the invention. In FIG. 59, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 151 designates a grid space setting means, reference numeral 181 designates a working information identifying means corresponding to a grid, reference numeral 182 designates a working information displaying means corresponding to a grid.

Figure 61:
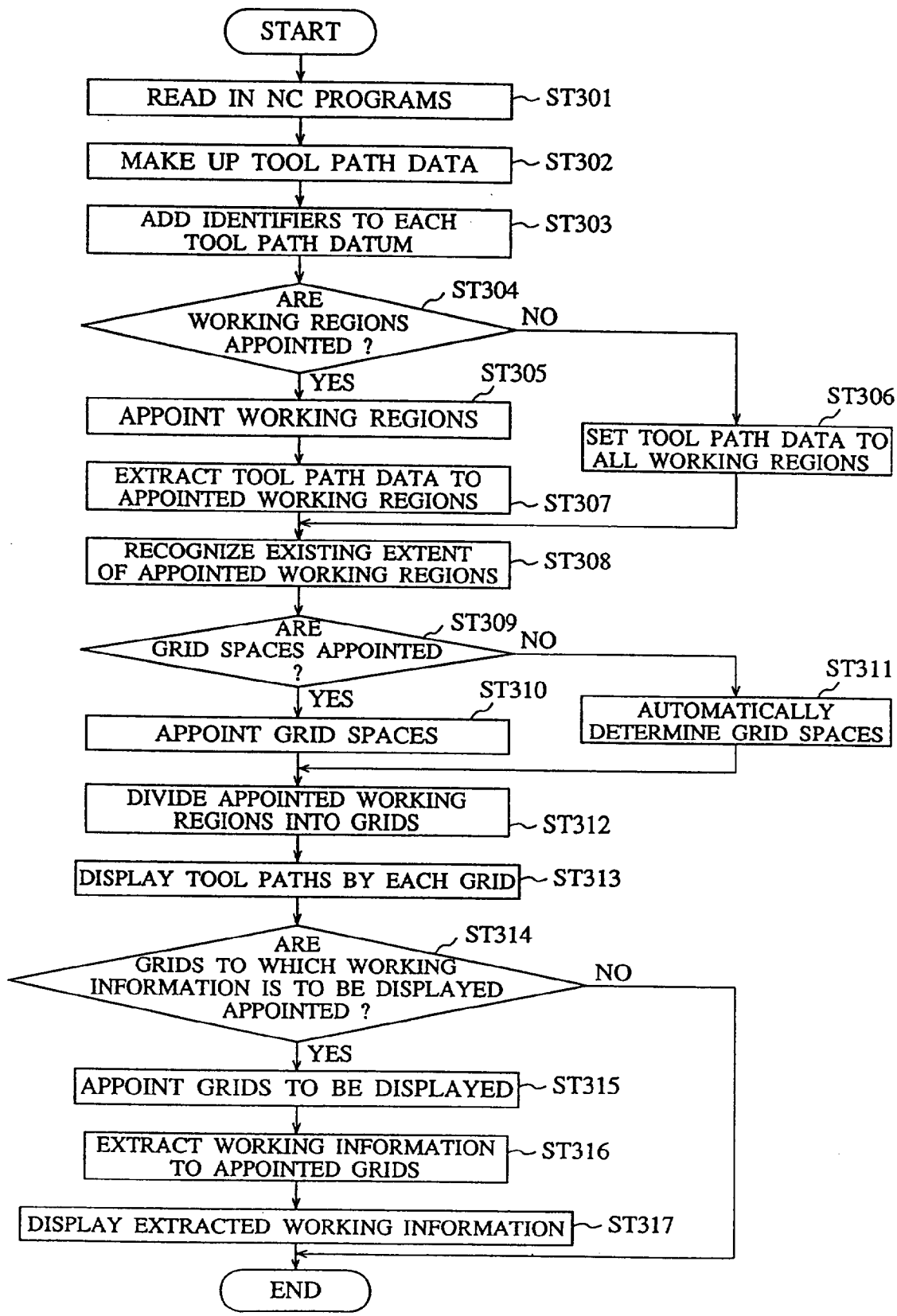
FIG. 61 illustrates a flow chart for describing the operation of the NC apparatus of the embodiment 24.

Next, the operation will be described thereof. FIG. 61 illustrates a flow chart showing the procedures of manipulations and operations, and the description will be done on the basis of FIG. 61. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15, 16, 17, 18, 19, 20 and 21 (STEP ST301–STEP ST313).

Next, when the operator wants to select arbitrary grids and to ascertain the working information included in the grids (STEP ST314), he selects one or more grids including the tool paths to which he wants to display the working information (STEP ST315).

To the selected grids, the corresponding tool path data are extracted out of the tool path memorizing memory corresponding to a grid 94, and the working information composed of the kinds of the corresponding tools to be used and machining conditions is extracted out of the identifiers of the extracted tool path data and the NC programs read in (STEP ST316). And, the extracted working information is displayed on the display screen (STEP ST317). As a result of the aforementioned processes, the working information corresponding to tool paths is resulted to be displayed by operator's selecting one or more grids to the working regions appointed by himself.

Figure 60:
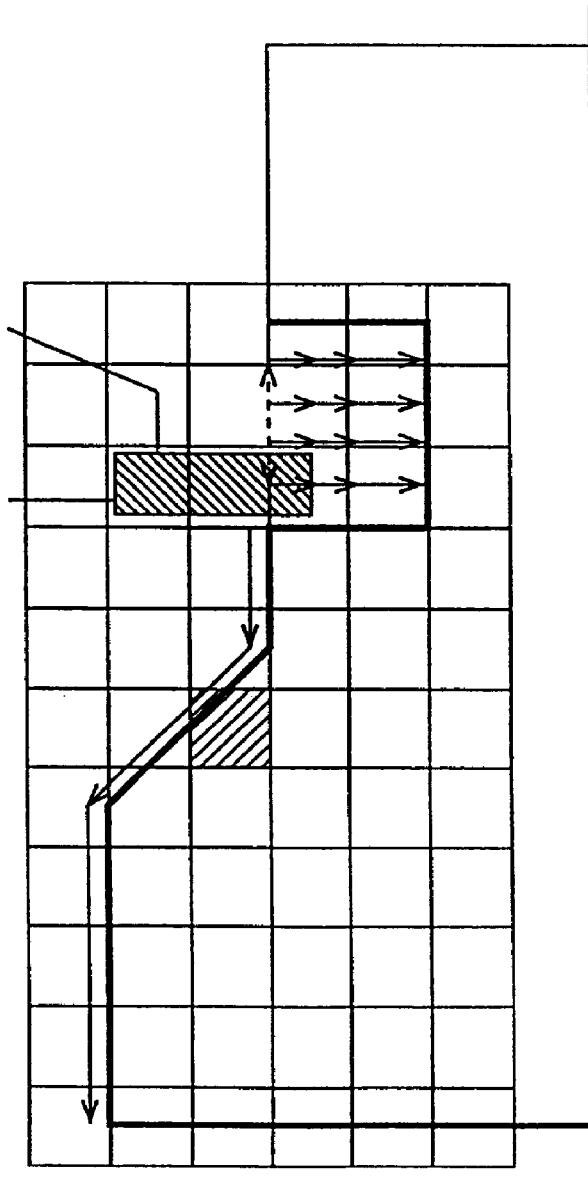
FIG. 60 illustrates a display screen picture of the NC apparatus of the embodiment 24.

FIG. 60 illustrates an example of the display screen of the present embodiment, and displays the screen in the case where the operator appoints the working regions of a ditch part and the outside diameter part following the ditch part to the NC programs for lathes shown in FIG. 23. This screen displays the state where a grid being divided into grids so as to corresponding to the working regions and including a part of the tool paths of the outside diameter part (shown with hatching) is selected, and further displays the working information corresponding to the state on the right side.

EMBODIMENT 25

Figure 62:
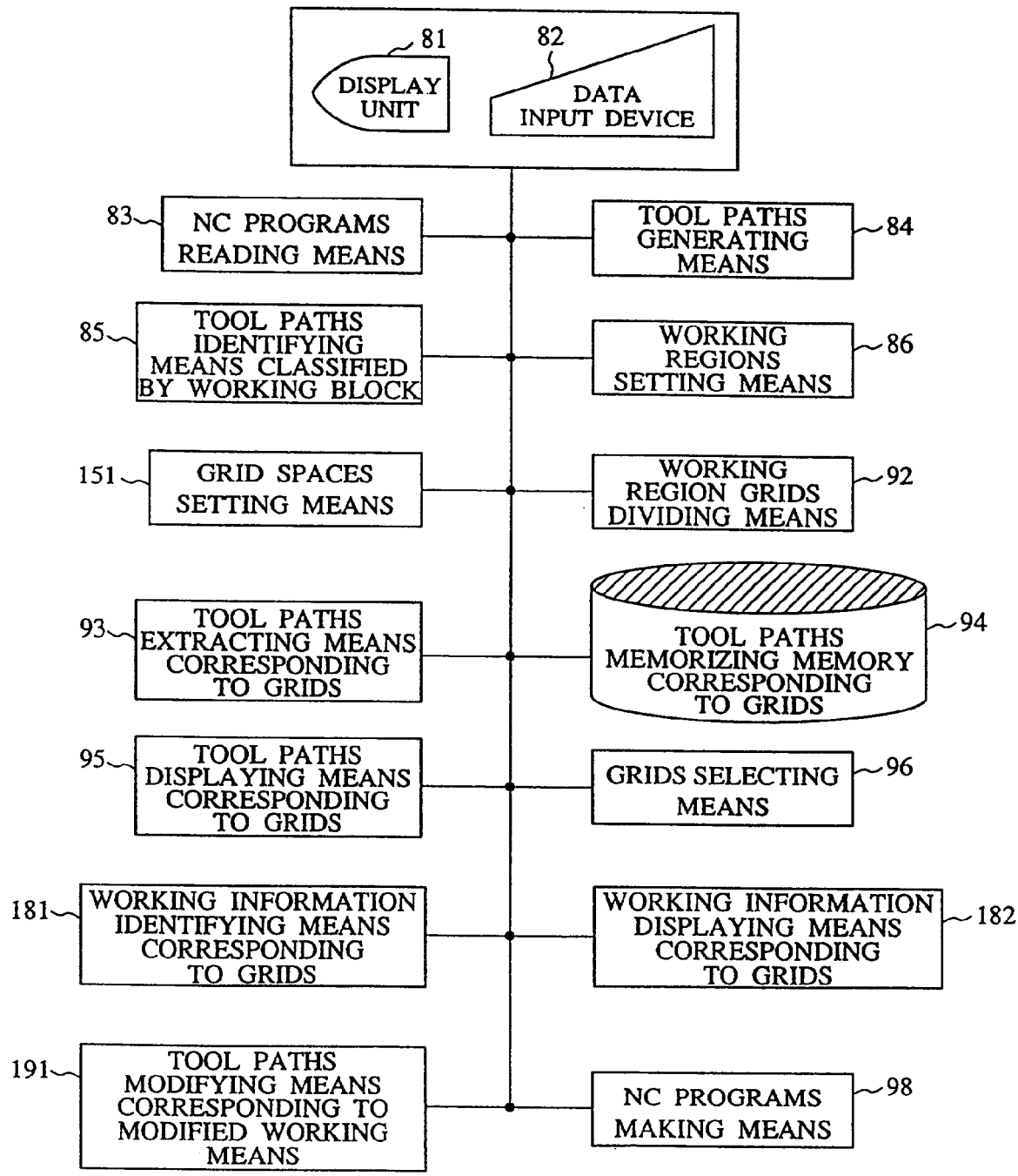
FIG. 62 illustrates a block diagram showing the NC apparatus for the machine tool of the embodiment 25 of the present invention.

FIG. 62 illustrates a block diagram of an NC apparatus for a machine tool of an embodiment of the invention. In FIG.

62, reference numeral 81 designates a display unit, reference numeral 82 designates a data input device, reference numeral 83 designates an NC program reading means, reference numeral 84 designates a tool path generating means, reference numeral 85 designates a tool path identifying means classified by a working block, reference numeral 86 designates a working region setting means, reference numeral 92 designates a working region grid-like dividing means, reference numeral 93 designates a tool path extracting means corresponding to a grid, reference numeral 94 designates a tool path memorizing memory corresponding to a grid, reference numeral 95 designates a tool path displaying means corresponding to a grid, reference numeral 96 designates a grid selecting means, reference numeral 98 designates an NC program making means, reference numeral 151 designates a grid space setting means, reference numeral 181 designates a working information identifying means corresponding to a grid, reference numeral 182 designates a working information displaying means corresponding to a grid, and reference numeral 191 designates a tool path modifying means corresponding to the modified working information.

Figure 64:
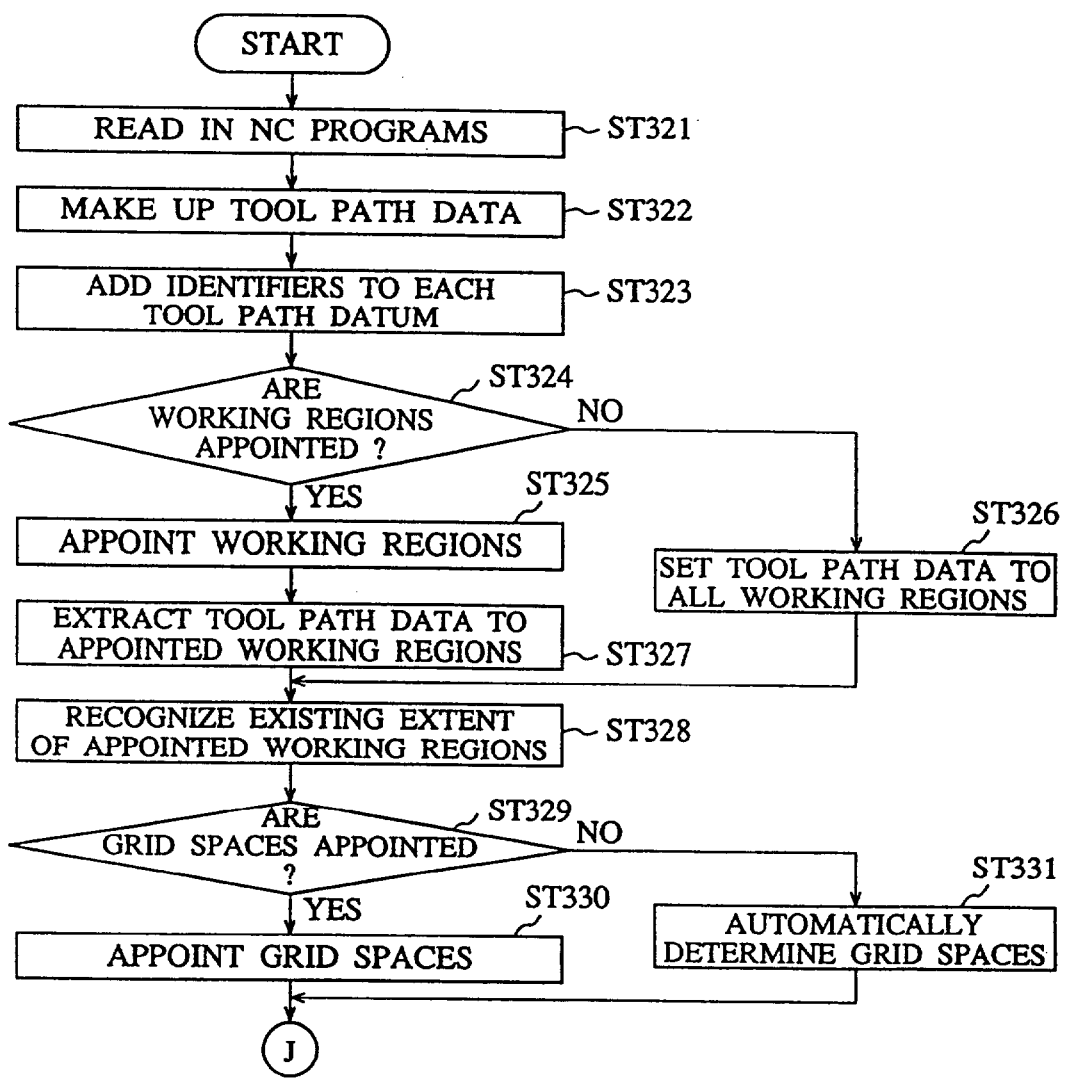
FIG. 64 illustrates a flow chart for describing the operation of the NC apparatus of the embodiment 25.
Figure 65:
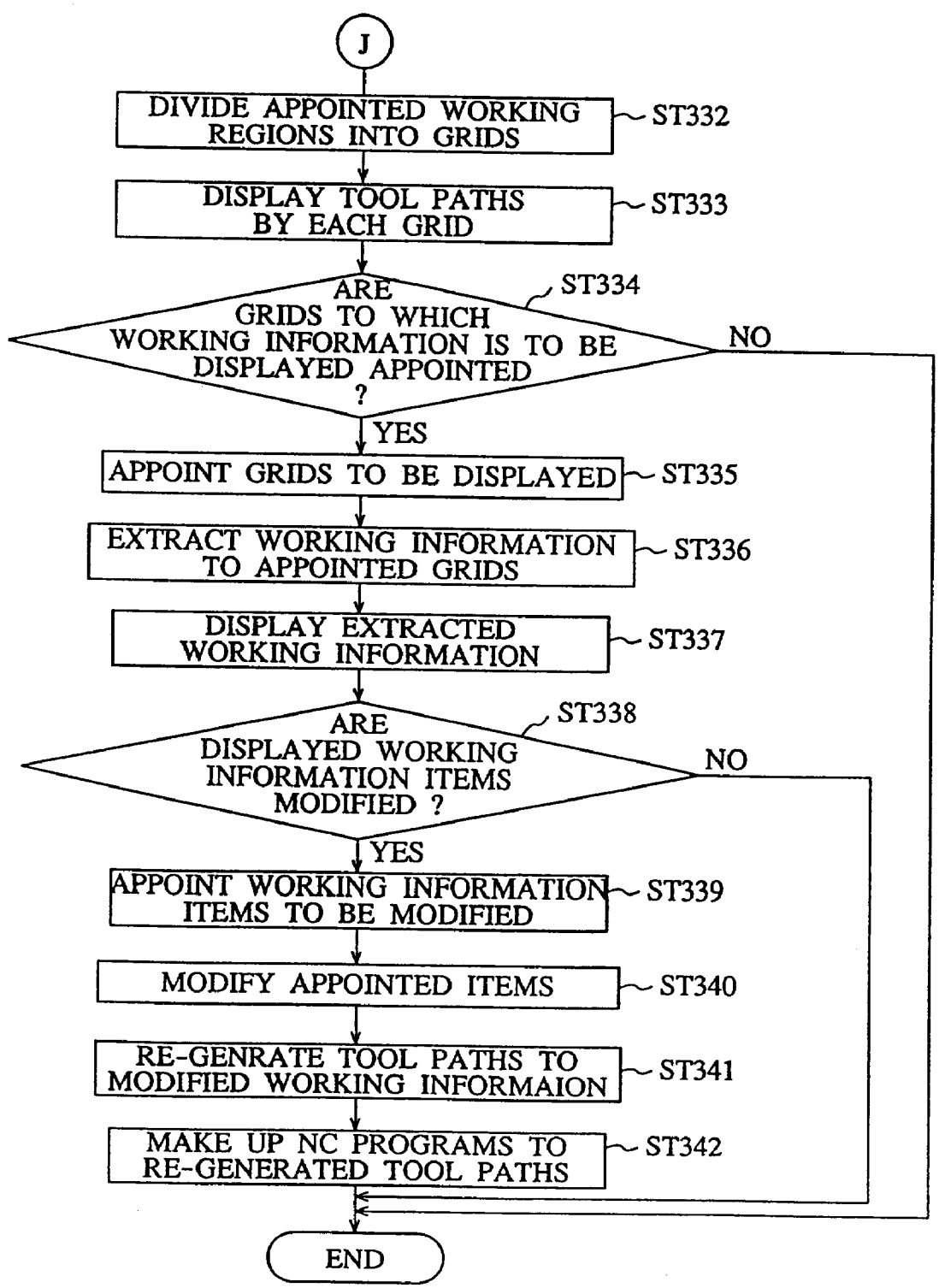
FIG. 65 illustrates a continuation of the flow chart of FIG. 61.

Next, the operation will be described thereof. FIG. 64 and FIG. 65 illustrate flow charts showing the procedures of manipulations and operations, and the description will be done on the basis of FIG. 64 and FIG. 65. The first process of reading in the NC program made up by an operator, the operator's locally appointing working regions to all of the working regions in the NC program displayed on the display unit 81, dividing the appointed working regions into grids, and displaying the tool paths of each of the divided grids is identical to that of the embodiments 15, 16, 17, 18, 19, 20, 21 and 24 (STEP ST321–STEP ST333). Besides, the processes of operator's selecting arbitrary grids and displaying the working information corresponding to the tool paths included in the selected grids are identical to those of the embodiment 24 (STEP ST334–STEP ST337).

Next, when the operator wants to modify the items of the working information and to obtain the tool paths corresponding to the modified working information (STEP ST338), he selects the items which he wants to modify to the working information displayed on the display screen (STEP ST339). Then he modifies the selected items (STEP ST340).

Next, the tool paths are modified in accordance with the modified working information (STEP ST341), and to the modified tool paths, the aforementioned correction calculations and interpolation processes are again executed to transform them into the tool path data for memorizing them into the tool path memorizing memory corresponding to a grid 94 (STEP ST342). As a result of the aforementioned processes, operator's modifying the working information corresponding to the grids appointed by himself results the modification of the tool paths, and brings about making up the modified NC programs.

Figure 63:
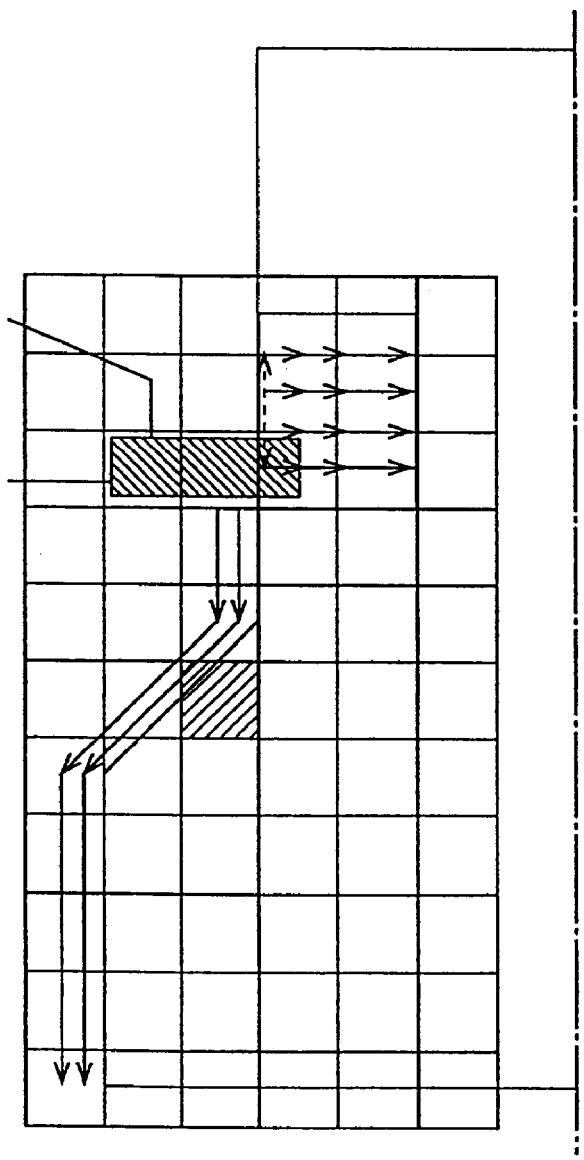
FIG. 63 illustrates a display screen picture of the display unit of the NC apparatus of the embodiment 25.

FIG. 63 illustrates an example of the display screen of the present embodiment, and displays the state in the case where the operator selects the item of the amount of cutting and modified it from 2.4 mm to 1.2 mm. Besides, the tool paths at the outside diameter part are displayed to cut by cutting in two times.

It will be appreciated from the foregoing description that, according to the first aspect of the present invention, the NC apparatus for the machine tool is constructed to comprise a standard database storing standard data, an input device inputting user's own data, one or more user's own databases, and a tool and machining condition automatically determining means determining tool and machining condition data by the use of these databases, and consequently, the NC apparatus for the machine tool can utilize the know-how possessed by skillful workers in case of automatically determining tools and machining conditions. And, since it is possible to classify and preserve the user's own databases divided to each use and case, the effect being capable of efficiently storing and utilizing the know-how is obtained.

Furthermore, according to the second aspect of the present invention, the NC apparatus for the machine tool is constructed to comprise a display unit displaying a standard database and a user's own database, a data editing means modifying displayed data of database, and a database managing means re-determining the data of the tools and the machining conditions having been determined before the modification in accordance with the modified data, and consequently, in addition to the effects of the first aspect of the present invention, this second aspect of the present invention has another effect that it is possible for an operator to modify the contents of the database while he is looking at the contents one after another to influence the modified contents to the modification.

Furthermore, according to the third aspect of the present invention, the NC apparatus for the machine tool is constructed to comprise a contradiction checking means checking the contradiction between newly registered data and existing data, and consequently, it has an effect to be able to renew the data suitably and to store and utilize the know-how efficiently in addition to the effects of the first aspect of the present invention.

Furthermore, according to the fourth aspect of the present invention, the NC apparatus for the machine tool is constructed to comprise a selecting means appointing to use either a standard database or a user's own database, and consequently, it has an effect to be able to utilize the databases suitably in accordance with each use and case in addition to the effects of the first aspect of the present invention.

Furthermore, according to the fifth aspect of the present invention, the NC apparatus for the machine tool is constructed to comprise a selecting means appointing a database to be used among plural user's own databases, and consequently, it has an effect to be able to store and utilize the know-how more efficiently.

Furthermore, according to the sixth aspect of the present invention, the NC apparatus for the machine tool is constructed to have one or more tool and machining condition memorizing means for memorizing tool data or machining condition data other than the data registered in a standard database and a user's own database, and consequently, it has an effect to be able to determine tools and machining conditions on the basis of more various conditions.

Furthermore, according to the seventh aspect of the present invention, the NC apparatus for the machine tool is constructed so that an operator can select usable tools and machining conditions by displaying them, and consequently, it has an effect to give the operator the freedom of selecting.

Furthermore, according to the eighth aspect of the present invention, the NC apparatus for the machine tool is constructed to comprise an experimental working generation part determining working experiment items, an experimental working indication part giving indications necessary for working experiments to a worker, an experimental working result analysis part analyzing the results of working experiments, and a machining condition generation part generating machining conditions on the basis of the results of the analysis of the experimental working result analysis part, and consequently, it has an effect to be able to select the optimum machining conditions efficiently and with substantiations.

Furthermore, according to the ninth aspect of the invention, the NC apparatus for the machine tool is constructed to comprise a tool path identifying means classified by a working block adding identifiers so as to identify tool paths by fractionizing to each working block, a working region setting means appointing desired working regions to one or more working regions displayed on a display unit, a tool path extracting means corresponding to an appointed working region extracting tool paths corresponding to the existing extent of the appointed working regions, and a tool path displaying means displaying the extracted tool paths on the display unit, and consequently, it has the effects to be able to only display the tool paths of the appointed working regions at high speed by the operator's appointment of the working regions and to easily execute the confirmation of its operation before actual working.

Furthermore, according to the tenth aspect of the present invention, the NC apparatus for the machine tool is constructed to comprise a working region grid-like dividing means dividing the appointed working regions and the tool paths corresponding to the appointed working regions into a grid-like state, a tool path extracting means corresponding to a grid extracting tool paths corresponding to each grid, a tool path displaying means corresponding to a grid displaying the working regions divided into a grid-like state and the tool paths corresponding to the working regions on the display unit, a grid selecting means appointing displayed tool paths by the grid, and a tool path editing means corresponding to a grid modifying the appointed tool paths, and consequently, it has the effects that the tool paths corresponding to the working regions appointed by an operator can be locally modified when the confirmation of its operation is executed before actual working, and that NC programs can be modified thereby.

Furthermore, according to the eleventh aspect of the present invention, the NC apparatus for the machine tool is constructed to comprise a visible outline of a working region modifying means corresponding to a grid modifying the visible outlines of the working regions corresponding to the appointed grids, and a tool path modifying means corresponding to a modified visible outline of a working region modifying tool paths in accordance with the modified working regions, and consequently, it has the effects that the visible outlines of the working regions appointed by an operator can be locally modified when the confirmation of its operation is executed before actual working, and that the tool paths corresponding to the visible outlines can be made up, and further that NC programs can be modified thereby.

Furthermore, according to the twelfth aspect of the present invention, the NC apparatus for the machine tool is constructed to comprise a selected grid magnifying means, and a tool path displaying means corresponding to a magnified grid displaying the working regions included in the magnified grids and the tool paths corresponding to the working regions on a display unit, and consequently, it has an effect that the working regions and their tool paths appointed by an operator can be displayed in a locally magnified state when the confirmation of its operation is executed before actual working.

Furthermore, according to the thirteenth aspect of the present invention, the NC apparatus for the machine tool is constructed to comprise a working region of a magnified grid re-dividing means re-dividing grids, a tool path displaying means corresponding to a grid of a magnified grid displaying the tool paths corresponding to the re-divided grids, a grid of a magnified grid selecting means appointing the displayed tool paths by the re-divided grid, and a tool path modifying means corresponding to a grid of a magnified grid modifying the appointed tool paths, and consequently, it has the effects that the working regions appointed by an operator can be displayed in a locally modified state when the confirmation of its operation is executed before actual working, and that the tool paths corresponding to the working regions can be locally modified, and further that NC programs can be modified thereby.

Furthermore, according to the fourteenth aspect of the present invention, the NC apparatus for the machine tool is constructed to comprise a visible outline of a working region modifying means corresponding to a grid of a magnified grid modifying the visible outlines of the working regions corresponding to appointed grids, and a tool path modifying means corresponding to a modified visible outline of a working region of a grid of a magnified grid modifying tool paths in accordance with the modified working regions, and consequently, it has the effects that the working regions appointed by an operator can be locally magnified to locally modify the visible outlines of the working regions when the confirmation of its operation is executed before actual working, and that the tool paths corresponding to the visible outlines can be made up, and further that NC programs can be modified thereby.

Furthermore, according to the fifteenth aspect of the present invention, the NC apparatus for the machine tool is constructed to comprise a grid magnification rate setting means, and consequently, it has the effects that the magnification rates can be set to arbitrary values in case of magnifying the working regions appointed by an operator locally, and that the working efficiency of the operator can be improved.

Furthermore, according to the sixteenth aspect of the present invention, the NC apparatus for the machine tool is constructed to comprise a grid space setting means, and consequently, it has an effect that the working efficiency of the operator can be improved by enabling the localizing extent to be set to arbitrary values in case of displaying the working regions appointed by an operator locally.

Furthermore, according to the seventeenth aspect of the present invention, the NC apparatus for the machine tool is constructed to comprise a working prohibition grid setting means setting appointed grids as working prohibition regions, and a tool path generating means corresponding to a workable grid modifying tool paths not so as to interfere with the working prohibition regions, and consequently, it has the effects that an operator can easily set the working prohibition regions by appointing grids, and that he can easily make up tool paths which do not interfere with the working prohibition regions, and further that NC programs can be modified with the tool paths.

Furthermore, according to the eighteenth aspect of the present invention, the NC apparatus for the machine tool is constructed to comprise a working prohibition region setting means and a workable region grid-like dividing means dividing the appointed working regions and the tool paths corresponding to the working regions into a grid-like state on the basis of the set extent of the working prohibition regions, and consequently, it has an effect that the interference of tool paths can easily ascertained by setting the working prohibition regions to the working regions appointed by an operator and displaying the tool paths when the confirmation of its operation is executed before actual working.

Furthermore, according to the nineteenth aspect of the present invention, the NC apparatus for the machine tool is constructed to comprise a tool interference judging means corresponding to a grid judging whether tool paths interfere with working prohibition regions or not, and an interfering grid specifying means specifying the grids including tool paths when there are interfering tool paths, and consequently, it has the effects that an operator can ascertain whether tool paths interfere with the working prohibition regions set by himself when the confirmation of its operation is executed before actual working, and that he can easily modify the tool paths in case of interfering.

Furthermore, according to the twentieth aspect of the present invention, the NC apparatus for the machine tool is constructed to comprise a working information identifying means corresponding to a grid identifying the kinds of tools and the machining conditions corresponding to the tools on the basis of the working regions included in appointed grids, and a working information displaying means corresponding to a grid displaying the identified kinds of tools and machining conditions on a display unit, and consequently, it has an effect that the kinds of the tools to be used and the machining conditions corresponding to the working regions appointed by an operator can easily ascertained when the confirmation of its operation is executed before actual working.

Furthermore, according to the twenty-first aspect of the present invention, the NC apparatus for the machine tool is constructed to comprise a tool path modifying means corresponding to the modified working information appointing the arbitrary data of the kinds of tools and machining conditions displayed on a display unit and modifying the appointed data to re-make up tool paths on the basis of the modified data, and consequently, it has an effect that the tool paths to the modified information is made up by modifying the arbitrary items of the kinds of the tools to be used and the machining conditions corresponding to the working regions appointed by an operator when the confirmation of its operation is executed before actual working for enabling the modification of NC programs by the made tool paths.

While preferred embodiments of the present invention have been described using specific terms, such description is for illustrative purposes only, and it is to be understood that changes and variations may be made without departing from the spirit or scope of the following claims.

What is claimed is:

1. A numeric control apparatus for a machine tool for automatically determining a tool and a machining condition, the apparatus comprising:
   a standard data database storing standard data for tools and machining conditions;
   an input device for inputting a user's data for tools and machining conditions in addition to the standard data for tools and machining conditions;
   at least one user database storing data input through said input device;
   an automatic tool and machining condition determining means for determining tool and machining condition data from the standard database and the at least one user database; and
   contradiction checking means for checking contradictions between newly entered data and existing data when renewing the data of the user database and the standard database.

2. The numeric control apparatus for a machine tool according to claim 1 comprising a display unit displaying contents of the standard data database and the user database during production of a numerical control program, data editing means for modifying the data displayed on said display unit, and database managing means re-determining the data for a tool and a machining condition determined before modifying by said data editing means.

3. The numeric control apparatus for a machine tool according to claim 1 comprising at least one tool and machining condition memory means for storing one of tool data and machining condition data in addition to the data stored in the standard data database and the user database, said automatic tool and machining condition determining means automatically determining at least one usable tool and corresponding machining conditions based on the tool data and the machining condition data stored in said tool and machining condition memory means.

4. The numeric control apparatus for a machine tool according to claim 3 wherein said automatic tool and machining condition determining means produces a display of at least one usable tool and machining condition on a display unit, the apparatus further comprising selecting means for selecting a machining condition corresponding to a tool to be used from the tools and machining conditions displayed on the display unit.

5. A numeric control apparatus for a machine tool for automatically determining a tool and machining condition, the apparatus comprising:
   a standard data database storing standard data for tools and machining conditions;
   an input device for inputting a user's data for tools and machining conditions in addition to the standard data for tools and machining conditions;
   at least one user database storing data input through said input device;
   an automatic tool and machining condition determining means for determining tool and machining condition data from the standard database and the at least one user database; and
   selecting means for selecting one of the standard data database and the user database as a database to be used before producing a numeric control program.

6. The numeric control apparatus for a machine tool according to claim 5 comprising a display unit displaying contents of the standard data database and the user database during production of a numerical control program, data editing means for modifying the data displayed on said display unit, and database managing means re-determining the data for a tool and a machining condition determined before modifying by said data editing means.

7. The numeric control apparatus for a machine tool according to claim 5 comprising at least one tool and machining condition memory means for storing one of tool data and machining condition data in addition to the data stored in the standard data database and the user database, said automatic tool and machining condition determining means automatically determining at least one usable tool and corresponding machining conditions based on the tool data and the machining condition data stored in said tool and machining condition memory means.

8. The numeric control apparatus for a machine tool according to claim 7 wherein said automatic tool and machining condition determining means produces a display of at least one usable tool and machining condition on a display unit, the apparatus further comprising selecting means for selecting a machining condition corresponding to a tool to be used from the tools and machining conditions displayed on the display unit.

9. A numeric control apparatus for a machine tool for automatically determining a tool and machining condition, the apparatus comprising:

a standard data database storing standard data for tools and machining conditions;

an input device for inputting a user's data for tools and machining conditions in addition to the standard data for tools and machining conditions;

at least one user database storing data input through said input device;

an automatic tool and machining condition determining means for determining tool and machining condition data from the standard database and the at least one user database; and a plurality of user databases and selecting means for selecting one of the user databases.

10. The numeric control apparatus for a machine tool according to claim 9 comprising a display unit displaying contents of the standard data database and the user database during production of a numerical control program, data editing means for modifying the data displayed on said display unit, and database managing means re-determining the data for a tool and a machining condition determined before modifying by said data editing means.

11. The numeric control apparatus for a machine tool according to claim 9 comprising at least one tool and machining condition memory means for storing one of tool data and machining condition data in addition to the data stored in the standard data database and the user database, said automatic tool and machining condition determining means automatically determining at least one usable tool and corresponding machining conditions based on the tool data and the machining condition data stored in said tool and machining condition memory means.

12. The numeric control apparatus for a machine tool according to claim 11 wherein said automatic tool and machining condition determining means produces a display of at least one usable tool and machining condition on a display unit, the apparatus further comprising selecting means for selecting a machining condition corresponding to a tool to be used from the tools and machining conditions displayed on the display unit.

* * * * *